United States Patent
Rastegardoost et al.

(10) Patent No.: US 12,101,789 B2
(45) Date of Patent: Sep. 24, 2024

(54) POWER CONTROL ADJUSTMENT FOR PUCCH WITH MULTI-PDSCH SCHEDULING

(71) Applicant: Ofinno, LLC, Reston, VA (US)

(72) Inventors: Nazanin Rastegardoost, McLean, VA (US); Hyoungsuk Jeon, Centreville, VA (US); Esmael Hejazi Dinan, McLean, VA (US); Yunjung Yi, Vienna, VA (US); Ali Cagatay Cirik, Chantilly, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 18/238,771

(22) Filed: Aug. 28, 2023

(65) Prior Publication Data

US 2023/0403717 A1 Dec. 14, 2023

Related U.S. Application Data

(63) Continuation of application No. PCT/US2022/039720, filed on Aug. 8, 2022.

(Continued)

(51) Int. Cl.
*H04W 72/0446* (2023.01)
*H04L 1/1812* (2023.01)
(Continued)

(52) U.S. Cl.
CPC ......... *H04W 72/232* (2023.01); *H04L 1/1812* (2013.01); *H04L 5/0055* (2013.01); *H04W 72/0446* (2013.01)

(58) Field of Classification Search
CPC ............ H04W 72/232; H04W 72/0446; H04L 1/1812; H04L 5/0055
See application file for complete search history.

(56) References Cited

U.S. PATENT DOCUMENTS 9,800,362 B2 10/2017 Yang et al.
10,750,488 B2 8/2020 He et al.
(Continued)

FOREIGN PATENT DOCUMENTS

EP  3 806 380 A1  4/2021
WO  2019/066630 A1  4/2019
(Continued)

OTHER PUBLICATIONS

3GPP TS 38.212 V16.5.0 (Mar. 2021); Technical Specification; 3rd Generation Partnership Project; Technical Specification Group Radio Access Network; NR; Multiplexing and channel coding; (Release 16).

(Continued)

*Primary Examiner* — Hanh N Nguyen
(74) *Attorney, Agent, or Firm* — Peter Flanagan; Kavon Nasabzadeh; Philip R. Smith

(57) ABSTRACT

A method may include receiving configuration parameters of each cell of one or more cells, indicating a maximum number of time domain resource allocations for physical downlink shared channels (PDSCHs) for a respective cell of the one or more cells. The method may also include transmitting, via a physical uplink control channel (PUCCH), feedback information with a transmission power determined based on a maximum value of the maximum number of time domain resource allocations of a cell scaled by a corresponding number of codewords of the cell, across the one or more cells.

20 Claims, 27 Drawing Sheets

Related U.S. Application Data

(60) Provisional application No. 63/230,408, filed on Aug. 6, 2021.

(51) Int. Cl.
*H04L 5/00* (2006.01)
*H04W 72/232* (2023.01)

(56) References Cited

U.S. PATENT DOCUMENTS

| | | | | |
|---|---|---|---|---|
| 11,083,001 | B2* | 8/2021 | Choi | H04L 5/0055 |
| 2012/0320805 | A1 | 12/2012 | Yang et al. | |
| 2018/0310257 | A1 | 10/2018 | Papasakellariou | |
| 2021/0314033 | A1* | 10/2021 | Fakoorian | H04W 72/535 |
| 2022/0045805 | A1 | 2/2022 | Karaki et al. | |
| 2022/0104138 | A1* | 3/2022 | Park | H04L 5/0094 |
| 2022/0329366 | A1 | 10/2022 | Kim et al. | |
| 2023/0039107 | A1 | 2/2023 | Liu et al. | |
| 2023/0171040 | A1* | 6/2023 | Gao | H04L 1/1854 370/329 |
| 2023/0309093 | A1* | 9/2023 | Wei | H04L 1/1812 370/329 |
| 2023/0337233 | A1* | 10/2023 | Zhou | H04L 5/0044 |

FOREIGN PATENT DOCUMENTS

| | | |
|---|---|---|
| WO | 2021/137564 A1 | 7/2021 |
| WO | 2021/147117 A1 | 7/2021 |

OTHER PUBLICATIONS

3GPP TS 38.213 V16.5.0 (Mar. 2021); Technical Specification; 3rd Generation Partnership Project; Technical Specification Group Radio Access Network; NR; Physical layer procedures for control (Release 16).
3GPP TS 38.214 V16.5.0 (Mar. 2021); Technical Specification; 3rd Generation Partnership Project; Technical Specification Group Radio Access Network; NR; Physical layer procedures for data; (Release 16).
3GPP TS 38.321 V16.4.0 (Mar. 2021); Technical Specification; 3rd Generation Partnership Project; Technical Specification Group Radio Access Network; NR; Medium Access Control (MAC) protocol specification; (Release 16).
3GPP TS 38.331 V16.4.1 (Mar. 2021); Technical Specification; 3rd Generation Partnership Project; Technical Specification Group Radio Access Network; NR; Radio Resource Control (RRC) protocol specification; (Release 16).
R1-2104212; 3GPP TSG RAN WG1 Meeting #105-e; eMeeting, May 19-May 27, 2021; Agenda Item: 8.2.5; Source: FUTUREWEI; Title: Enhancements to support PDSCH/PUSCH for beyond 52.6GHz; Document for: Discussion and decision.
R1-2104274; 3GPP TSG RAN WG1 Meeting #105-e; E-meeting, May 10-27, 2021; Agenda Item: 8.2.5; Source: Huawei, HiSilicon; Title: PDSCH/PUSCH enhancements for 52-71GHz spectrum; Document for: Discussion and decision.
R1-2104350; 3GPP TSG RAN WG1 #105-e; e-Meeting, May 10-27, 2021; Source: vivo; Title: Discussions on multi-PDSCH/PUSCH scheduling for NR operation from 52.6GHz to 71GHz; Agenda Item: 8.2.5; Document for: Discussion and Decision.
R1-2104418; 3GPP TSG RAN WG1#105-e; e-Meeting, May 10-27, 2021; Agenda Item: 8.2.5; Source: Spreadtrum Communications; Title: Discussion on PDSCH and PUSCH enhancements for above 52.6GHz; Document for: Discussion and decision.
R1-2104454; 3GPP TSG RAN WG1 #105-e; e-Meeting, May 10-27, 2021; Agenda item: 8.2.5; Source: Nokia, Nokia Shanghai Bell; Title: PDSCH/PUSCH enhancements; Document for: Discussion and Decision.
R1-2104462; 3GPP TSG-RAN WG1 Meeting #105-eTdoc; e-Meeting, May 10-27, 2021; Agenda Item: 8.2.5; Source: Ericsson; Title: PDSCH/PUSCH enhancements; Document for: Discussion, Decision.
R1-2104509; 3GPP TSG RAN WG1 #105-e; e-Meeting, May 19-27, 2021; Source: CATT; Title: PDSCH/PUSCH enhancements for up to 71GHz operation; Agenda Item: 8.2.5; Document for: Discussion and Decision.
R1-2104661; 3GPP TSG-RAN WG1 #105-e; e-Meeting, May 10-May 27, 2021; Agenda item: 8.2.5; Source: Qualcomm Incorporated; Title: PDSCH and PUSCH enhancements for 52.6-71GHz band; Document for: Discussion/Decision.
R1-2104767; 3GPP TSG RAN WG1 #105-e; e-Meeting, May 10-27, 2021; Source: OPPO; Title: Discussion on PDSCH/PUSCH enhancements; Agenda Item: 8.2.5; Document for: Discussion and Decision.
R1-2104835; 3GPP TSG RAN WG1 #104b-e; e-Meeting, May 10-27, 2021; Title: Discussion on the PDSCH/PUSCH enhancements for 52.6 to 71GHz; Source: ZTE, Sanechips; Agenda Item: 8.2.5; Document for: Discussion and Decision.
R1-2104896; 3GPP TSG RAN WG1 #105-e; e-Meeting, May 19-27, 2021; Source: Intel Corporation; Title: Discussion on PDSCH/PUSCH enhancements for extending NR up to 71 GHZ; Agenda item: 8.2.5; Document for: Discussion/Decision.
R1-2105062; 3GPP TSG RAN WG1 #105-e; e-Meeting, May 10-27, 2021; Agenda Item: 8.2.5; Source: Fujitsu; Title: Considerations on multi-PDSCH/PUSCH with a single DCI and HARQ for NR from 52.6 GHz to 71 GHZ; Document for: Discussion/Decision.
R1-2105094; 3GPP TSG RAN WG1 #104b-e; e-Meeting, Apr. 12-20, 2021; Agenda Item: 8.2.5; Source: Apple Inc.; Title: Discussion on multi-PxSCH and HARQ Codebook Enhancements; Document for: Discussion/Decision.
R1-2105158; 3GPP TSG RAN WG1 #105-e; e-Meeting, May 10-27, 2021; Agenda Item: 8.2.5; Source: Sony; Title: PDSCH/PUSCH enhancements for NR from 52.6 GHz to 71 GHz; Document for: Discussion / Decision.
R1-2105259; 3GPP TSG RAN WG1 #105-e; e-Meeting, May 10-May 27, 2021; Source: NEC; Title: Discussion on PDSCH enhancements supporting NR from 52.6GHz to 71 GHz; Document for: Discussion and Decision.
R1-2105299; 3GPP TSG RAN WG1 #105-e; e-Meeting, May 10-27, 2021; Agenda item: 8.2.5; Source: Samsung; Title: PDSCH/PUSCH enhancements for NR from 52.6 GHz to 71 GHz; Document for: Discussion and Decision.
R1-2105372; 3GPP TSG RAN WG1 #105-e; e-Meeting, May 10-27, 2021; Agenda item: 8.2.5; Title: HARQ codebook design for 52.6-71 GHz NR operation; Source: MediaTek Inc.; Document for: Discussion.
R1-2105396; 3GPP TSG RAN WG1 #105e; e-Meeting, May 10-27, 2021; Source: Panasonic; Title: Discussion on PDSCH/PUSCH enhancements for NR 52.6-71 GHZ; Agenda Item: 8.2.5; Document for: Discussion.
R1-2105421; 3GPP TSG RAN WG1 #105-e; e-Meeting, May 10-27, 2021; Agenda Item: 8.2.5; Source: LG Electronics; Title: PDSCH/PUSCH enhancements to support NR above 52.6 GHz; Document for: Discussion and decision.
R1-2105422; 3GPP TSG RAN WG1 #105-e; e-Meeting, May 10-27, 2021; Agenda Item: 8.2.5; Source: Moderator (LG Electronics); Title: Summary #1 of PDSCH/PUSCH enhancements (Scheduling/HARQ); Document for: Discussion and decision.
R1-2105497; 3GPP TSG RAN WG1 #105-e; e-meeting, May 10-27, 2021; Source: Lenovo, Motorola Mobility; Title: PDSCH/PUSCH scheduling enhancements for NR from 52.6 GHz to 71GHz; Agenda Item: 8.2.5; Document for: Discussion.
R1-2105556; 3GPP TSG RAN WG1 #105-e; e-Meeting, May 10-27, 2021; Agenda item: 8.2.5; Source: Xiaomi; Title: PDSCH/PUSCH enhancements for NR 52.6-71 GHz; Document for: Discussion.
R1-2105583; 3GPP TSG RAN WG1 #105-e; e-Meeting, May 10-27, 2021; Agenda Item: 8.2.5; Source: InterDigital, Inc.; Title: Enhancing PDSCH/PUSCH Scheduling for 52.6 GHz to 71 GHz Band; Document for: Discussion and Decision.
R1-2105596; 3GPP TSG-RAN WG1 #105-e; e-Meeting, May 10-May 27, 2021; Agenda item: 8.2.5; Title: PDSCH Considerations for

(56) References Cited

OTHER PUBLICATIONS

Supporting NR from 52.6 GHz to 71 GHZ; Source: Convida Wireless; Document for: Discussion.
R1-2105690; 3GPP TSG RAN WG1 Meeting #105-e; Electronic Meeting, May 10-27, 2021; Source: NTT Docomo, Inc.; Title: PDSCH/PUSCH enhancements for NR from 52.6 to 71 GHZ; Agenda Item: 8.2.5; Document for: Discussion and Decision.
R1-2105784; 3GPP TSG-RAN WG1 Meeting #105-e; eMeeting, May 10-27, 2021; Agenda item: 8.2.5; Source: Charter Communications; Title: PDSCH/PUSCH enhancements for NR above 52.6GHz; Document for: Discussion.
R1-2105870; 3GPP TSG RAN WG1 #105-e; e-Meeting, May 10-27, 2021; Source: WILUS Inc .; Title: Discussion on multi-PDSCH/PUSCH scheduling for NR from 52.6GHz to 71GHz; Agenda item: 8.2.5; Document for: Discussion/Decision.
R1-2106105; 3GPP TSG RAN WG1 #105-e; e-Meeting, May 10-27, 2021; Agenda Item: 8.2.5; Source: Moderator (LG Electronics); Title: Summary #2 of PDSCH/PUSCH enhancements (Scheduling/HARQ); Document for: Discussion and decision.
International Search Report and Written Opinion of the International Searching authority mailed Nov. 18, 2022, in International Application No. PCT/US2022/039720.
R1-2103344; 3GPP TSG RAN WG1 #104b-e; e-Meeting, Apr. 12-20, 2021; Agenda Item: 8.2.5; Source: Moderator (LG Electronics); Title: Summary #1 of POSCH/PUSCH enhancements (Scheduling/HARO); Document for: Discussion and decision.

\* cited by examiner

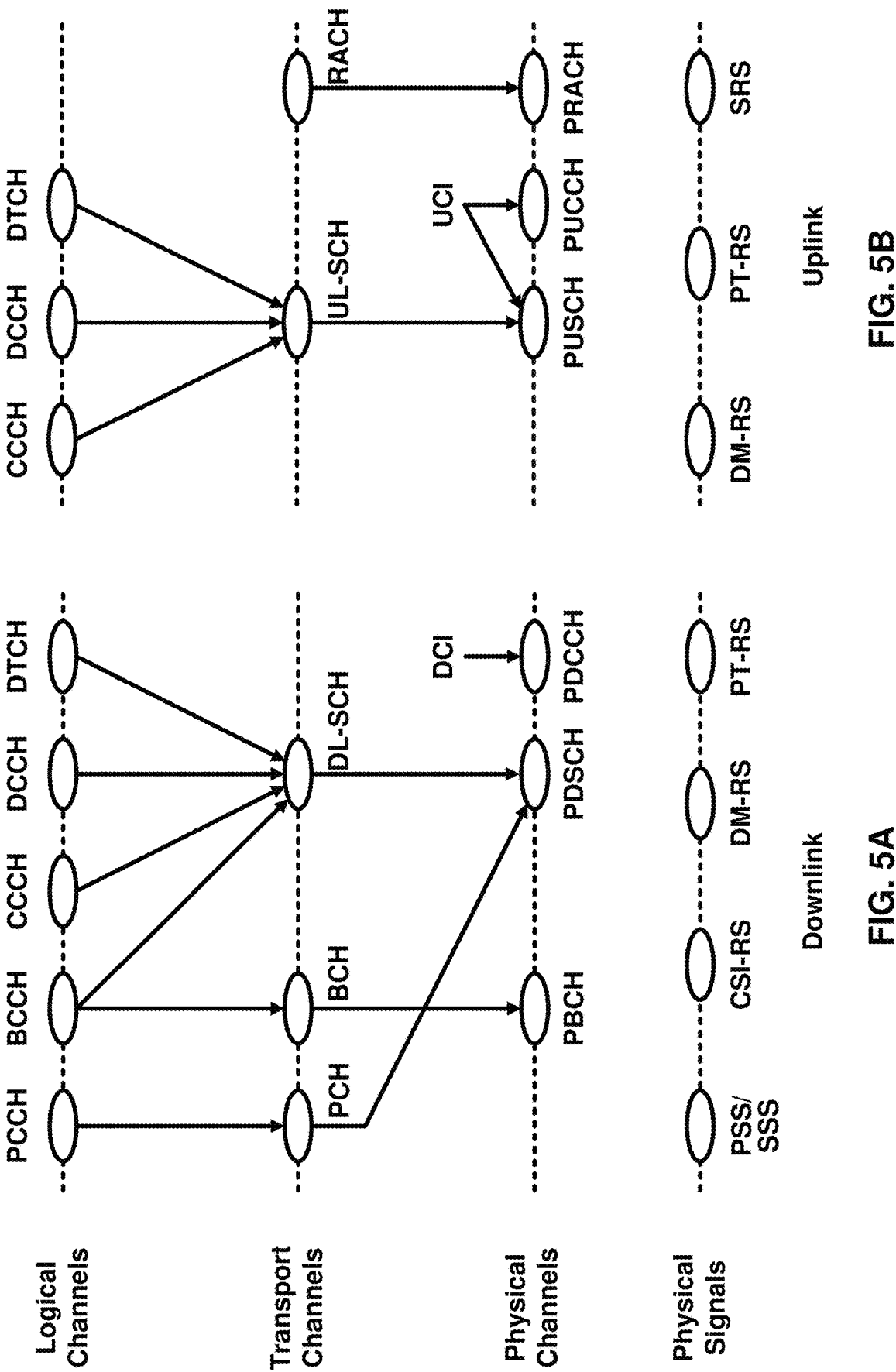

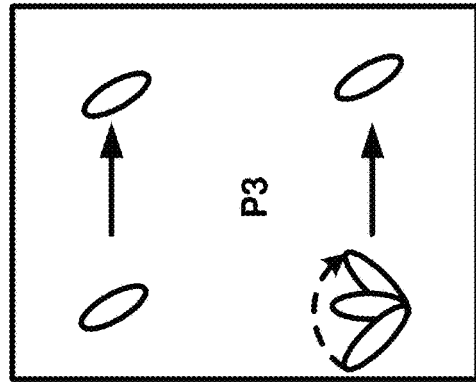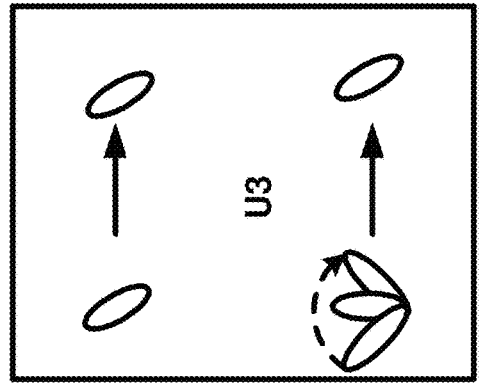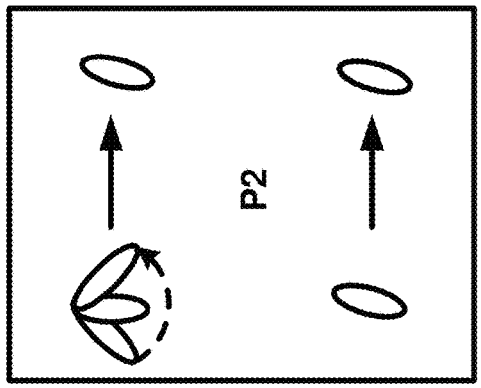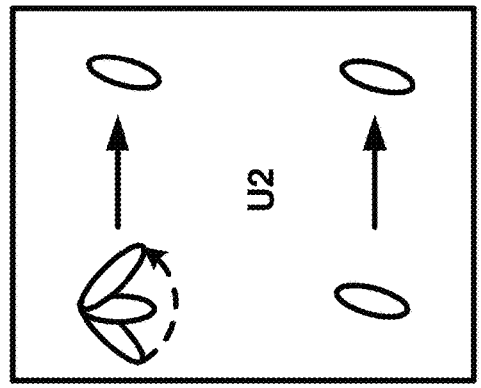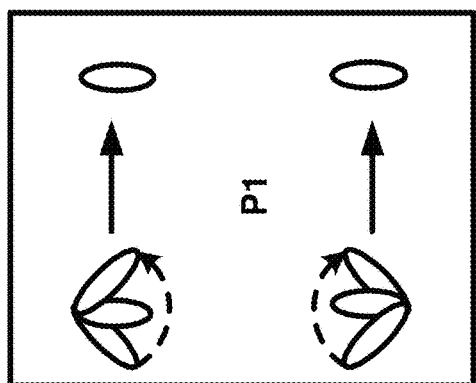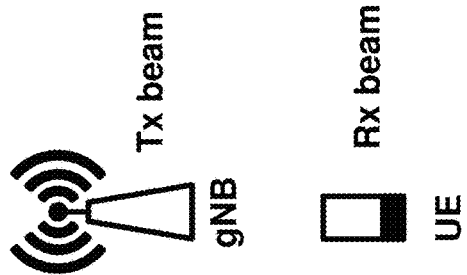
FIG. 12A
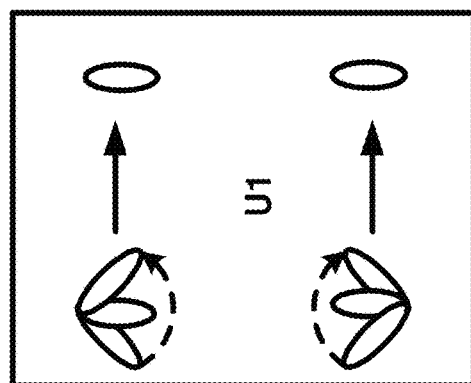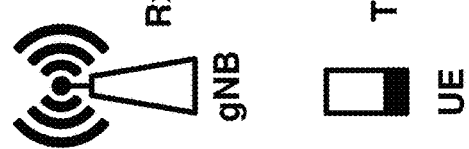
FIG. 12B

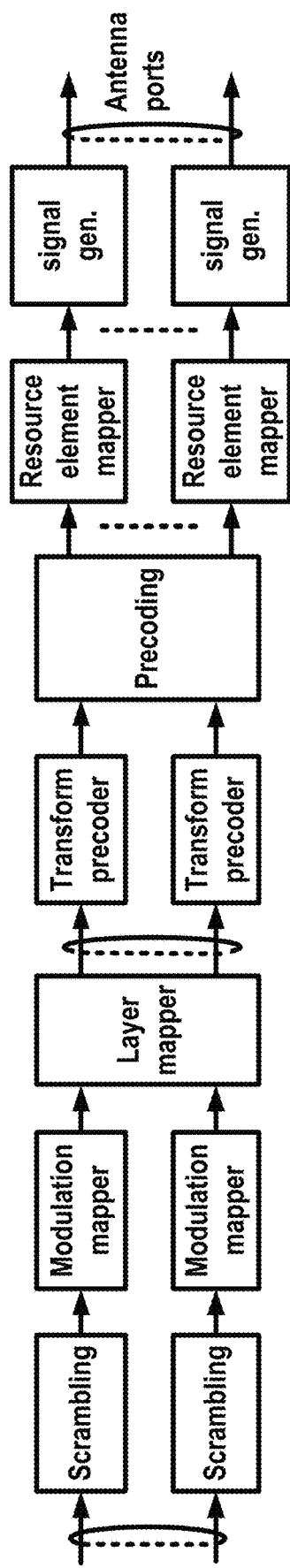
FIG. 16A
FIG. 16B
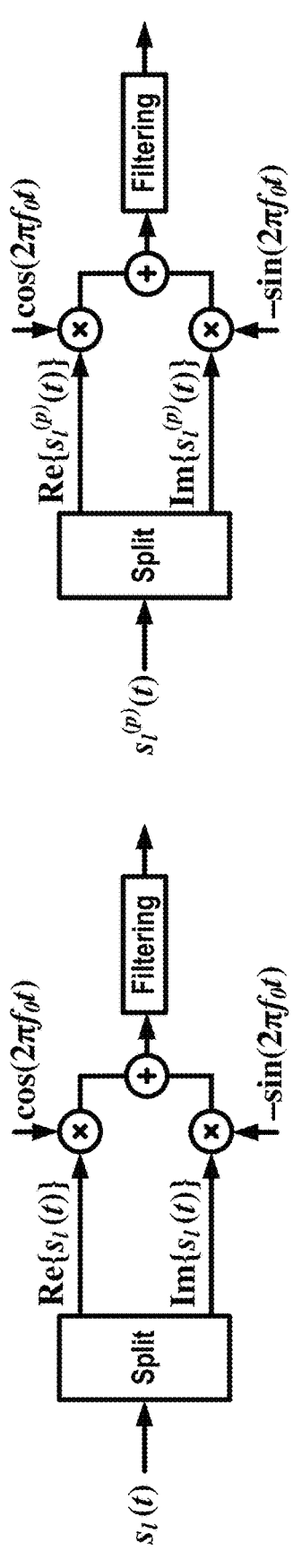
FIG. 16D
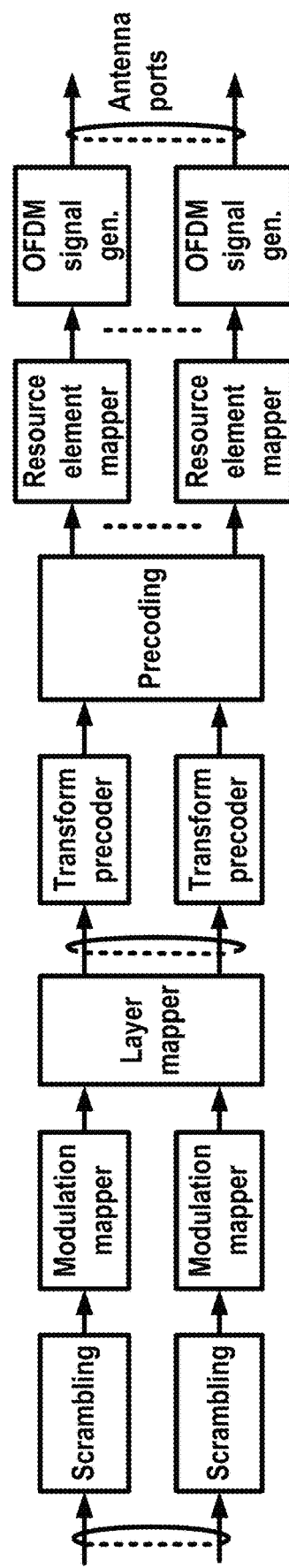
FIG. 16C

| DAI MSB, LSB | $V_{C-DAI}^{DL}$ or $V_{T-DAI}^{DL}$ | Number of (serving cell, PDCCH monitoring occasion)-pair(s) in which PDSCH transmission(s) associated with PDCCH or PDCCH indicating SPS PDSCH release or DCI format 1_1 indicating SCell dormancy is present, denoted as $Y$ and $Y \geq 1$ |
|---|---|---|
| 0,0 | 1 | $(Y-1) \bmod T_D + 1 = 1$ |
| 0,1 | 2 | $(Y-1) \bmod T_D + 1 = 2$ |
| 1,0 | 3 | $(Y-1) \bmod T_D + 1 = 3$ |
| 1,1 | 4 | $(Y-1) \bmod T_D + 1 = 4$ |

FIG. 23A

| DAI | $V_{C-DAI}^{DL}$ | Number of (serving cell, PDCCH monitoring occasion)-pair(s) in which PDSCH transmission(s) associated with PDCCH or PDCCH indicating SPS PDSCH release or DCI format 1_1 indicating SCell dormancy is present, denoted as $Y$ and $Y \geq 1$ |
|---|---|---|
| 0 | 1 | $(Y-1) \bmod T_D + 1 = 1$ |
| 1 | 2 | $(Y-1) \bmod T_D + 1 = 2$ |

FIG. 23B

POWER CONTROL ADJUSTMENT FOR PUCCH WITH MULTI-PDSCH SCHEDULING

CROSS-REFERENCE TO RELATED APPLICATIONS

This application is a continuation of International Application No. PCT/US2022/039720, filed Aug. 8, 2022, which claims the benefit of U.S. Provisional Application No. 63/230,408, filed Aug. 6, 2021, all of which are hereby incorporated by reference in their entireties.

BRIEF DESCRIPTION OF THE DRAWINGS

Examples of several of the various embodiments of the present disclosure are described herein with reference to the drawings.

FIG. 5A and FIG. 5B respectively illustrate a mapping between logical channels, transport channels, and physical channels for the downlink and uplink.

FIG. 12A and FIG. 12B respectively illustrate examples of three downlink and uplink beam management procedures.

FIG. 16A, FIG. 16B, FIG. 16C, and FIG. 16D illustrate example structures for uplink and downlink transmission.

FIG. 23A and FIG. 23B illustrate examples of determining counter DAI and total DAI values based on a corresponding DCI indication, according to some embodiments.

DETAILED DESCRIPTION

Figure 1A:
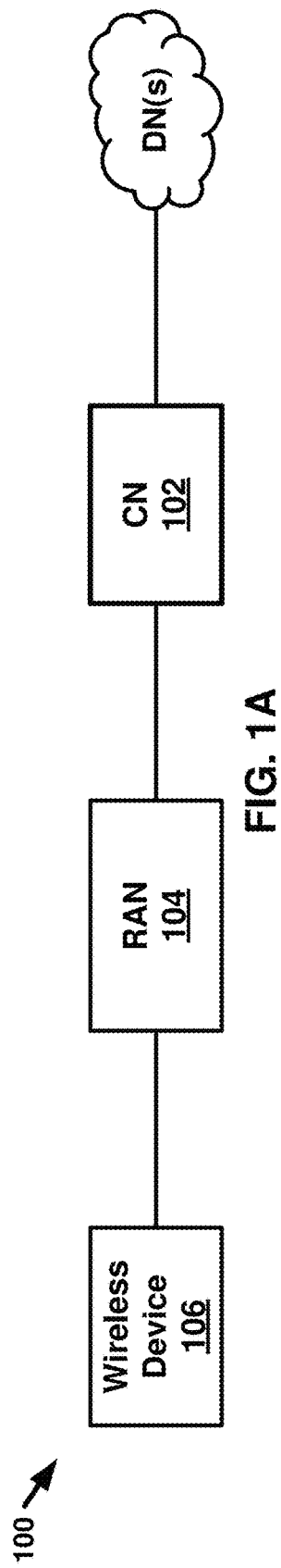
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
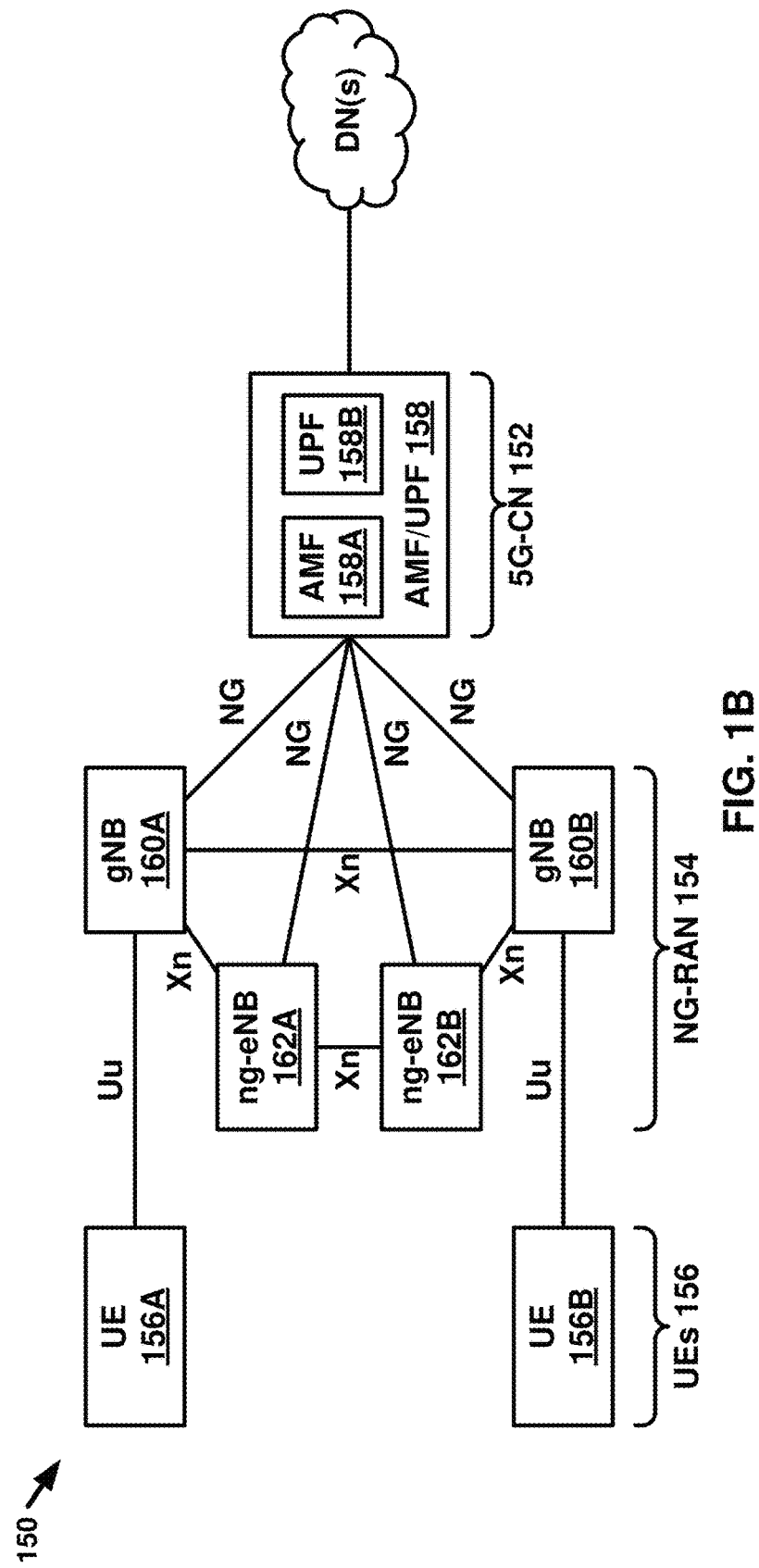

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
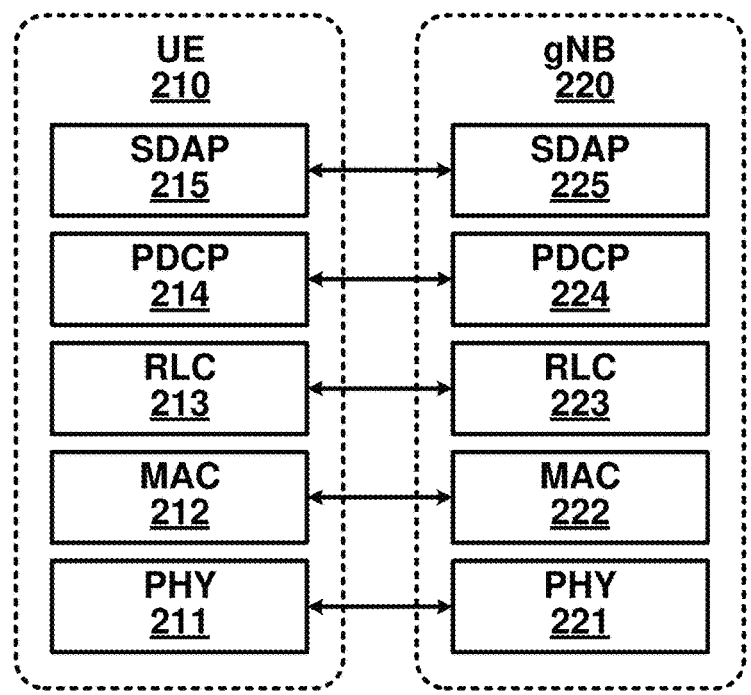
FIG. 2A and FIG. 2B respectively illustrate a New Radio (NR) user plane and control plane protocol stack.
Figure 2B:
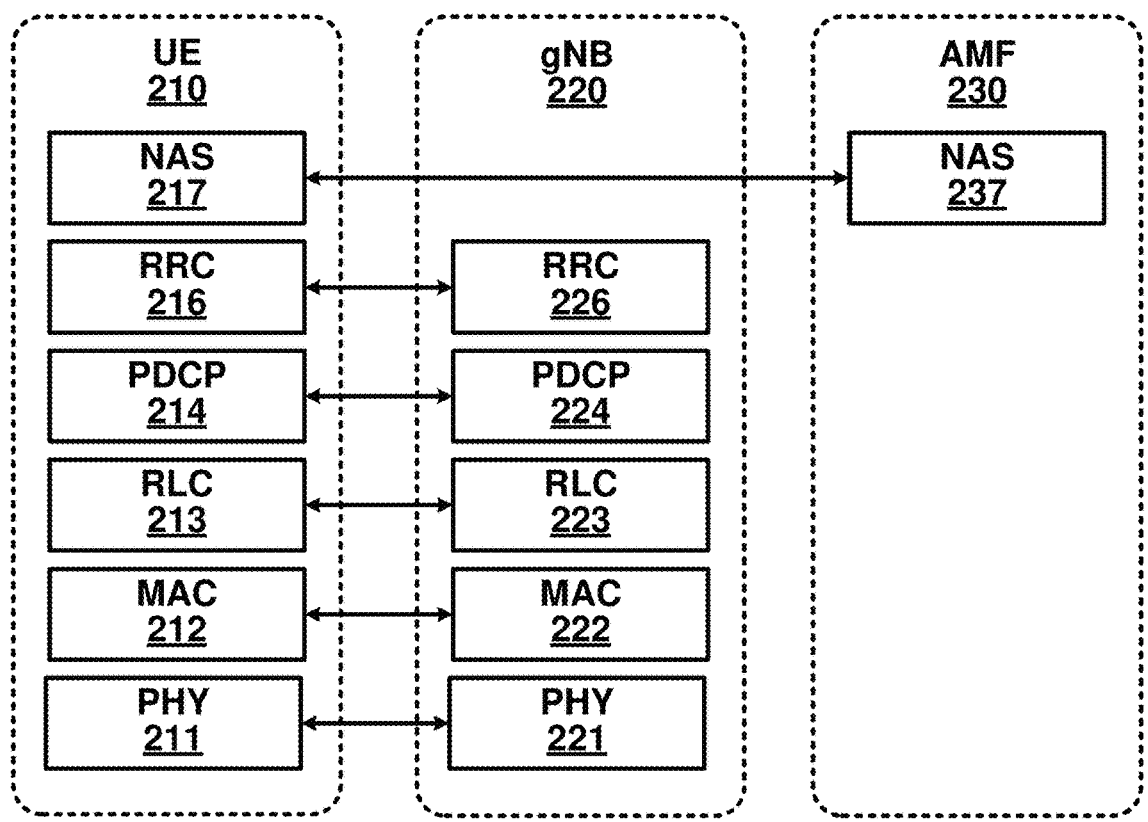

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
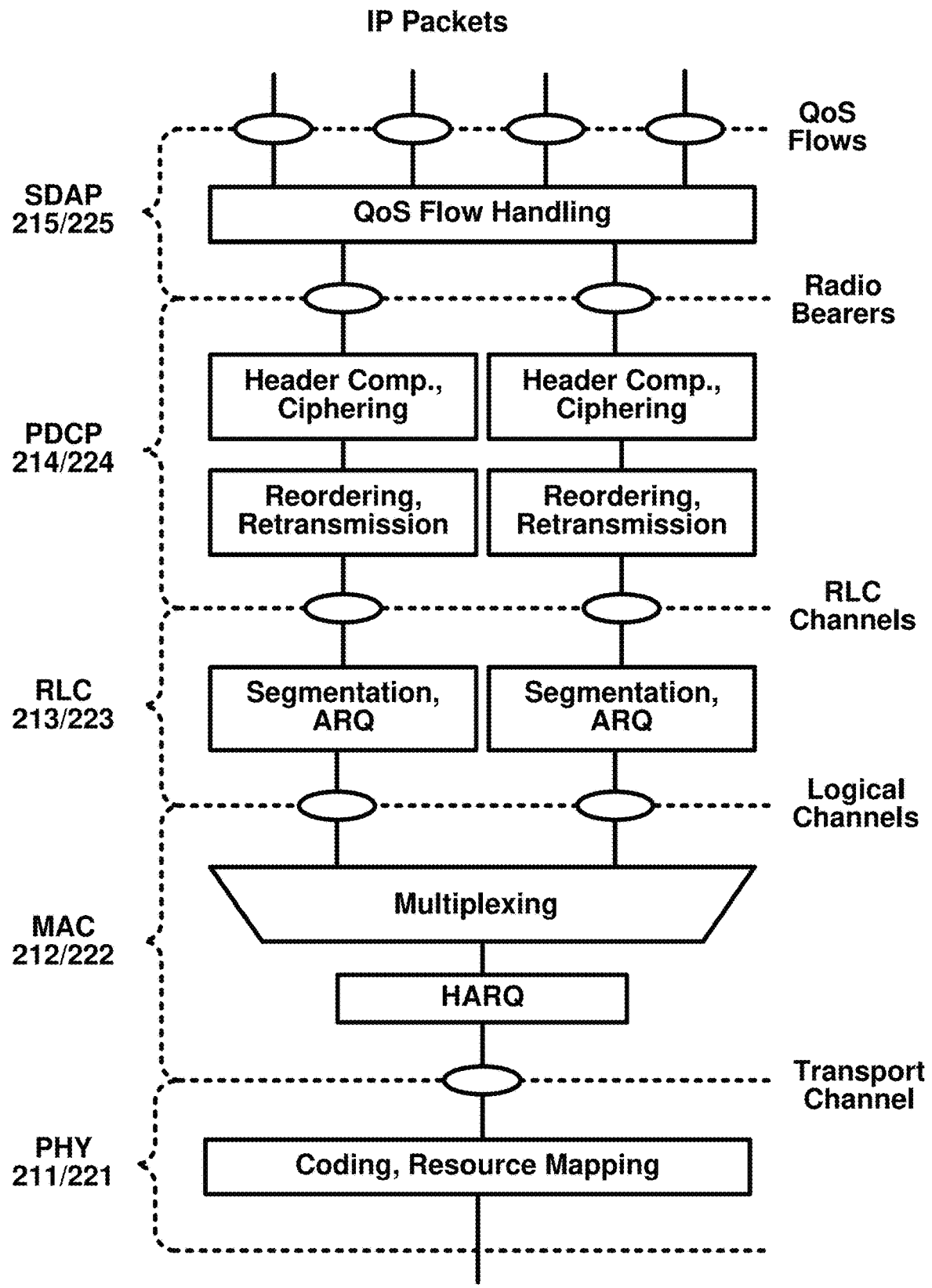
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figure 4A:
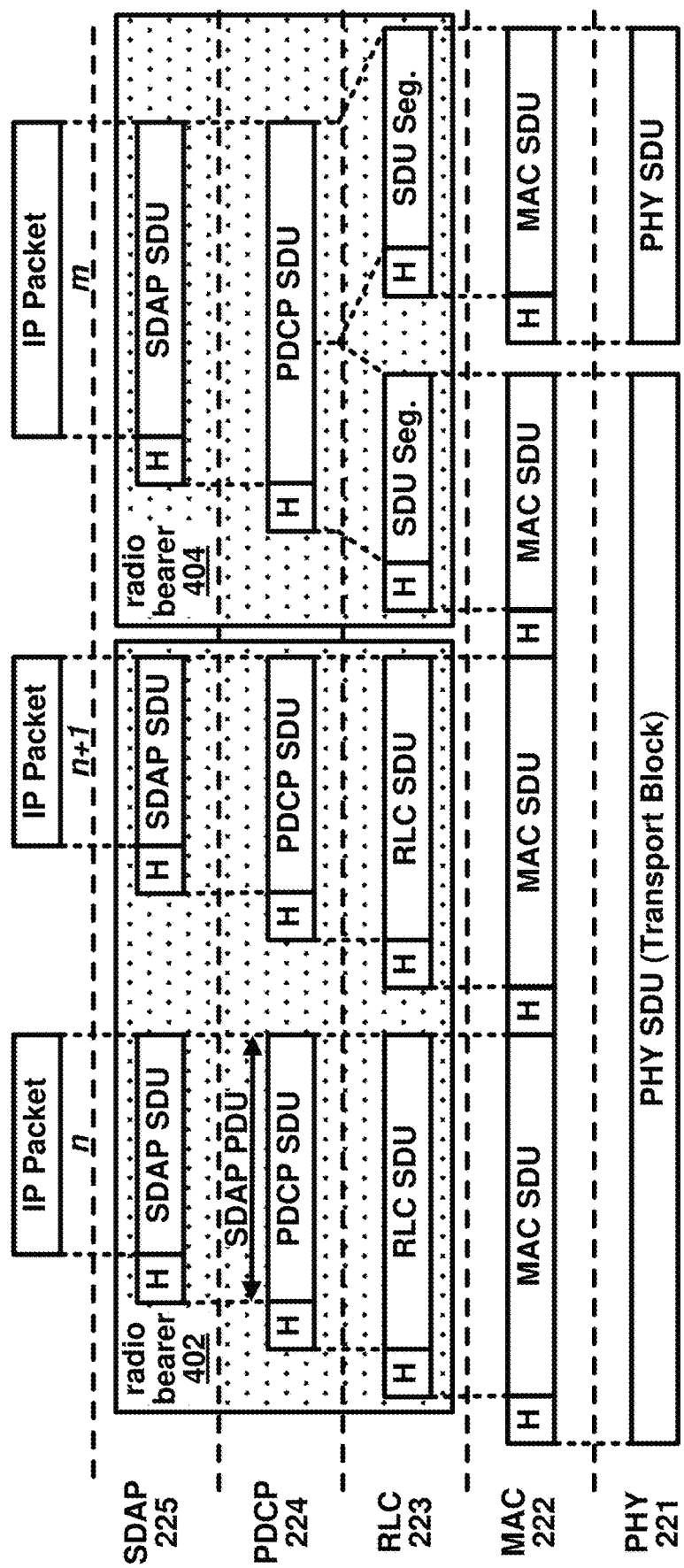
FIG. 4A illustrates an example downlink data flow through the NR user plane protocol stack of FIG. 2A.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

Figure 4B:
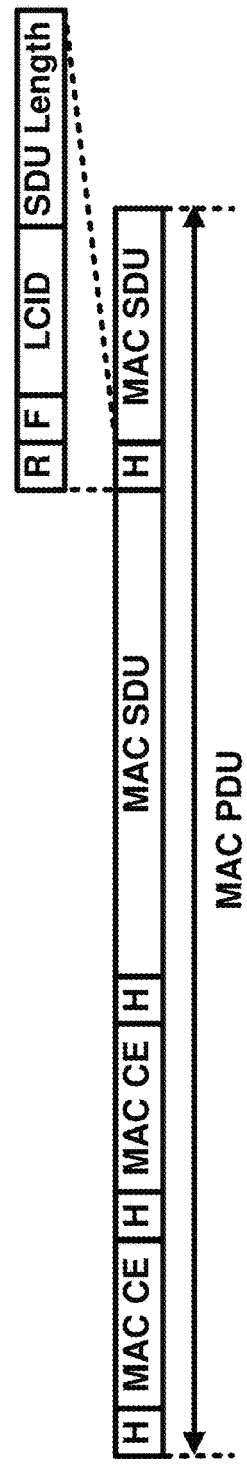
FIG. 4B illustrates an example format of a MAC subheader in a MAC PDU.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:
  a paging control channel (PCCH) for carrying paging messages used to page a UE whose location is not known to the network on a cell level;
  a broadcast control channel (BCCH) for carrying system information messages in the form of a master information block (MIB) and several system information blocks (SIBs), wherein the system information messages may be used by the UEs to obtain information about how a cell is configured and how to operate within the cell;
  a common control channel (CCCH) for carrying control messages together with random access;
  a dedicated control channel (DCCH) for carrying control messages to/from a specific the UE to configure the UE; and
  a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:
  a paging channel (PCH) for carrying paging messages that originated from the PCCH;
  a broadcast channel (BCH) for carrying the MIB from the BCCH;
  a downlink shared channel (DL-SCH) for carrying downlink data and signaling messages, including the SIBs from the BCCH;
  an uplink shared channel (UL-SCH) for carrying uplink data and signaling messages; and
  a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:
  a physical broadcast channel (PBCH) for carrying the MIB from the BCH;
  a physical downlink shared channel (PDSCH) for carrying downlink data and signaling messages from the DL-SCH, as well as paging messages from the PCH;
  a physical downlink control channel (PDCCH) for carrying downlink control information (DCI), which may include downlink scheduling commands, uplink scheduling grants, and uplink power control commands;
  a physical uplink shared channel (PUSCH) for carrying uplink data and signaling messages from the UL-SCH and in some instances uplink control information (UCI) as described below;
  a physical uplink control channel (PUCCH) for carrying UCI, which may include HARQ acknowledgments, channel quality indicators (CQI), pre-coding matrix indicators (PMI), rank indicators (RI), and scheduling requests (SR); and
  a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
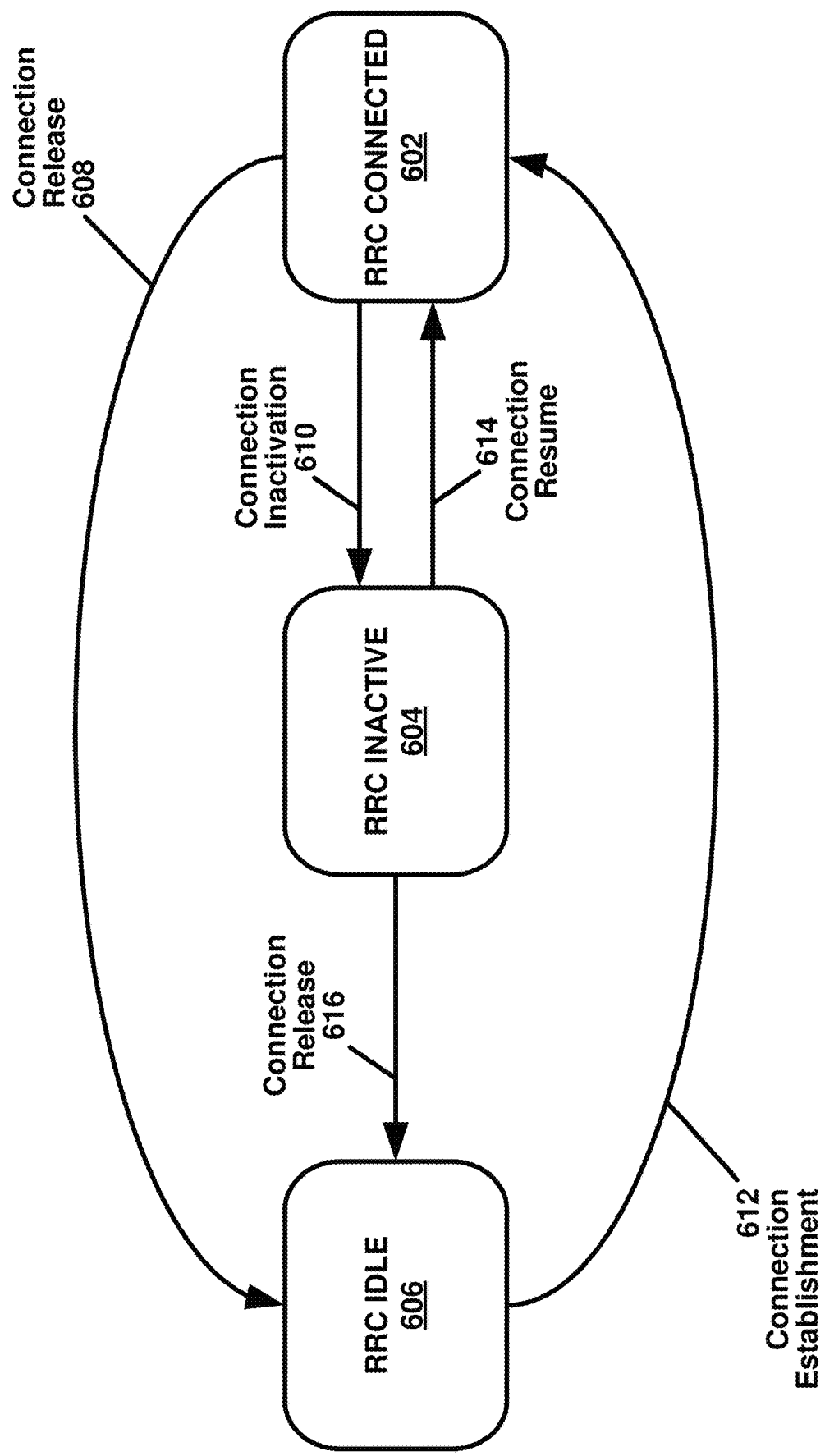
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
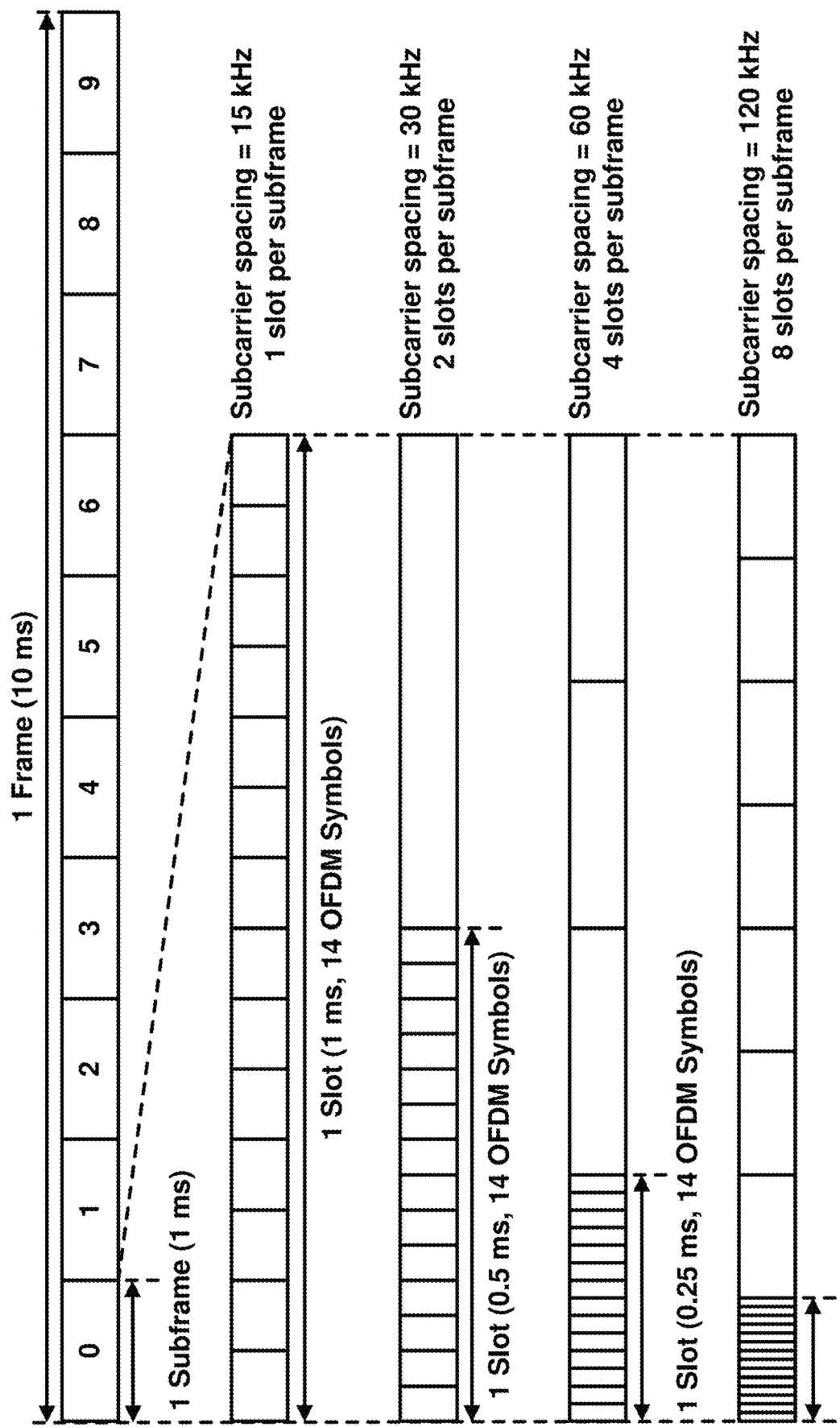
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 µs. For example, NR defines numerologies with the following subcarrier spacing/cyclic prefix duration combinations: 15 kHz/4.7 µs; 30 kHz/2.3 µs; 60 kHz/1.2 µs; 120 kHz/0.59 µs; and 240 kHz/0.29 µs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
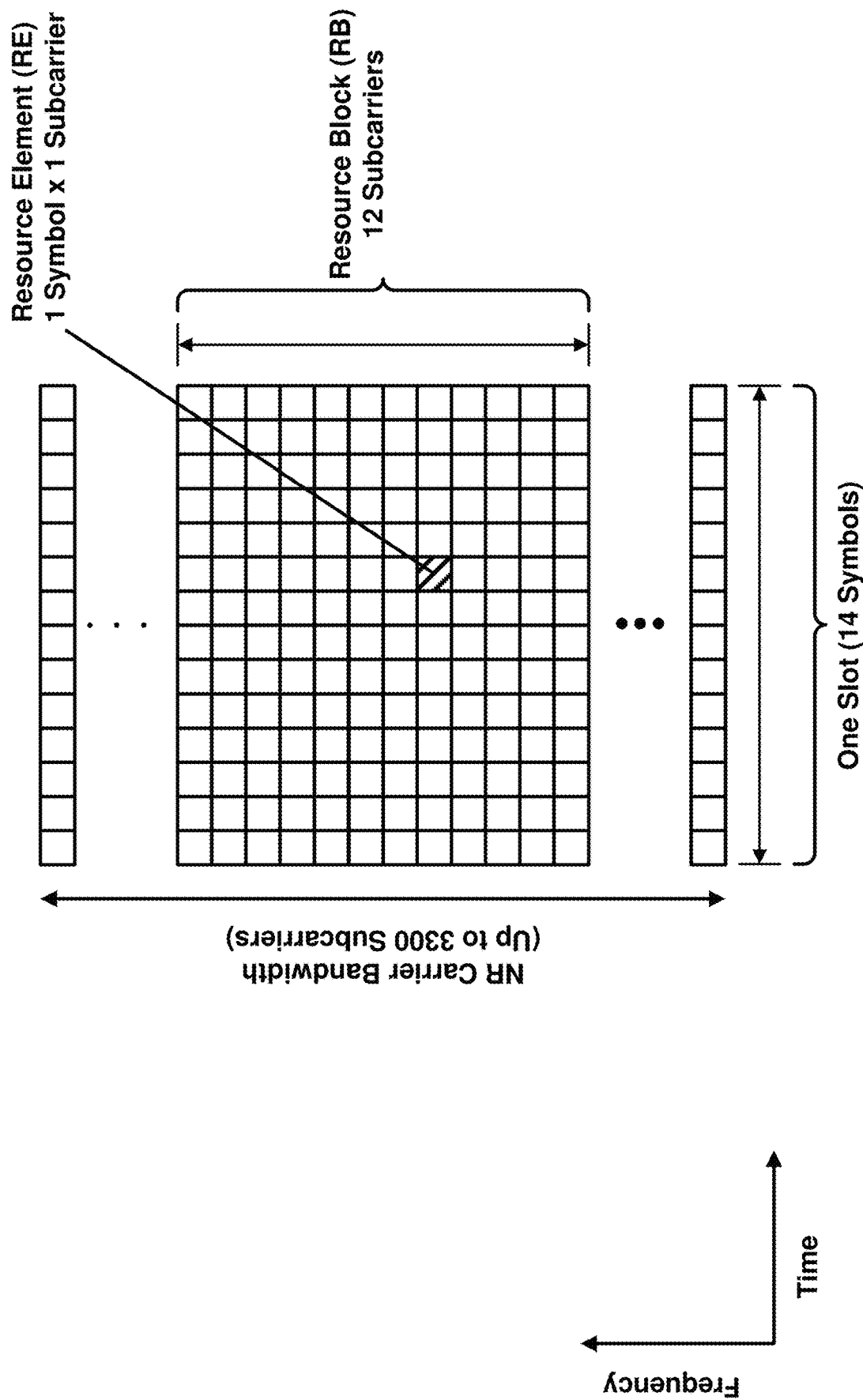
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
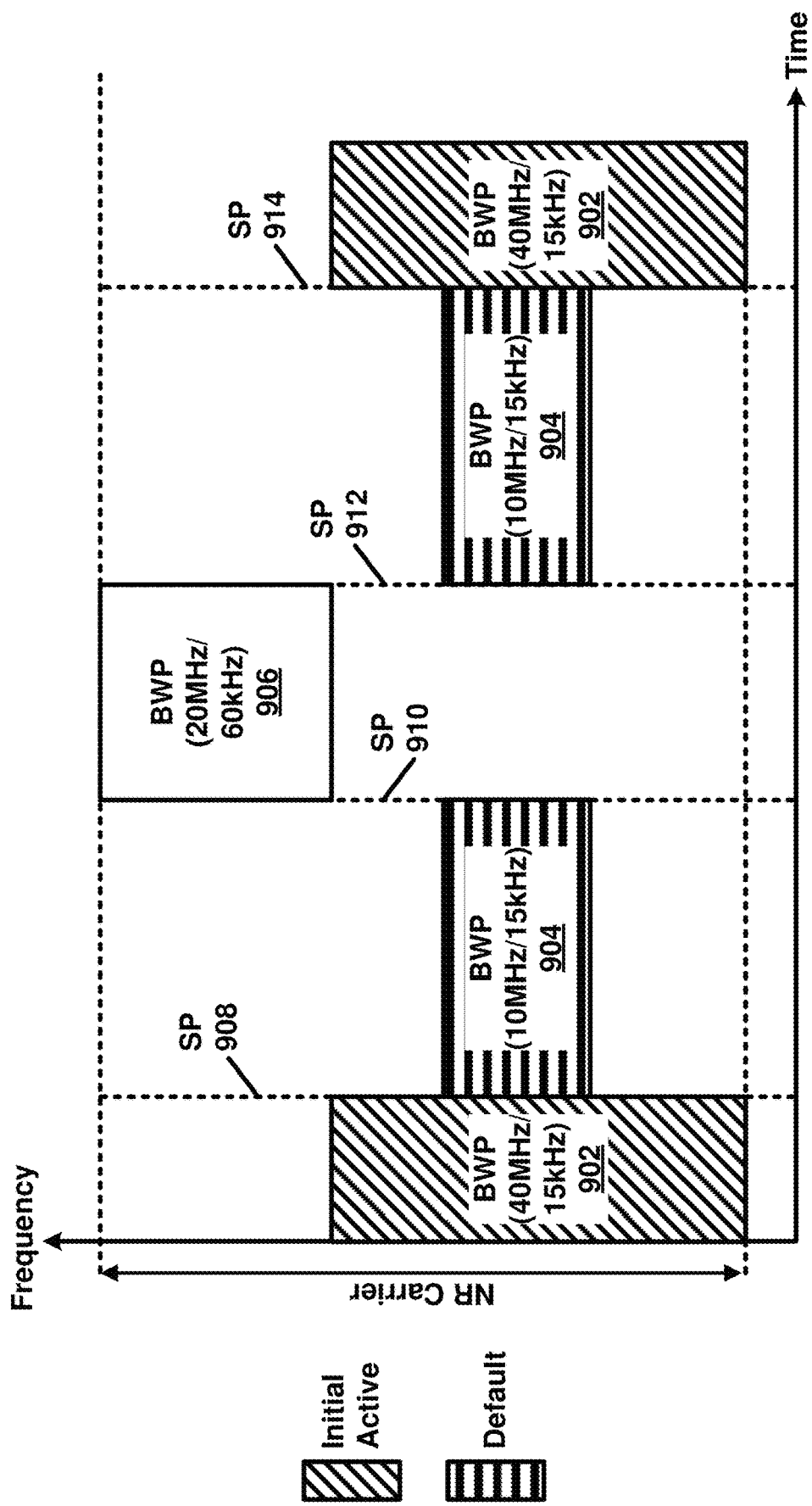
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
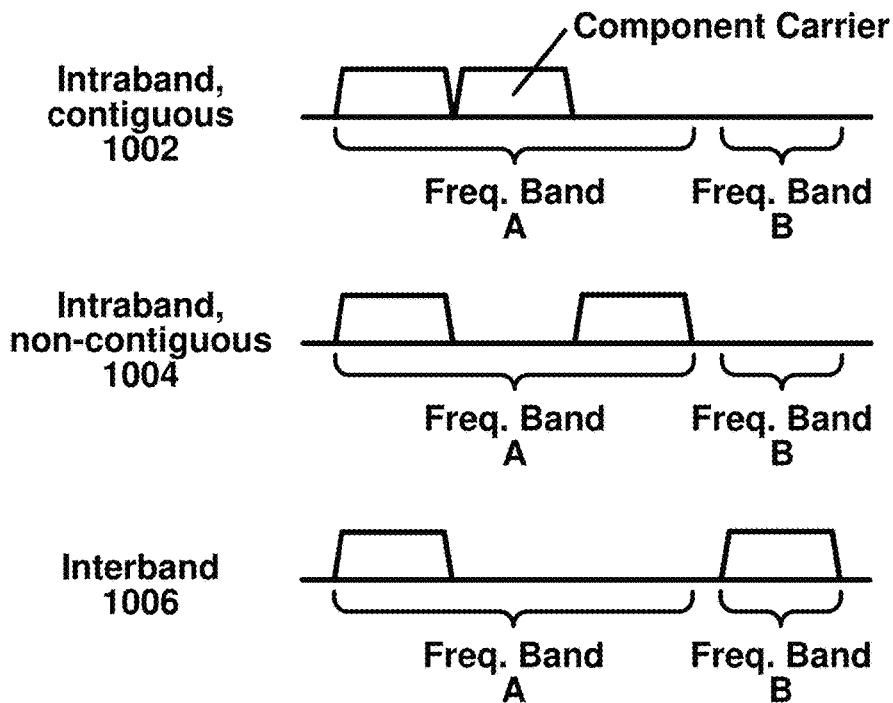
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
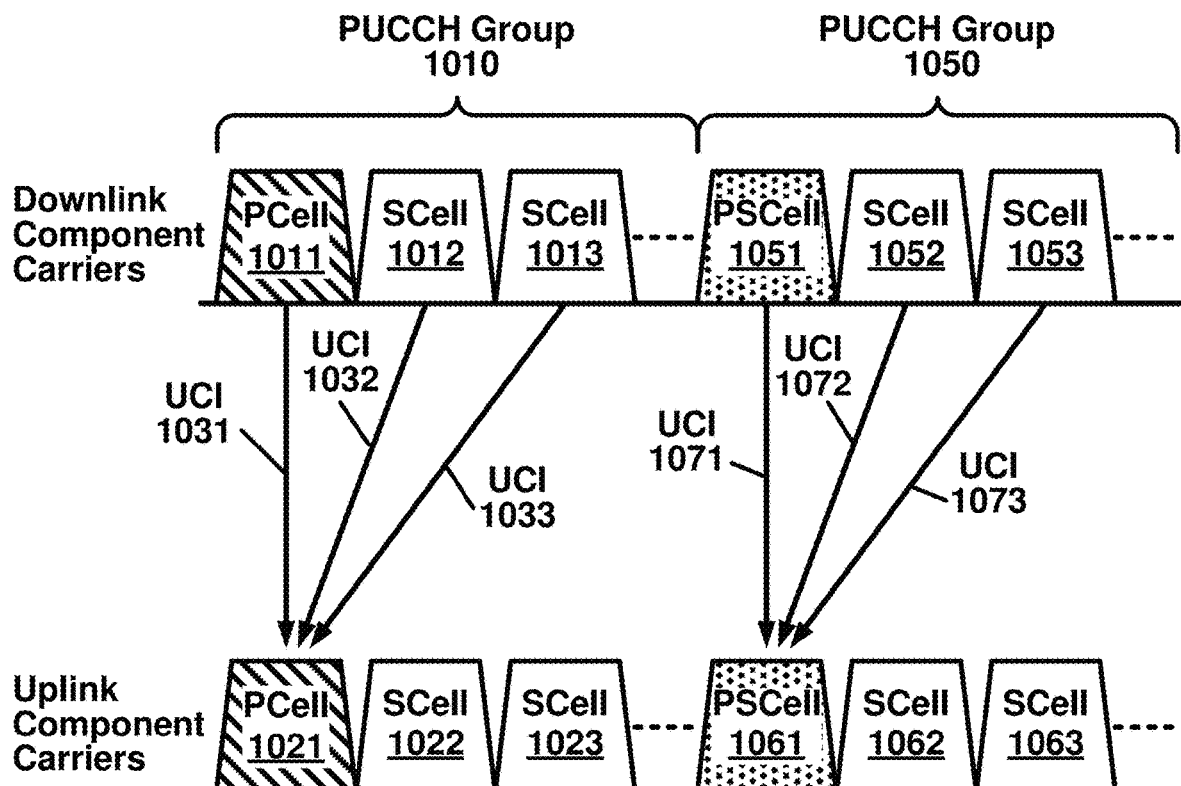
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
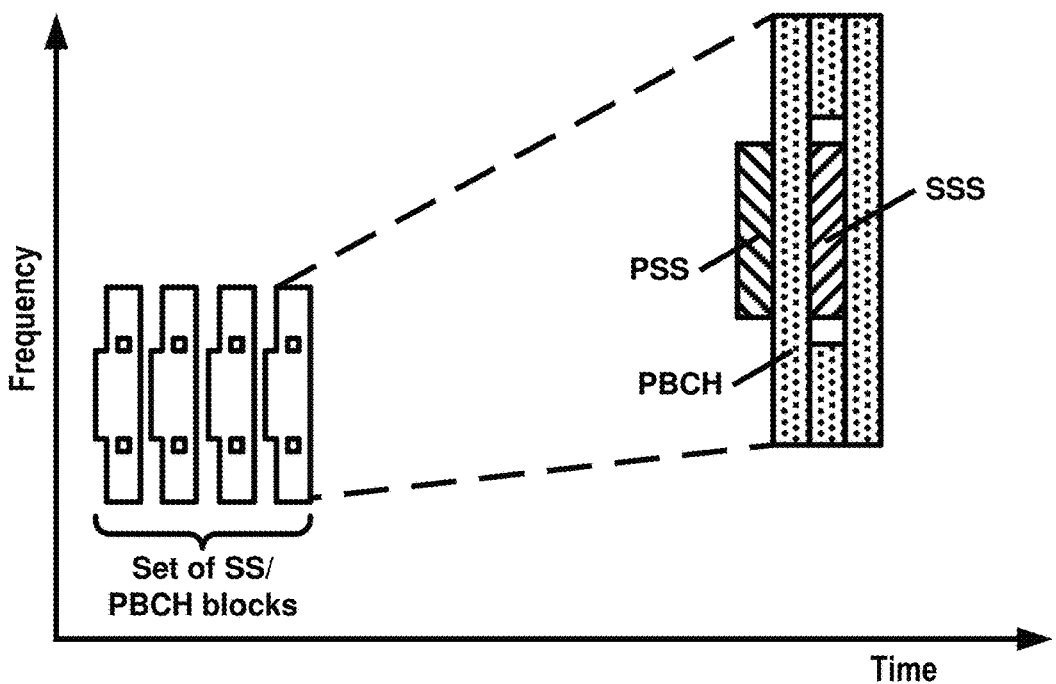
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
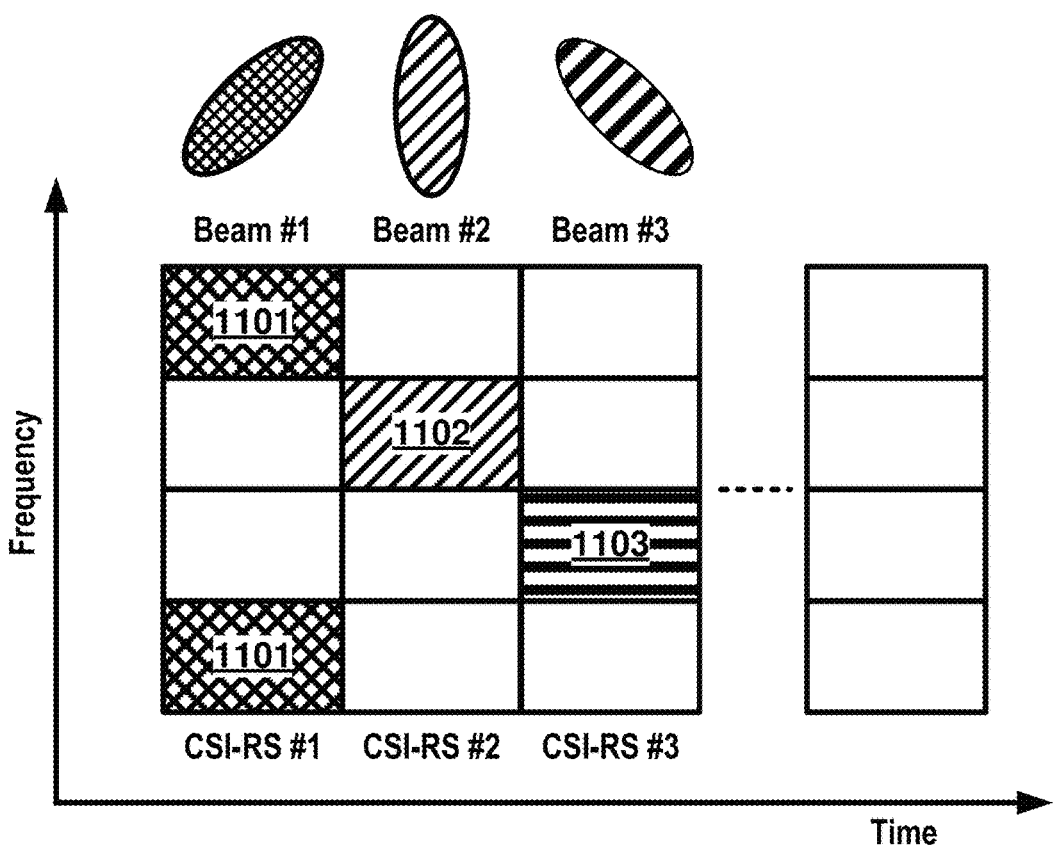
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
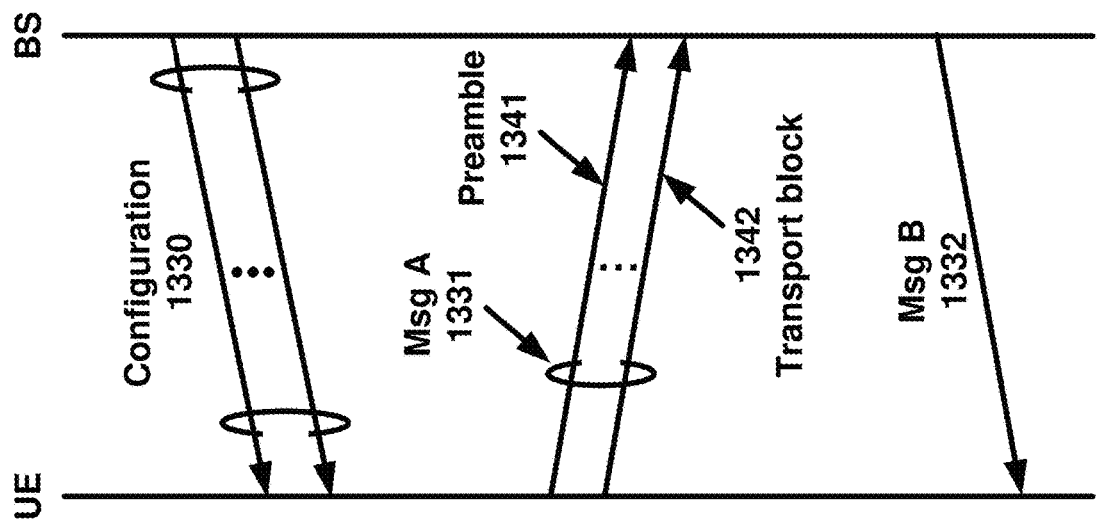
FIG. 13A, FIG. 13B, and FIG. 13C respectively illustrate a four-step contention-based random access procedure, a two-step contention-free random access procedure, and another two-step random access procedure.
Figure 13B:
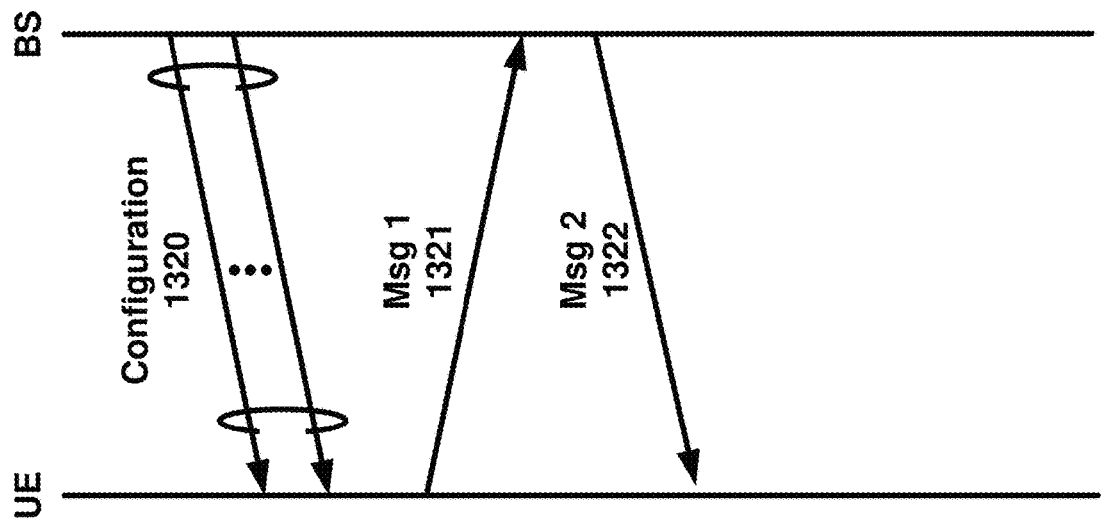
Figure 13A:
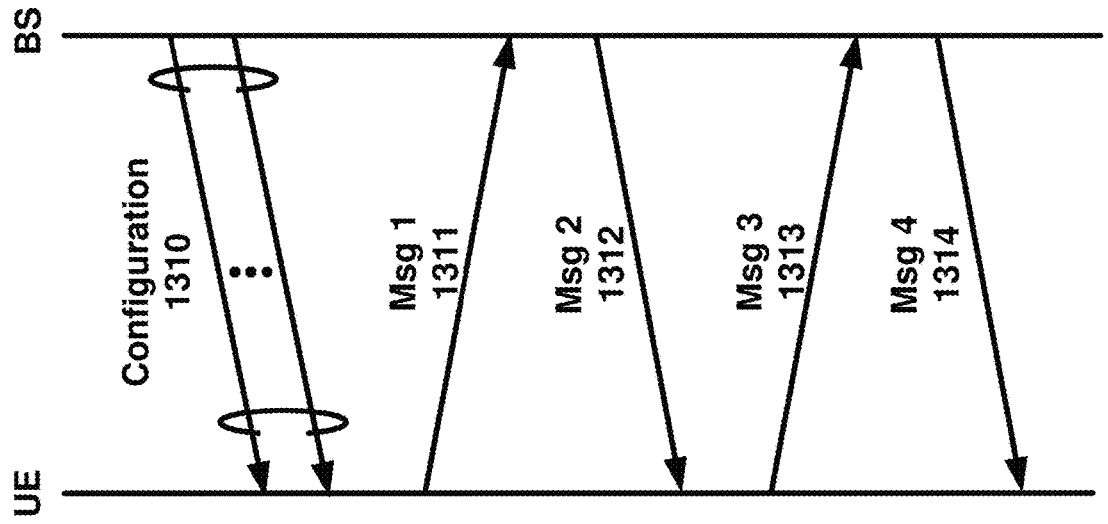

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., $0 \le s\_id < 14$), t_id may be an index of a first slot of the PRACH occasion in a system frame (e.g., $0 \le t\_id < 80$), f_id may be an index of the PRACH occasion in the frequency domain (e.g., $0 \le f\_id < 8$), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
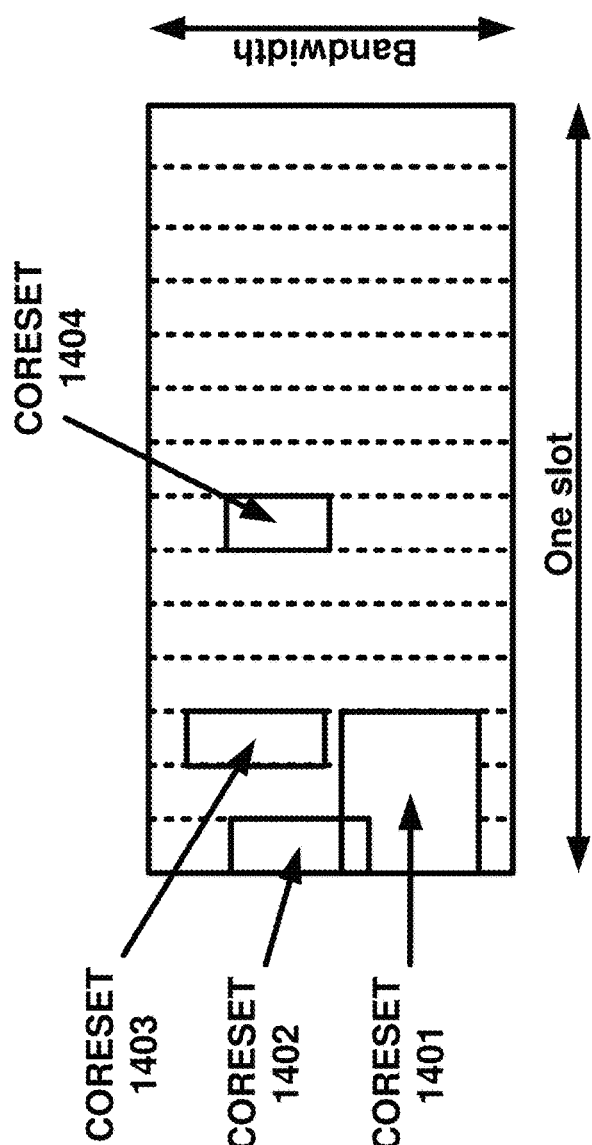
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
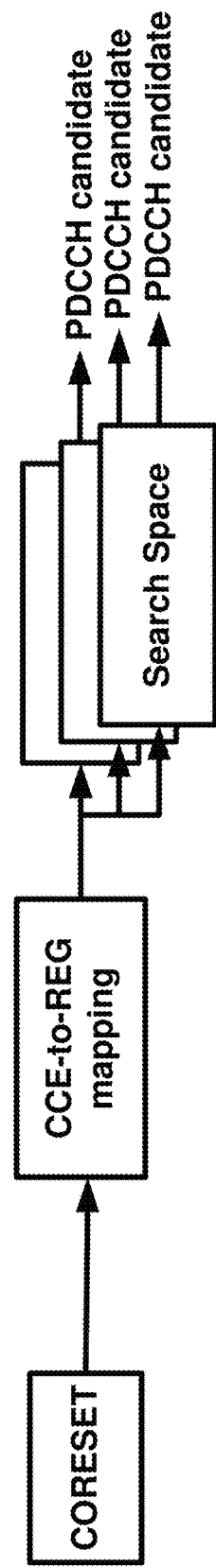
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
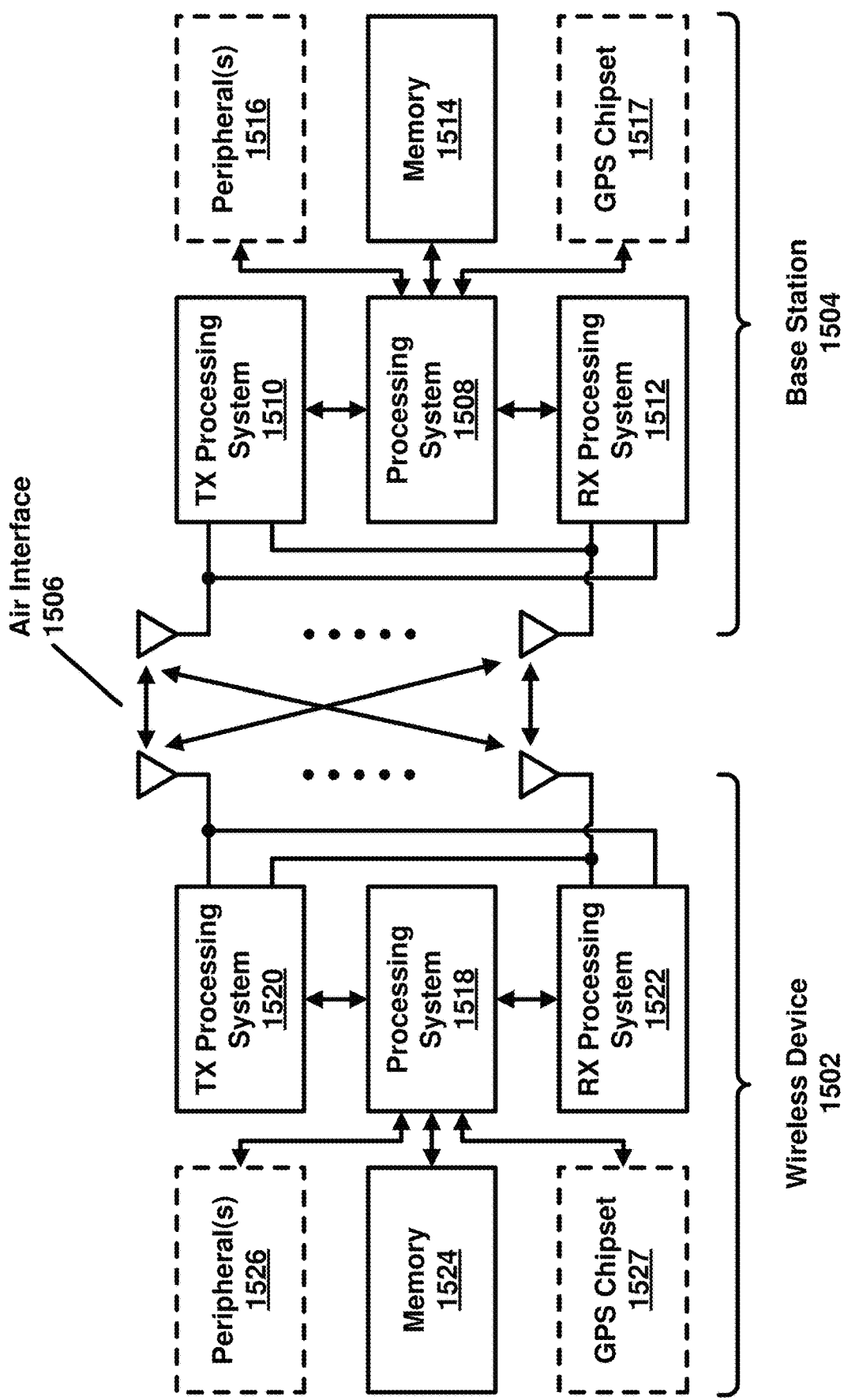
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

The hybrid-ARQ (hybrid automatic repeat request, HARQ) mechanism in the MAC layer targets very fast transmissions. A wireless device may provide feedback on success (e.g., an ACK) or failure (e.g., a NACK) of a downlink transmission (e.g., a PDSCH) to a base station for each scheduled/candidate transport block. A HARQ-ACK information bit value of 0 represents a negative acknowledgement (NACK) while a HARQ-ACK information bit value of 1 represents a positive acknowledgement (ACK).

It may be possible to attain a very low error rate probability of the HARQ feedback, which may come at a cost in transmission resources such as power. For example, a feedback error rate of 0.1-1% may be reasonable, which may result in a HARQ residual error rate of a similar order. This residual error rate may be sufficiently low in many cases. In some services requiring ultra-reliable delivery of data with low latency, e.g., URLLC, this residual error rate may not be tolerable. In such cases, the feedback error rate may be decreased and an increased cost in feedback signaling may be accepted, and/or additional retransmissions may be performed without relying on feedback signaling, which comes at a decreased spectral efficiency.

HARQ protocol may be a primary way of handling retransmissions in a wireless technology, e.g., NR. In case of an erroneously received packet, a retransmission may be required. Despite it not being possible to decode the packet, a received signal may still contain information, which may be lost by discarding the erroneously received packet. HARQ protocol with soft combining may address this shortcoming. In HARQ with soft combining, the wireless device may store the erroneously received packet in a buffer memory, and later combine the received packet with one or more retransmissions to obtain a single, combined packet/transport block that may be more reliable than its constituents. Decoding of the error-correction code operates on the combined signal. Retransmissions of codeblock groups (CBGs) that form a transport block may be handled by the physical layer and/or MAC layer.

The HARQ mechanism typically comprises multiple stop-and-wait protocols, each operating on a single transport block. In a stop-and-wait protocol, a transmitter stops and waits for an acknowledgment after each transmitted transport block. This protocol requires a single bit indicating positive or negative acknowledgment of the transport block; however, the throughput is low due to waiting after each transmission. Multiple stop-and-wait processes may operate in parallel, e.g., while waiting for acknowledgment from one HARQ process, the transmitter may transmit data of another HARQ process. The multiple parallel HARQ processes may form a HARQ entity, allowing continuous transmission of data. A wireless device may have one HARQ entity per carrier. A HARQ entity may support spatial multiplexing of more than four layers to a single device in the downlink, where two transport blocks may be transmitted in parallel on the same transport channel. The HARQ entity may have two sets of HARQ processes with independent HARQ acknowledgments.

A wireless technology may use an asynchronous HARQ protocol in the downlink and/or uplink, e.g., the HARQ process which the downlink and/or uplink transmission relates to, may be explicitly and/or implicitly signaled. For example, the downlink control information (DCI) scheduling a downlink transmission may signal the corresponding HARQ process. Asynchronous HARQ operation may allow dynamic TDD operation, and may be more efficient when operating in unlicensed spectra, where it may not be possible to guarantee that scheduled radio resources are available at the time for synchronous retransmissions.

Large transport block sizes may be segmented into multiple codeblocks prior to coding, each with its own CRC, in addition to an overall TB CRC. Errors may be detected on individual codeblocks based on their CRC, as well as on the overall TB. The base station may configure the wireless device with retransmissions based on groups of codeblocks, e.g., codeblock groups (CBGs). If per-CBG retransmission is configured, feedback is provided per CBG. A TB may comprise of one or more CBGs. A CBG that a codeblock belongs to may be determined based on an initial transmission and may be fixed.

In the downlink, retransmissions may be scheduled in a same way as new data. For example, retransmissions may be scheduled at any time and any frequency location within a downlink cell and/or an active downlink BWP of a cell. A downlink scheduling assignment may contain necessary HARQ-related control signaling, e.g., HARQ process number; new-data indicator (NDI); CBG transmit indicator (CBGTI) and CBG flush indicator (CBGFI) in case per-CBG retransmission is configured; and/or information to schedule the transmission of the acknowledgment (ACK/NACK) in an uplink (e.g., a PUCCH), such as timing and resource indication information.

Upon receiving a downlink scheduling assignment in the DCI, the wireless device tries to decode the TB, e.g., after soft combining with previous attempts/receptions of the TB. Transmissions and retransmissions may be scheduled in a same framework. The wireless device may determine whether the transmission is a new transmission or a retransmission based on the NDI field in the DCI. An explicit NDI may be included for the scheduled TB as part of the scheduling information in the downlink. The NDI field may comprise one or more NDI bits per TB (and/or CBG). An NDI bit may be toggled for a new transmission, and not toggled for a retransmission. In case of a new transmission, the wireless device flushes soft buffer corresponding to the new transmission before receiving/storing the new transmission. In case of a retransmission, the wireless device may perform a soft combining of the received data with stored data in the soft buffer for the corresponding HARQ process based on the downlink scheduling assignment.

A time gap/interval/offset (e.g., K1) from a downlink data reception/resource to a transmission of a HARQ ACK/NACK corresponding to the downlink data may be fixed, e.g., multiple subframes/slots/symbols (e.g., three ms, 4 slots). This scheme with pre-defined timing instants for ACK/NACK may not blend well with dynamic TDD and/or unlicensed operation. A more flexible scheme, capable of dynamically controlling the ACK/NACK transmission timing may be adopted. For example, a DL scheduling DCI may comprise a PDSCH-to-HARQ_feedback timing field to control/indicate the transmission timing of an ACK/NACK corresponding to a data scheduled by the DL scheduling DCI in an uplink transmission (e.g., PUCCH). The PDSCH-to-HARQ_feedback timing field in the DCI may be used as an index of one or more indexes of K1 values in a pre-defined and/or RRC-configured table (e.g., a HARQ timing table). The K1 value may provide information of a gap/interval/offset between a second time to transmit the HARQ ACK/NACK relative to a first time of the reception of data (e.g., physical DL shared channel (PDSCH)).

Figure 17:
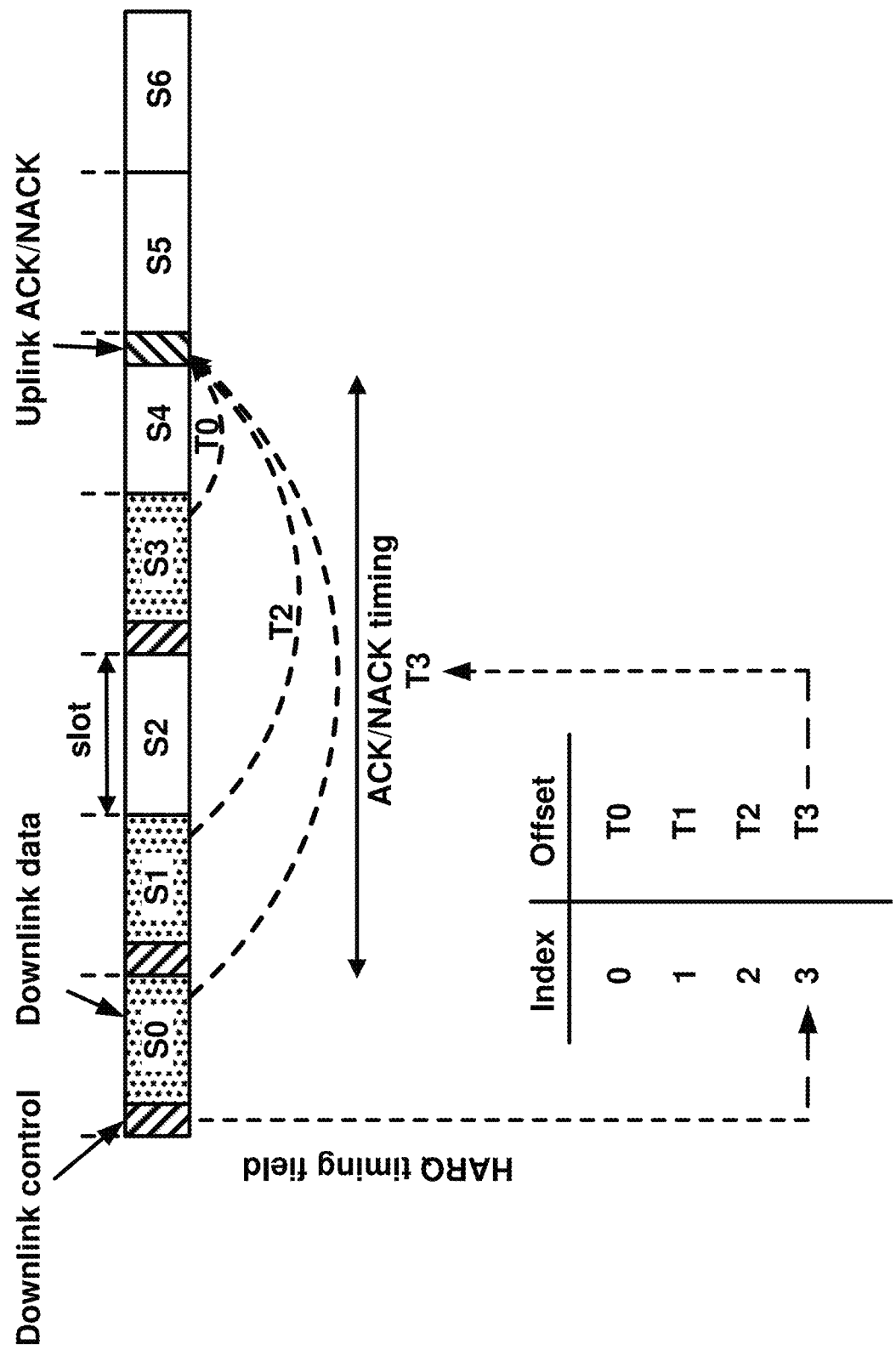
FIG. 17 illustrates an example of HARQ feedback timing determination, according to some embodiments.

FIG. 17 illustrates an example of HARQ feedback timing determination, according to some embodiments. In this example, three DCIs are received in slots S0, S1, and S3 that schedule three downlink assignments in the same slots. In each downlink assignment, different HARQ feedback timing indices are indicated, e.g., in S0: 3, in S1: 2, and in S3: 0. The indicated indices (PDSCH-to-HARQ_feedback timing field) point to the HARQ timing table, e.g., for S0: T3 in indicated that points to S4 for transmission of the uplink ACK/NACK, for S1: T2 in indicated that points to S4 for transmission of the uplink ACK/NACK, for S3: T0 in indicated that points to S4 for transmission of the uplink ACK/NACK. As a result, all three downlink assignments are acknowledged in the same slot, S4. The wireless device multiplexes the three acknowledgments and transmits the three acknowledgements in slot S4.

A wireless devices may support a baseline processing time/capability. Some wireless devices may support additional aggressive/faster processing time/capability. A wireless device may report to a base station a processing capability, e.g. per sub-carrier spacing.

A wireless device may determine a resource for HARQ ACK/NACK transmission, e.g. frequency resource and/or PUCCH format and/or code domain, based on a location of a PDCCH (e.g., a starting control channel element (CCE) index) scheduling the transmission. The scheduling PDCCH/DCI may comprise a field, e.g., PUCCH resource indicator (PRI) field, that indicates a frequency resource for an uplink transmission of the HARQ ACK/NACK transmission. For example, the PRI field may be an index selecting one of a plurality of pre-defined and/or RRC-configured PUCCH resource sets.

A wireless device may multiplex a plurality of HARQ feedback bits that are scheduled for transmission in the uplink at a same time/slot, for example, in a carrier aggregation scenario and/or when per-CBG retransmission is configured. The wireless device may multiplex multiple ACK/NACK bits of multiple TBs and/or CBGs into one multi-bit HARQ feedback message/codebook. The multiple ACK/NACK bits may be multiplexed based on a semi-static codebook and/or a dynamic codebook. A base station, via RRC configuration, may configure either the semi-static codebook or the dynamic codebook for a cell configured with PUCCH resources (e.g., a primary cell, a PUCCH cell).

The semi-static codebook may be viewed as a matrix consisting of a time domain dimension and a component-carrier (and/or CBG and/or MIMO layer) dimension, both of which may be semi-statically configured and/or pre-defined. A size of the time domain dimension may be given by a maximum and/or a minimum HARQ ACK/NACK timing indicated in the pre-defined and/or RRC-configured table of HARQ ACK/NACK timings. A size of the component-carrier domain may be given by a number of simultaneous TBs and/or CBGs across all component carriers. A codebook size may be determined based on the time domain dimension and the component-carrier dimension for a semi-static codebook, regardless of actual scheduled transport blocks/PDSCHs. A number of bits to transmit in a HARQ feedback/report is determined based on one or more RRC configuration parameters. An appropriate format (e.g., PUCCH format) for uplink control signaling may be selected based on a codebook size (e.g., a number of HARQ ACK/NACK bits). Each entry of the matrix may represent a decoding outcome, e.g. positive (ACK) or negative (NACK) acknowledgments, of the corresponding transmission. One or more of the entries of the codebook matrix may not correspond to a downlink transmission opportunity (e.g., a PDSCH occasion), for which a NACK is reported. This may increase a codebook robustness, e.g., in case of missed downlink assignments, and the base station may schedule a retransmission of the missed TB/CBG. The size of the semi-static codebook may be very large.

The dynamic codebook may be used to address the issue with the potentially large size of the semi-static codebook. With the dynamic codebook, only the ACK/NACK information of scheduled assignments, including one or more semi-persistent scheduling, may be included in the report, e.g., not all carriers as in semi-static codebook. A size of the dynamic codebook may be dynamically varying, e.g., as a function of a number of scheduled carriers and/or as a function of a number of scheduled transport blocks. To maintain a same understanding of the dynamic codebook size, which is prone to error in the downlink control signaling, a downlink assignment index (DAI) may be included in the scheduling DCI. The DAI field may comprise a counter DAI (cDAI) and a total DAI (tDAI), e.g., in case of carrier aggregation. The counter DAI in the scheduling DCI indicates a number of scheduled downlink transmissions (PDSCH reception(s)/SPS PDSCH release(s)) up to the point the DCI was received, in a carrier first, PDCCH monitoring occasion index second manner. The total DAI in the scheduling DCI indicates a total number of scheduled downlink transmissions across all carriers up to the point the DCI was received. A highest cDAI at a current time is equal to the tDAI at this time.

In an example, a wireless device may be configured with dynamic HARQ feedback mode or HARQ-ACK codebook determination. Based on the dynamic HARQ feedback mode, the wireless device may multiplex one or more HARQ-ACK feedback bits based on a PDSCH scheduled by a DCI format that does not include/comprise a counter DAI field. In an example, a wireless device may determine monitoring occasions for receiving DCI(s) of PDCCH(s) with one or more DCI formats scheduling PDSCH or SPS PDSCH release via an active downlink BWP of a serving cell. The wireless device may determine one or more HARQ-ACK/HARQ feedback bits in a same PUCCH in a slot n based on (1) a value of a PDSCH-to-HARQ feedback timing indicator field of a DCI format scheduling a PDSCH reception or a SPS PDSCH release; and (2) a slot offsets or timing offsets between a PDCCH/DCI and a PDSCH (e.g., K0) provided by a time domain resource assignment filed in a DCI format scheduling a PDSCH or a SPS PDSCH release; and (3) a number of slot aggregations for the PDSCH or the SPS PDSCH release.

For example, a wireless device may determine a set of PDCCH monitoring occasions for one or more DCI format that may schedule a PDSCH reception or a SPS PDSCH release. A PDCCH monitoring occasion may be a monitoring occasion in a slot, in a min-slot, a sub-frame, a frame or a span. The set of PDCCH monitoring occasions may comprise one or more monitoring occasions based on one or more search spaces of an active DL BWPs of configured serving cells. The one or more monitoring occasions may be indexed in an ascending order of a start time of a search space associated or determining a PDCCH monitoring occasion. A cardinality of the set of PDCCH monitoring occasions may be defined as a total number M of the one or more monitoring occasions. A value of a counter DAI field in one or more DCI formats may represent an accumulative number of {serving cell, PDCCH monitoring occasion}-pair(s) where PDSCH reception or SPS PDSCH release associated with the one or more DCI formats up to a current PDCCH monitoring occasion.

A base station may update (e.g., increment by 1) a counter DAI value for each PDCCH monitoring occasion to indicate accumulative number of PDSCH receptions and/or SPS PDSCH release up to the each PDCCH monitoring occasion. The wireless device may determine an order of a DCI, based on the counter DAI in each PDCCH monitoring occasion.

When a wireless device may support more than a PDSCH reception per each PDCCH monitoring occasion (e.g., PDSCH-Numerber-perMOperCell is larger than 1), the wireless device may order (e.g., list) one or more PDSCH reception starting time for a same {serving cell, PDCCH monitoring occasion} pair. The wireless device may then order (e.g., list out in an order) PDCCH monitoring occasion or PDSCH receptions based on a serving cell index. The wireless device may then order PDCCH monitoring occasion index (based on a starting time of PDCCH monitoring occasion). When a wireless device is provided with ACKNACKFeedbackMode=JointFeedback, a first coreset pool index may be ordered first than a second coreset pool index for a same serving cell.

Figure 18:
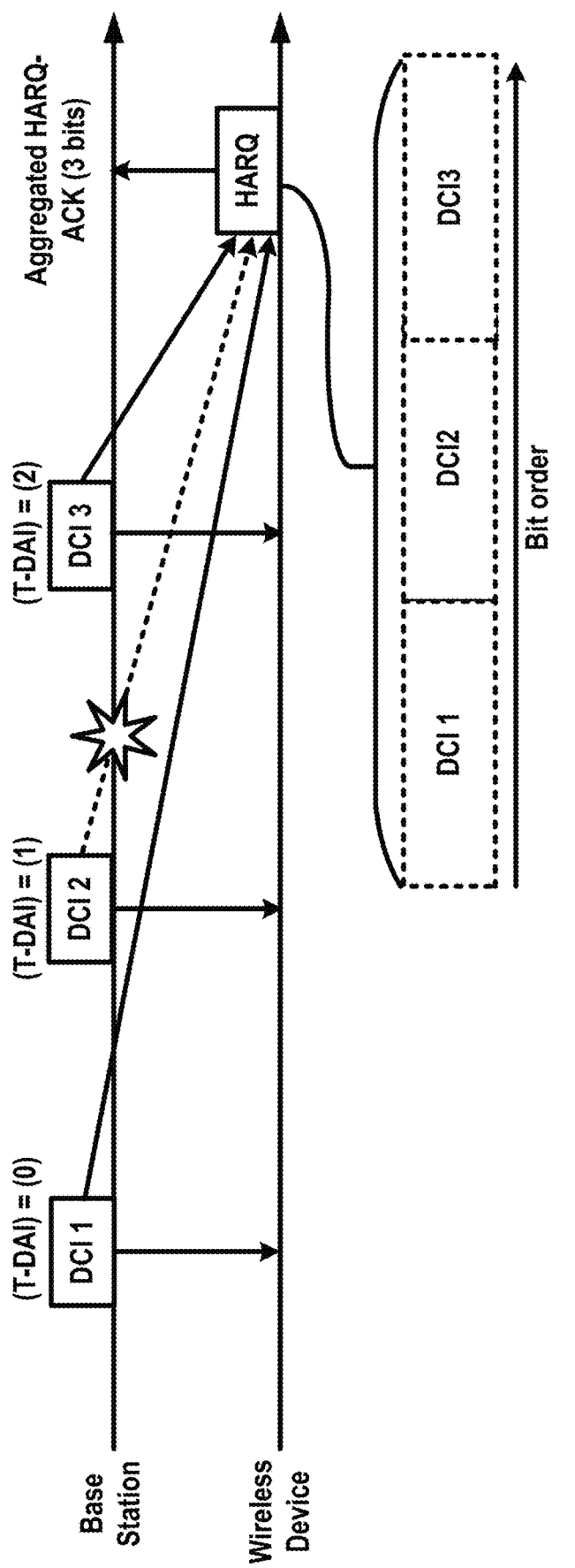
FIG. 18 illustrates an example of DAI indication by DCIs with a single serving cell, according to some embodiments.

FIG. 18 illustrates an example of DAI indication by DCIs with a single serving cell. In an example, a value of a total DAI may denote/represent a total number of {serving, PDCCH monitoring occasion}-pair(s) up to a current PDCCH monitoring occasion across one or more serving cells. FIG. 18 illustrates an example of a counter-DAI (C-DAI or DAI) and/or a total DAI (T-DAI) when a wireless device is configured with a single serving cell. For example, the wireless device may determine a first monitoring occasion (a left box), a second monitoring occasion (a middle box) and a third monitoring occasion (a right box) in FIG. 18. The wireless device may be scheduled/received DCI(s) based on one or more DCI formats via monitoring occasions (e.g., the first monitoring occasion, the second monitoring occasion, the third monitoring occasion). For example, the wireless device may receive a first DCI (DCI 1) via the first monitoring occasion where the first DCI indicates a DAI=0 and/or a T-DAI=0. The base station may set the DAI=0 and/or the T-DAI=0. The wireless device may receive a third DCI (DCI 3) via the third monitoring occasion where the third DCI indicates a DAI=2 and/or a T-DAI=2. The first DCI and the third DCI may indicate a same PUCCH resource for HARQ feedback. The wireless device may generate a first HARQ feedback bit for a PDSCH or a SPS PDSCH release scheduled by the first DCI. The wireless device may generate a third HARQ feedback bit for a second PDSCH or a second SPS PDSCH release by the third DCI. The wireless device may not receive successfully a second DCI via the second monitoring occasion. The wireless device may determine a missed (e.g., failed to be received, failed in decoding, not received, failed) DCI (e.g., the second DCI) based on a DAI value of the third DCI. The wireless device may generate NACK (e.g., negative ACK) for a third PDSCH or a third SPS PDSCH release. For example, the third PDSCH or the third SPS PDSCH release may have been scheduled via the second DCI. The wireless device may not receive the third PDSCH or the third SPS PDSCH release as the second DCI has not been received successfully.

In the example of FIG. 18, the wireless device may generate 3 bits HARQ feedback bits, a first bit corresponding to the first DCI, a second bit for the second DCI and a third bit for the third DCI. The wireless device may determine a number of bits of a HARQ feedback/HARQ-ACK codebook based on a T-DAI or C-DAI of a most recent DCI for the PUCCH (or a PUCCH resource). The wireless device may transmit the HARQ feedback bits via the PUCCH or the PUCCH resource. The wireless device may determine a first HARQ-ACK bit for a PDSCH scheduled by the first DCI or the first DCI (e.g., DCI1) in a HARQ-ACK codebook. The wireless device may determine a NACK for a second HARQ-ACK bit as the wireless device misses the second DCI. The wireless device may determine a third HARQ-ACK bit (e.g., DAI=2) for the third DCI.

Figure 19:
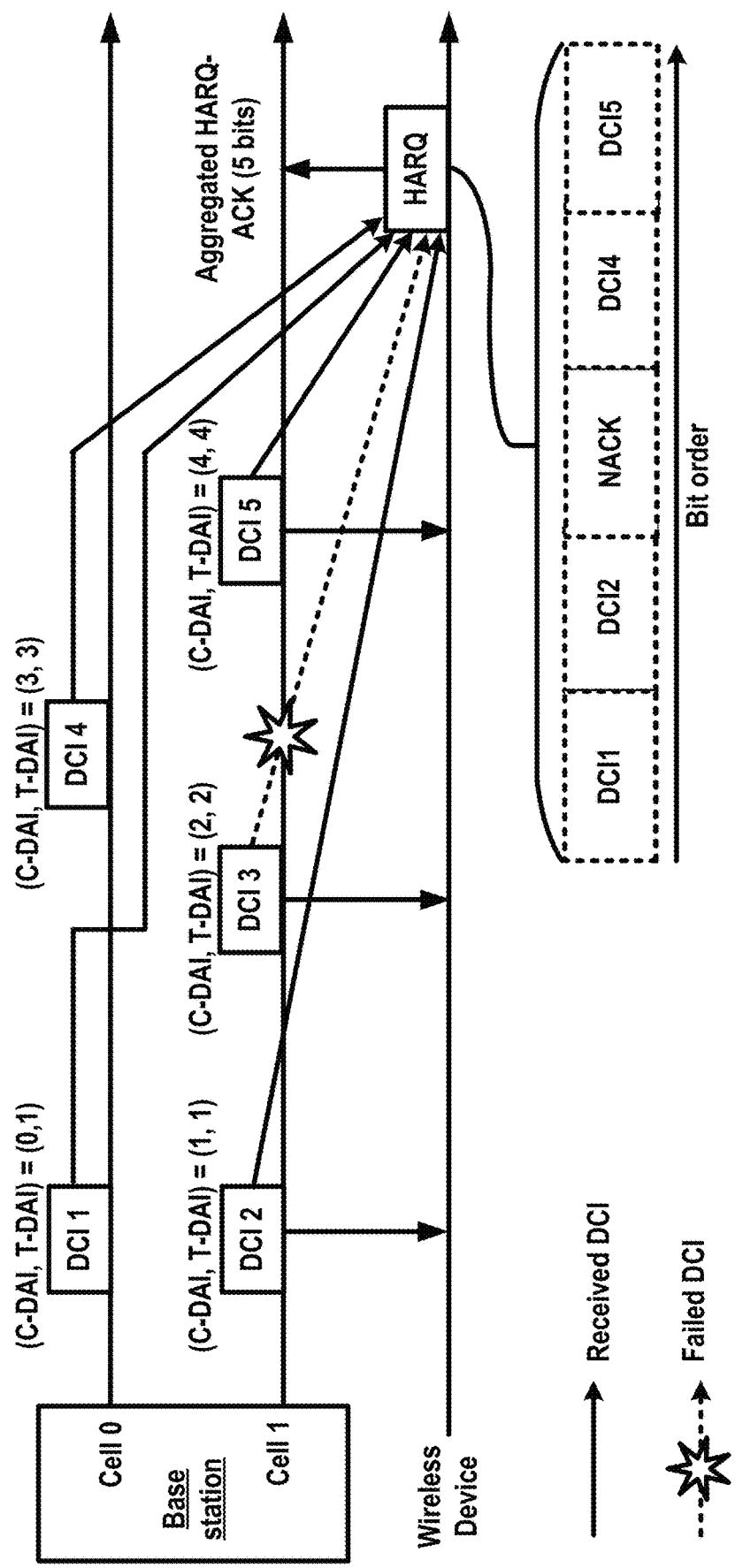
FIG. 19 illustrates an example of HARQ feedback/codebook determination for a wireless device configured with a plurality of serving cells, according to some embodiments.

FIG. 19 illustrates an example of HARQ feedback/codebook determination for a wireless device configured with a plurality of serving cells, according to some embodiments. For example, the wireless device may be configured with a first cell (Cell 0) and a second cell (Cell 1). For example, the wireless device may receive a first DCI via the first cell (DCI 1) that may indicate a DAI=0 and a T-DAI=1. The base station may determine a C-DAI (or DAI) and/or T-DAI for a DCI. The T-DAI may indicate a total number of PDCCH monitoring occasions and/or a number of DCIs, across all serving cells, up to a current PDCCH monitoring occasion. A first monitoring occasion of the first cell may overlap and may have a same starting time to a first monitoring occasion of the second cell. A base station may set the T-DAI of the first DCI being two. The base station may set a T-DAI of a second DCI (DCI 2) via the second cell. A DAI value of the second DCI may be set to 1 (e.g., counter DAI). For example, the base station may set the DAI value of the second DCI to 1. The wireless device may not receive successfully a third DCI (DCI3) that may indicate a T-DAI=2 and DAI=2. The wireless device may receive a fourth DCI (DCI4) with a T-DAI=3 and DAI=3. The wireless device may receive a fifth DCI (DCI5) with a T-DAI=4 and DAI=4.

A value of a T-DAI may be wrapped around (e.g., modulo operation, such as a modulo n, which may be expressed as a mode n or a % n) when it reaches a maximum value (e.g., n) or a threshold (e.g., a maximum value=4 based on 2 bits of C-DAI/T-DAI field, a maximum value=$2^K$ or $2^K-1$ where K is a number of bits used for a C-DAI or T-DAI field in a DCI format). The wireless device may determine HARQ-ACK bits as follows. For example, actual value of T-DAI and C-DAI vale may be 0 for the fifth DCI based on the wrapping up mechanism (e.g., 4 mod 4=0, 4% 4=0 when n is 4, an actual value may be determined based on modulo n, where n is $2^K$ with K bits used for a DAI

FIELD

For example, for each PDCCH monitoring occasion (e.g., a first PDCCH monitoring occasion is a first time when the wireless device may monitor a first monitoring occasion via the first cell and a first monitoring occasion via the second cell), the wireless device may determine a number of HARQ-ACK feedback bits for each serving cell based on a cell index (e.g., determine the first cell and then determine the second cell when an index of the first cell is lower than an index of the second cell). For example, a PDCCH monitoring occasion may indicate a starting time in a slot where a wireless device may start monitoring one or more PDCCH candidates via a monitoring occasion of a serving cell. For example, a PDCCH monitoring occasion may indicate a monitoring occasion determined/configured based on a search space configuration.

For example, the wireless device may determine a number of HARQ-ACK bits for a serving cell based on a DAI field of the each PDCCH monitoring occasion. For example, the wireless device may determine a bit index among HARQ-ACK bits to put ACK or NACK for a transport block or a SPS PDSCH release scheduled by a DCI for the serving cell, where the wireless device may receive the DCI via the each PDCCH monitoring occasion. The wireless device may determine a first HARQ-ACK bit for a transport block of the first cell at the first PDCCH monitoring occasion. The wireless device may determine a second HARQ-ACK bit for a transport block of the second cell at the first PDCCH monitoring occasion. The wireless device may move to a next PDCCH monitoring occasion which occurs after the first monitoring occasion but occur before other monitoring occasions.

In FIG. 19, the wireless device may determine a second monitoring occasion via the first cell as the wireless device may not detect any DCI via a second monitoring occasion via the second cell. The wireless device may determine a third HARQ ACK bit corresponding to a PDSCH or a SPS PDSCH release scheduled via the fourth DCI (DCI 4). The wireless device may move to a next PDCCH monitoring occasion, where the wireless device receives a DCI with a DAI value. For example, the wireless device may determine a third monitoring occasion via the second cell as the next PDCCH monitoring occasion. The wireless device may determine a fourth HARQ ACK bit corresponding to a PDSCH or a SPS PDSCH scheduled by the fifth DCI (DCI5). The wireless device may determine a total DAI value for a PUCCH resource, based on a last DCI received for the PUCCH resource. For example, the fifth DCI may be a last DCI that the wireless device receives for the PUCCH resource in FIG. 19. The fifth DCI indicates a T-DAI=4 that may indicate five DCIs have been scheduled up to the current PDCCH monitoring occasion.

The wireless device may determine a number of HARQ-ACK bits based on the T-DAI of the last DCI. The wireless device may determine an order (e.g., a bit order) of each DCI or a PDSCH scheduled by each DCI based on a C-DAI value of each DCI. For example, a bit order of the fourth DCI (DCI 4) is 3, the wireless device may place a HARQ-ACK bit for the fourth DCI in a bit with index 3 as shown in FIG. 19. The wireless device may determine NACK for a missed DCI between the second DCI and the fourth DCI. The wireless device may generate aggregated HARQ-ACK feedback by ascending order of a start time of a PDCCH monitoring occasion (e.g., the first DCI, the second DCI→(the third DCI→) the fourth DCI→the fifth DCI) and for each PDCCH monitoring occasion based on a cell index (e.g., the first cell→the second cell in the first monitoring occasion). The wireless device may determine a bit order of HARQ-ACK feedback for one or more DCIs/PDSCHs based on C-DAI/T-DAI values of the one or more DCIs.

The wireless device may determine a bitmap of ACK-NACK information. The bitmap of ACK-NACK information may comprise a HARQ-ACK codebook, where the HARQ-ACK codebook may comprise one or more HARQ-ACK sub-codebooks. For example. The bitmap of ACK-NACK information may comprise one or more HARQ-ACK codebooks. For example, the wireless device may generate a first bitmap for a first HARQ-ACK sub-codebook. The wireless device may generate a second bitmap for a second HARQ-ACK sub-codebook. For example, the wireless device may generate the first bitmap for a first HARQ-ACK codebook. The wireless device may generate the second bitmap for a second HARQ-ACK codebook. A PUCCH may comprise a HARQ-ACK codebook comprising one or more HARQ-ACK sub-codebooks. A PUCCH may comprise one or more HARQ-ACK codebooks.

For example, a wireless device may perform encoding based on a HARQ-ACK codebook. When a HARQ-ACK codebook comprises a plurality of HARQ-ACK sub-codebooks, the wireless device may append the plurality of HARQ-ACK sub-codebooks before performing encoding. Example embodiments may generate a plurality of HARQ-ACK sub-codebooks for a HARQ-ACK codebook. Example embodiments may generate a plurality of HARQ-ACK codebooks, where each HARQ-ACK codebook, of the plurality of HARQ-ACK codebooks, may correspond to a HARQ-ACK sub-codebook of the examples. In an example, a wireless device may generate a HARQ-ACK codebook comprising one or more HARQ-ACK sub-codebooks. The wireless device may encode the HARQ-ACK codebook and may transmit the encoded bits via a PUCCH resource. For example, a first HARQ-ACK sub-codebook (e.g., a codebook, a sub-codebook, a first HARQ-ACK codebook) may correspond to one or more downlink channels (e.g., PDSCH), where each downlink channel carries one or more transport blocks. A second HARQ-ACK sub-codebook may correspond to one or more second downlink channels (e.g., PDSCH), where each second downlink channel carries one or more code block groups (CBGs). In an example, the wireless device may determine a first C-DAI/T-DAI for the first HARQ-ACK sub-codebook. The wireless device may determine a second C-DAI/T-DAI for the second HARQ-ACK sub-codebook.

The existing technology defines frequency ranges for wireless operation. For example, NR Rel-15 and Rel-16 define two frequency ranges (FRs): FR1 spanning from 410 MHz to 7.125 GHz and FR2 spanning from 24.25 GHz to 52.6 GHz. Recent studies reveal a global availability of bands beyond the currently operational frequency ranges, e.g., in the 52.6 GHz to 71 GHz range. The proximity of the higher frequency range to FR2 and the imminent commercial opportunities for high data rate communication makes it compelling for wireless technologies to address operation (e.g., NR operation) in this frequency regime. For example, 3GPP has decided to extend FR2 operation up to 71 GHz, considering both licensed and unlicensed operation, with the adoption of one or more new numerologies (e.g., larger subcarrier spacings). These high frequency bands comprise unlicensed bands (e.g., unlicensed 60 GHz band). Existing procedures (e.g., LAA/NR-U defined procedures) for operation in unlicensed spectrum may be leveraged towards operation in these high frequency unlicensed bands. For channel access, both LBT mode and no-LBT mode may be supported to cover a wide range of use cases and regulatory requirements.

Supporting larger subcarrier spacings (e.g., 120 KHz, 240 KHz, 480 KHz, and 960 KHz) may require enhancements of some existing processing timelines; e.g., processing capability for PUSCH scheduled by RAR UL grant; dynamic SFI and SPS/CG cancellation timing; timeline for HARQ-ACK information in response to a SPS PDSCH release/dormancy; minimum time gap for wake-up and SCell dormancy indication; BWP switch delay; multi-beam operation timing (timeDurationForQCL, beamSwitchTiming, beam switch gap, beamReportTiming, etc.); timeline for multiplexing multiple UCI types; minimum of P_switch for search space set group switching; appropriate configuration(s) of scheduling time offsets such as k0 (for PDSCH), k1 (for HARQ), k2 (for PUSCH); PDSCH processing time (N1), PUSCH preparation time (N2), HARQ-ACK multiplexing timeline (N3); CSI processing time, Z1, Z2, and Z3, and CSI processing units; potential enhancements to CPU occupation calculation; related UE capability(ies) for processing timelines; minimum guard period between two SRS resources of an SRS resource set for antenna switching.

Due to higher processing requirements in these high frequency bands and much shorter slot durations, limitations to PDCCH monitoring may be considered. For example, increased minimum PDCCH monitoring unit may be supported to help with UE processing. Time domain scheduling enhancements for PDSCH/PUSCH may be supported, e.g., increasing minimum time-domain scheduling unit to be larger than one symbol, multi-PDSCH scheduled by one DCI (multi-TTI scheduling), mapping one TB to multiple slots (e.g., TTI bundling), etc. Scheduling each PUSCH and/or PDSCH via a separate DCI may waste resources, because many of the signaled parameters may be redundant across the respective DCIs. For example, multiple PDSCH/PUSCH (PxSCH) scheduling with a single DCI (using existing DCI formats or new DCI format(s)) may be supported to reduce scheduling overhead as well as PDCCH monitoring requirements in time domain.

For a wireless device and a serving cell, scheduling multiple PDSCHs by a single DL DCI and scheduling multiple PUSCHs by a single UL DCI may be supported. Each PDSCH/PUSCH may have individual/separate TB(s). Each PDSCH/PUSCH may be confined within a slot. A maximum number of M PDSCHs or PUSCHs may be scheduled with a single DCI (e.g., M=8 or 16 or 32). For multi-PUSCH/PDSCH scheduling, a TDRA table may be configured such that each row indicates up to X multiple PUSCHs/PDSCHs, which may be continuous and/or non-continuous in time domain. Each PUSCH/PDSCH may have a separate SLIV and mapping type. A number of the scheduled PUSCHs/PDSCHs (X) may be signaled by a number of indicated valid SLIVs in the row of the TDRA table signaled in the DCI, such that a maximum number of schedulable PUSCHs/PDSCHs by a DCI may be determined based on a row of the TDRA table indicating a maximum number of (valid) SLIVs. The TDRA table may be configured such that each row indicates up to X (e.g. 8) PUSCH/PDSCH groups. The PUSCH/PDSCH groups may be non-continuous. Each PUSCH/PDSCH group may have a separate SLIV, mapping type, and/or number of slots or PUSCHs/PDSCHs (N). Within each group, N PUSCHs/PDSHCs may occupy the same OFDM symbols indicated by the SLIV and mapping type. A number of scheduled PUSCHs/PDSCHs may be the sum of number of PUSCHs/PDSCHs in all PUSCH/PDSCH groups in the row of the TDRA table signaled in DCI (e.g., 1 to M).

For multi-PUSCH/PDSCH scheduling, CBG (re)transmission may or may not be supported. Ultra Reliable Low Latency Communications (URLLC) related fields such as priority indicator and/or open-loop power control parameter set may be indicated in the DCI for multiple scheduled PUSCHs/PDSCHs. For multiple PUSCHs/PDSCHs scheduled by a single DCI, NDI and/or RV may be signaled per PUSCH/PDSCH. A number of NDI bits and/or RV bits in the DCI may be determined based on the configured TDRA table. HARQ process ID signaled in the DCI may apply to a first scheduled PUSCH/PDSCH of the multiple PUSCHs/PDSCHs scheduled by the DCI. HARQ process ID may be incremented by 1 for subsequent PUSCHs/PDSCHs in the scheduled order (with modulo operation as needed). Same FDRA and/or MCS value indicated by the DCI may be applied to all scheduled PUSCHs/PDSCHs.

For a DCI scheduling multiple PDSCHs, a slot offset k0 (indicated by the TDRA field in the DCI) may indicate a gap between a slot of the scheduling DCI (e.g., the PDCCH reception slot) and a first slot of the multiple slots of PDSCHs scheduled by the DCI. For example, k0 may indicate the slot offset between the DCI and an earliest PDSCH scheduled by the DCI.

For multi-PDSCH scheduling, multiple HARQ-ACKs corresponding to the multi-PDSCHs may be fed back. For a DCI scheduling multiple PDSCHs, HARQ-ACK information corresponding to PDSCHs scheduled by the DCI may be multiplexed in a single PUCCH in a first slot. The first slot may be determined based on a first offset, K1. The first offset may be indicated by the DCI, e.g., by a PDSCH-to- HARQ_feedback timing indicator field in the DCI. The first offset may be indicated by RRC signaling, e.g., provided by dl-DataToUL-ACK if the PDSCH-to-HARQ_feedback timing indicator field is not present in the DCI. The first offset (K1) may indicate a slot offset between a slot of a last PDSCH scheduled by the DCI and a slot carrying the HARQ-ACK information corresponding to the scheduled PDSCHs.

Figure 20:
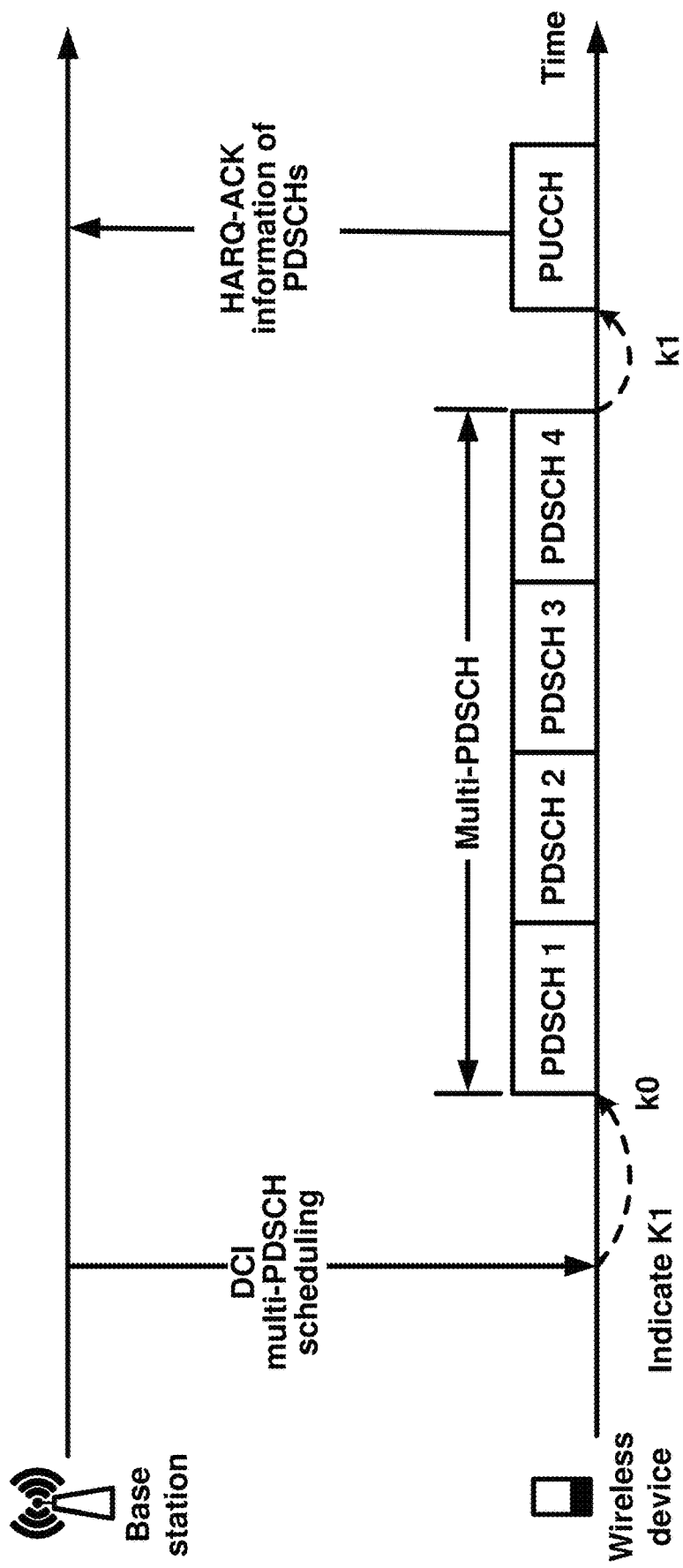
FIG. 20 illustrates an example of HARQ-ACK transmission associated with a DCI scheduling multiple PDSCHs, according to some embodiments.

FIG. 20 illustrates an example of HARQ-ACK transmission associated with a DCI scheduling multiple PDSCHs, according to some embodiments. As shown in FIG. 20, the DCI indicates a k0 slot offset and a k1 slot offset. The wireless device determines a first slot associated with a first PDSCH of the multiple scheduled PDSCHs (PDSCH 1) by applying the k0 slot offset to a slot where the DCI is received. The wireless device determines a number of scheduled PDSCHs based on the DCI, e.g., the TDRA field in the DCI. In this figure, the wireless device determines four PDSCHs scheduled by the DCI. The multiple PDSCHs may be scheduled in one or more slots starting from the first slot indicated by the k0 slot offset. The multiple PDSCHs may be in consecutive slots. The multiple PDSCHs may be continuous and/or discontinuous, e.g., a non-zero gap may or may not be between adjacent PDSCHs scheduled by the DCI. The wireless device may determine a second slot for HARQ-ACK transmission of the multiple PDSCHs via a PUCCH based on the k1 slot offset. The wireless device may apply the k1 slot offset to a slot of the last scheduled PDSCH (PDSCH 4) to determine the second slot. The wireless device may transmit HARQ-ACK information associated with all the scheduled PDSCHs via the PUCCH resource in the second slot.

A PDSCH processing time may be considered, e.g., a first symbol of the PUCCH comprising the HARQ-ACK information of PDSCHs scheduled by the DCI, may not start earlier than a time gap after a last symbol of a PDSCH reception associated with the HARQ-ACK information (e.g., the last PDSCH). The time gap may be given by the UE PDSCH processing capability in the corresponding frequency band.

The UE may be configured with multi-PDSCH scheduling and Type-2 (dynamic) HARQ-ACK codebook. The UE may generate Type-2 HARQ-ACK codebook corresponding to a DCI that can schedule multiple PDSCHs. The DCI, scheduling multiple PDSCHs, may comprise a counter DAI and/or a total DAI field. In a first example, the counter DAI and/or the total DAI may be counted per DCI (also referred to as Alt 1). For example, RRC configuration may comprise at least one parameter indicating that the counter DAI and/or the total DAI are counted per DCI.

The Type-2 HARQ-ACK codebook, for a PUCCH cell group, may comprise two (or more) sub-codebooks, e.g., if multi-PDSCH scheduling is configured for at least one serving cell in the PUCCH cell group and/or DAI counting per DCI is configured and/or RRC indicates a first value for a first parameter. For example, the UE may generate a first HARQ-ACK sub-codebook and a second HARQ-ACK sub-codebook.

The first HARQ-ACK sub-codebook may comprise HARQ-ACK information of/corresponding to one or more DCIs that each schedule a single PDSCH. For example, the one or more DCIs may be configured with TDRA table containing rows each with a single SLIV (e.g., RRC configuration indicates single-PDSCH scheduling is configured for the DCI format). For example, the one or more DCIs may be configured with TDRA table containing at least one row with multiple (valid) SLIVs (e.g., RRC configuration indicates multiple-PDSCH scheduling is configured for the DCI format), and each of the one or more DCIs may schedule a single PDSCH (e.g., indicated via the TDRA field in the one or more DCIs). The one or more DCIs may not be configured with CBG-based scheduling.

The second HARQ-ACK sub-codebook may comprise HARQ-ACK information of/corresponding to one or more DCIs that each schedule multiple PDSCHs (e.g., multi-PDSCH scheduling DCIs). For example, the one or more DCIs may be configured with TDRA table, by RRC configuration parameters, comprising at least one row with multiple (valid) SLIVs. Each of the one or more DCIs may comprise a TDRA field indicating that multiple PDSCHs are scheduled.

The UE may generate a fixed number of HARQ-ACK information bits corresponding to each of the one or more DCIs in the second HARQ-ACK sub-codebook, e.g., to align the size of HARQ-ACK feedback corresponding to different DCIs, such that if a DCI is missed, the UE and the BS have a mutual understanding of the HARQ-ACK codebook based on the alignment. For example, the number of HARQ-ACK bits corresponding to each DAI of the second sub-codebook (for multi-PDSCH scheduling DCIs) may depend on a first number. For example, the first number may be a configured number. For example, the first number may be a maximum configured number of schedulable PDSCHs by/for multi-PDSCH scheduling DCIs across serving cells belonging to a same PUCCH cell group (M). For example, the RRC configured TDRA table for the multi-PDSCH scheduling DCIs across the serving cells may determine the number of HARQ-ACK bits per DAI (per DCI). For example, the number of HARQ-ACK bits corresponding to each DAI (DCI) in the second sub-codebook and/or the size of the second sub-codebook may not depend on the number of actually scheduled PDSCHs by the corresponding DCI, e.g., the number of HARQ-ACK bits per DAI (DCI) may be fixed as the maximum configured number of PDSCHs that a multi-PDSCH scheduling DCI can/may schedule (M).

The BS may indicate counter DAI and/or total DAI corresponding to the first sub-codebook and the second sub-codebook separately/independently. For example, first DCIs scheduling single PDSCH, associated with the first HARQ-ACK cub-codebook, may comprise first c-DAI and/or t-DAI incrementing independently from second c-DAI and/or t-DAI incrementing of second DCIs scheduling multiple PDSCHs and/or CBGs, associated with the second HARQ-ACK sub-codebook. For example, first DAI counters and second DAI counters may be separate.

In an example, the first HARQ-ACK sub-codebook may comprise HARQ-ACK bits for two PDSCHs scheduled by a multi-PDSCH scheduling DCI.

In an example, the second HARQ-ACK sub-codebook may comprise HARQ-ACK information of/corresponding to one or more DCIs each scheduling CBG-based PDSCH(s). In an example, the Type-2 HARQ-ACK codebook may comprise a third HARQ-ACK sub-codebook comprising HARQ-ACK information of/corresponding to one or more DCIs each scheduling CBG-based PDSCH(s). The one or more DCIs may be configured with CBG-based scheduling. For example, the UE may be configured with CBG for at least one serving cell in the PUCCH cell group.

Multi-PDSCH DCI may refer to a DL DCI where at least one entry of the TDRA table associated with the DCI allows scheduling more than one PDSCH.

In an example, time domain bundling may be configured for HARQ-ACK information bits of multi-PDSCH scheduling DCIs. For example, the UE may generate one HARQ- ACK bit per bundle, wherein a bundle may comprise two or more PDSCHs scheduled by a DCI. For example, all ACK/NACK bits may be bundled (e.g., based on a logical AND/OR function) into a single bit per DCI. In an example, the UE may generate a single HARQ-ACK sub-codebook comprising HARQ-ACK information of DCIs scheduling single PDSCH and DCIs scheduling multiple PDSCHs, e.g., if time domain bundling is configured.

Figure 21:
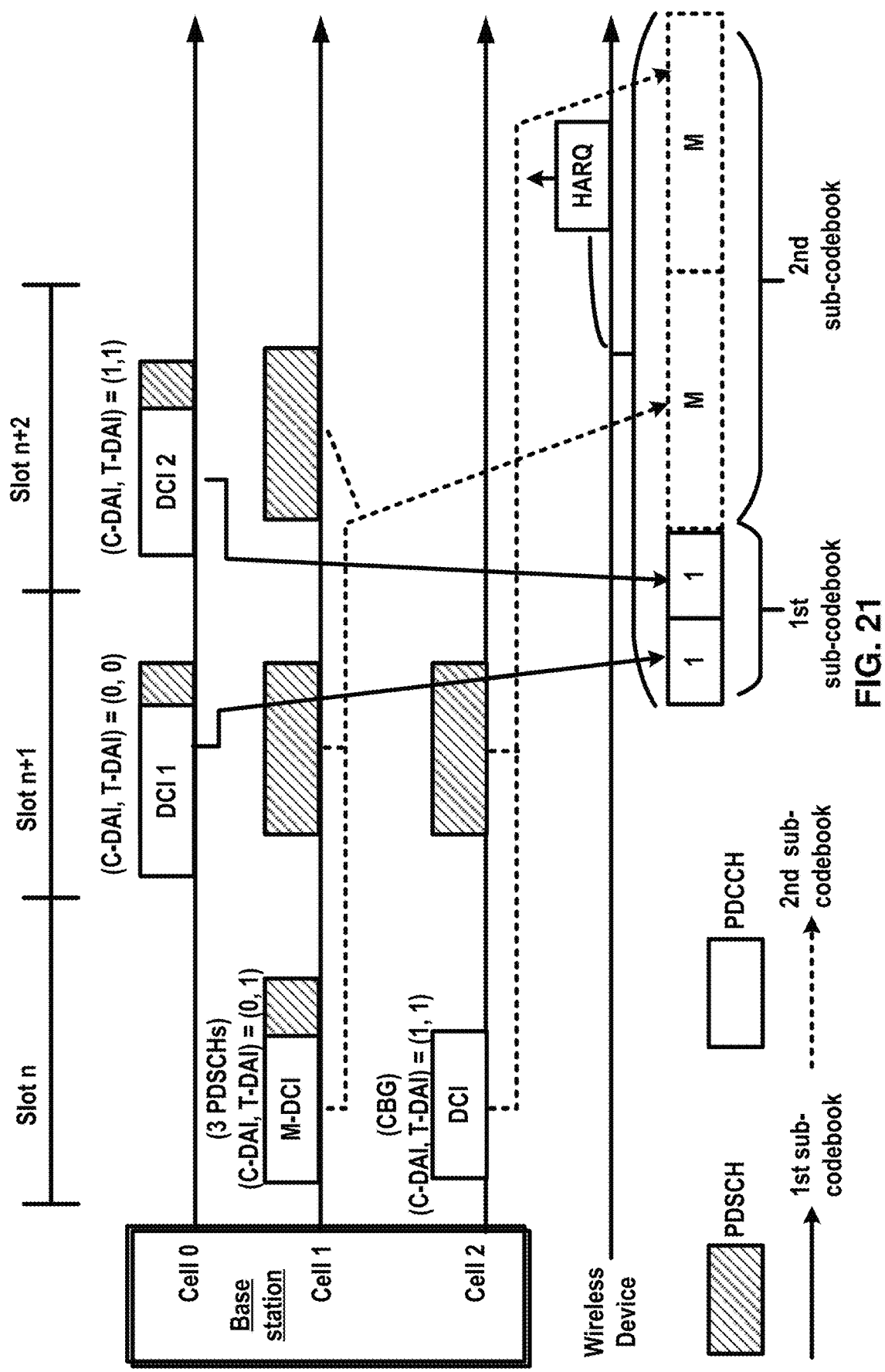
FIG. 21 illustrates an example of DAI counting per DCI for multi-PDSCH scheduling, according to some embodiments.

FIG. 21 illustrates an example of DAI counting per DCI for multi-PDSCH scheduling, according to some embodiments. For example, the base station may configure three serving cells (a first cell, a second cell, a third cell with Cell 0, Cell 1 and Cell 2 indices) to the wireless device. The first cell may be configured with a TB based transmission (e.g., no CBG transmission and no multi-PDSCH scheduling). The second cell may be configured with a multi-PDSCH scheduling. The second cell may be also configured with a CBG transmission, e.g., when the DCI schedules one PDSCH based on a row of the TDRA table indicating a single SLIV. The third cell may be configured with a CBG transmission, where a maximum CBG number per TB is M. The configuration parameters may indicate/comprise one or more first search spaces of the first cell. For example, a monitoring occasion based on the one or more first search spaces may occur (or be present) in a slot n. The configuration parameters may indicate/comprise one or more second search spaces of the second cell. For example, three monitoring occasions, based on the one or more second search spaces, may occur (or may be configured to be monitored) in the slot n, a slot n+1 and a slot n+2.

The wireless device may receive a first multi-PDSCH DCI (M-DCI) in a slot n for the second cell. In the example, the first multi-PDSCH DCI may be transmitted via the second cell. The first multi-PDSCH DCI may schedule three PDSCHs via the slot n to slot n+2. The multi-PDSCH DCI may indicate a PUCCH resource for a HARQ-ACK feedback of the three PDSCHs. The wireless device may receive a first DCI (DCI) in the slot n via cell 2. The first DCI may schedule M CBGs via a first PDSCH, where the first PDSCH may be scheduled via a slot n+1. The first DCI may indicate the PUCCH resource for HARQ-ACK feedback of the CBGs. The wireless device may receive a second DCI (DCI 1) in the slot n+1, scheduling a second PDSCH in the slot n+1. The wireless device may receive a third DCI (DCI 2) in the slot n+2, scheduling a third PDSCH in the slot n+2. The second DCI and the third DCI may indicate the PUCCH resource for corresponding HARQ-ACK transmission.

In example of FIG. 21, the wireless device may determine a first HARQ-ACK sub-codebook comprising HARQ-ACK information of the second DCI (or the second PDSCH) and the third DCI (or the third PDSCH). For example, the first sub-codebook may correspond to single-TB scheduling DCIs. As shown in FIG. 21, the C-DAI and the T-DAI values indicated by DCI 1 and DCI 2 are counted/incremented based on the first sub-codebook and separately/independent from the second sub-codebook.

The wireless device may determine a second HARQ-ACK sub-codebook comprising HARQ-ACK information of the M-DCI (or the three PDSCHs scheduled by the first multi-PDSCH DCI) and the first DCI on Cell 2 (or the scheduled CBGs). For example, the second sub-codebook may correspond to multi-PDSCH and/or CBG-based scheduling DCIs. As shown in FIG. 21, the C-DAI and the T-DAI values indicated by the first DCI and the M-DCI are counted/incremented based on the second sub-codebook and separately/independent from the first sub-codebook.

For example, the HARQ feedback or the HARQ-ACK codebook multiplexed in and transmitted via the PUCCH resource may comprise the first HARQ-ACK sub-codebook and the second HARQ-ACK sub-codebook.

The UE may be configured with multi-PDSCH scheduling and Type-2 (dynamic) HARQ-ACK codebook. The UE may generate Type-2 HARQ-ACK codebook corresponding to a DCI that can schedule multiple PDSCHs. The DCI, scheduling multiple PDSCHs, may comprise a counter DAI and/or a total DAI field. In a second example, the counter DAI and/or the total DAI may be counted per PDSCH (also referred to as Alt 2). For example, RRC configuration may comprise at least one parameter indicating that the counter DAI and/or the total DAI are counted per PDSCH.

The Type-2 HARQ-ACK codebook, for a PUCCH cell group, may comprise one sub-codebooks (for non-CBG), e.g., if multi-PDSCH scheduling is configured for at least one serving cell in the PUCCH cell group and/or DAI counting per PDSCH is configured and/or RRC indicates a second value for a first parameter. For example, a single HARQ-ACK sub-codebook may comprise first HARQ-ACK bits corresponding to first DCIs scheduling single PDSCH and second HARQ-ACK bits corresponding to second DCIs scheduling multiple PDSCHs. The HARQ-ACK codebook may comprise a second HARQ-ACK sub-codebook comprising HARQ-ACK information of CBGs. For example, the second HARQ-ACK sub-codebook may comprise HARQ-ACK information of/corresponding to one or more DCIs each scheduling CBG-based PDSCH(s). The one or more DCIs may be configured with CBG-based scheduling. For example, the UE may be configured with CBG for at least one serving cell in the PUCCH cell group. The second sub-codebook may not comprise HARQ-ACK of multi-PDSCH scheduling DCIs.

In an example, when c-DAI and/or t-DAI is counted per PDSCH, the UE may generate one HARQ-ACK bit per PDSCH. For example, the UE may generate one HARQ-ACK bit per counter DAI. For example, the UE may generate a variable number of HARQ-ACK information bits corresponding to different DCIs in the first HARQ-ACK sub-codebook. For example, the number of HARQ-ACK bits corresponding to each DCI of the first sub-codebook (for single-PDSCH scheduling DCI and for multi-PDSCH scheduling DCIs) and/or the size of the first sub-codebook may depend on the number of actually scheduled PDSCHs by the corresponding DCI. For example, the number of HARQ-ACK bits may depend on the number of scheduled PDSCHs.

The BS may indicate counter DAI and/or total DAI corresponding to the first sub-codebook jointly for single-PDSCH scheduling DCI(s) and for multi-PDSCH scheduling DCI(s). For example, first DCIs scheduling single PDSCH may comprise first c-DAI and/or t-DAI incrementing jointly with second c-DAI and/or t-DAI incrementing of second DCIs scheduling multiple PDSCHs. For example, single-PDSCH scheduling and multi-PDSCH scheduling DCIs may share the counter DAI and/or the total DAI values.

In an example, the ordering of PDSCHs for DAI counting towards the Type-2 codebook may be as follows: PDSCH(s) scheduled by a single DCI may be counted firstly, serving cell(s) in the same PUCCH cell group and same PDCCH monitoring occasion may be counted secondly, and PDCCH monitoring occasion(s) may be counted thirdly.

Figure 22:
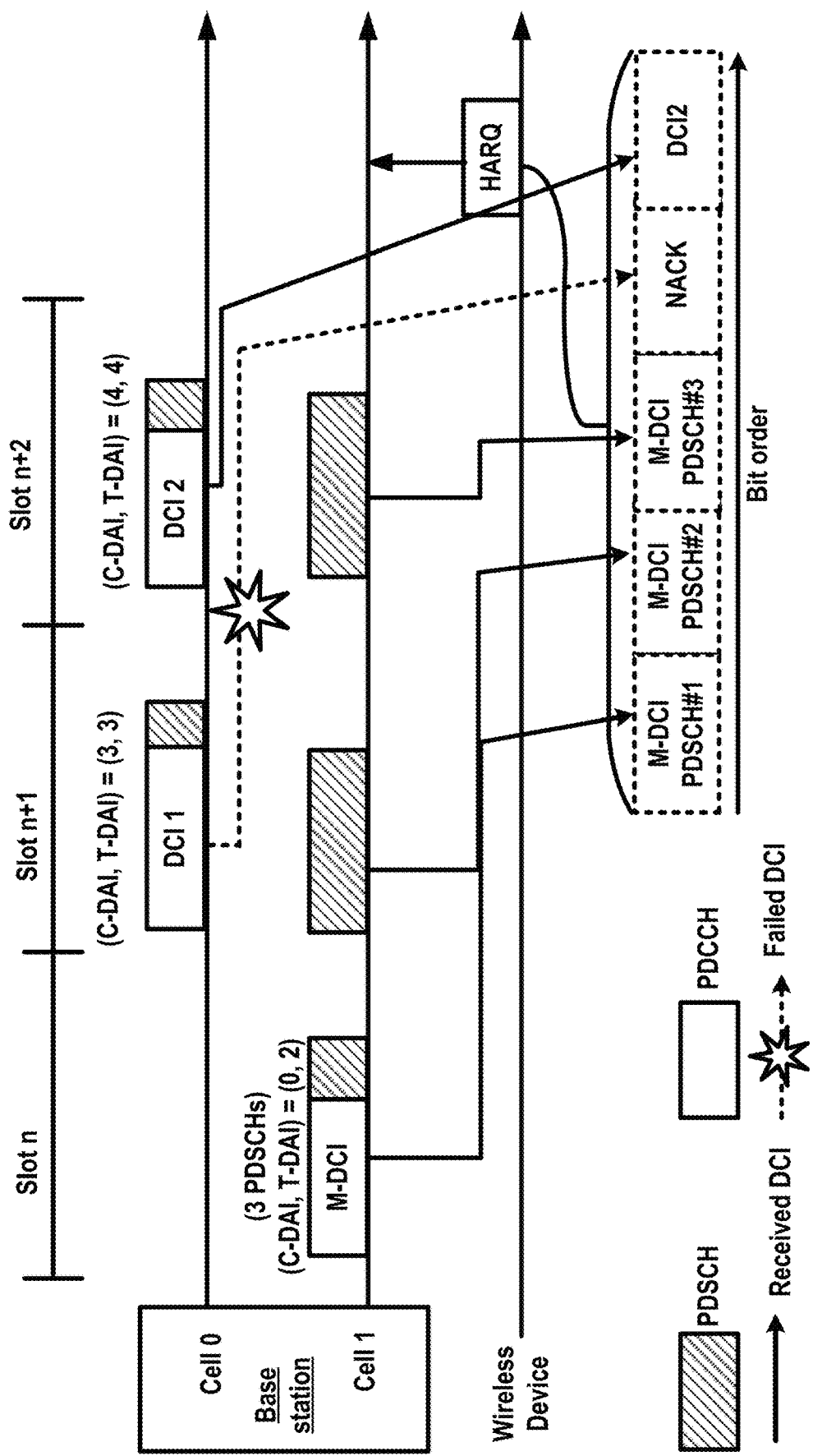
FIG. 22 illustrates an example of DAI counting per PDSCH for multi-PDSCH scheduling, according to some embodiments.

FIG. 22 illustrates an example of DAI counting per PDSCH for multi-PDSCH scheduling, according to some embodiments. A base station may transmit one or more RRC messages comprising/indicating configuration parameters. A wireless device may be configured with two serving cells comprising a first cell (Cell 0) and a second cell (Cell 1). The second cell may be configured with a multi-PDSCH scheduling. For example, configuration parameters may indicate a TDRA table comprising at least one row with multiple valid SLIVs for PDSCH scheduling via a DCI format. The first cell may be configured with a multi-PDSCH scheduling. The first cell may not be configured with a multi-PDSCH scheduling.

For example, a multi-PDSCH DCI format may refer a DCI format used for a multi-PDSCH scheduling. For example, the multi-PDSCH DCI format may be a non-fallback DCI format (e.g., DCI format 1_1). For example, the multi-PDSCH DCI format may be a DCI format 1_3. The multi-PDSCH DCI format may comprise a plurality of NDI bits, where each of the plurality of NDI bits corresponds to each PDSCH of one or more PDSCHs scheduled by a DCI based on the multi-PDSCH DCI format. The multi-PDSCH DCI format may comprise a plurality of RV fields/bits, where each of the plurality of RV fields/bits corresponds to each PDSCH of the one or more PDSCHs. For example, a single-PDSCH DCI format may refer a DCI format used for a single-PDSCH scheduling. For example, the single-PDSCH DCI format may be a non-fallback DCI format (e.g., DCI format 1_1). For example, the multi-PDSCH DCI format may be a DCI format 1_2. For example, the single PDSCH DCI format may be a fallback DCI format (e.g., DCI format 1_0). The single-PDSCH DCI format may comprise a single NDI bit for a single PDSCH.

In an example, a base station and a wireless device may determine a counter DAI of a DCI based on a number of PDSCHs, SPS PDSCH release, and/or a SCell dormancy indication scheduled by a previous DCI and a first counter DAI value of the previous DCI. The base station may increment by the number of PDSCHs, SPS PDSCH release, and/or a SCell dormancy indication scheduled by the previous DCI from the first counter DAI value. In an example, a base station and a wireless device may determine a counter DAI of a DCI based on an accumulation of a number of PDSCHs, SPS PDSCH release, and/or a SCell dormancy indication scheduled up to the DCI via {serving cell, a current PDCCH monitoring occasion}-pair. In an example, a base station and a wireless device may determine a counter DAI of a DCI based on an accumulation of a number of transport block(s), SPS PDSCH release(s), and/or a SCell dormancy indication scheduled up to the DCI via {serving cell, a current PDCCH monitoring occasion}-pair. The DCI and the previous DCI may share (e.g., count, consider, use) a DAI counter procedure that was used by the base station. The base station may have used the same DAI counter procedure to update the C-DAI value and the T-DAI value of the DCI compared to (or from) the previous DCI. The previous DCI may be a DCI that occurs in a same PDCCH monitoring occasion or previous PDCCH monitoring occasion than the DCI. The base station may not schedule any DCI, based on the DAI counter, between the previous DCI and the DCI. The base station and the wireless device may determine a total DAI of a DCI, in a PDCCH monitoring occasion, based on a number of PDSCH(s), SPS PDSCH release, and/or a SCell dormancy indication scheduled by one or more DCIs up to the PDCCH monitoring occasion. The one or more DCIs may comprise the DCI.

In the example of FIG. 22, the UE may receive a multi-PDSCH scheduling DCI (M-DCI) in slot n via Cell 1. The M-DCI schedules 3 PDSCHs, e.g., in slot n to slot n+2. The UE may receive a second DCI (DCI 1) and a third DCI (DCI 2) via Cell 0 in slot n+1 and slot n+2, respectively. The second DCI and the third DCI may be single-PDSCH scheduling DCIs. The multi-PDSCH scheduling DCI comprises a DAI field, indicating at least a first counter DAI and a first total DAI value. For example, the first counter DAI may correspond to a first PDSCH scheduled by the M-DCI. For example, the first PDSCH may be the earliest PDSCH (e.g., PDSCH 0 in slot n). For example, the first PDSCH may be a last PDSCH scheduled by the M-DCI (e.g., PDSCH 2 in slot n+2). In an example, the M-DCI may indicate multiple counter DAI values, each for one of the scheduled PDSCHs by the M-DCI. In example of FIG. 22, the M-DCI indicates C-DAI=0 for the first scheduled PDSCH (in slot n). The M-DCI indicates a t-DAI corresponding to accumulated number of scheduled PDCSHs by the M-DCI and potentially, other DCIs received in the same PDCCH monitoring occasion. In example of FIG. 22, the M-DCI indicates T-DAI=2 (counting the 3 PDSCHs scheduled in the PDCCH monitoring occasion in slot n). The second DCI shares the DAI counting procedure, and indicates C-DAI=3 and T-DAI=3. For example, the C-DAI indicated by DCI-1 is determined by incrementing the last C-DAI value received in a last PDCCH monitoring occasion, e.g., assuming a virtual DCI indicating C-DAI=1 for the second PDSCH and C-DAI=2 for the third PDSCH scheduled by M-DCI. For example, the C-DAI indicated by DCI-1 may be determined based on: (1) a last C-DAI indicated by the last PDCCH monitoring occasion (e.g., C-DAI=0); and (2) a number of PDSCHs scheduled by a DCI associated with the last received C-DAI (3 PDSCHs). The base station may increment the C-DAI value of the second DCI by the number of PDSCHs scheduled by the last DCI. For example, C-DAI of PDSCH scheduled by DCI 1=C-DAI indicated by M-DCI (0)+number of PDSCHs scheduled by M-DCI (3)=3. The base station may determine a T-DAI of the second DCI as 3 as a sum of a T-DAI indicated by a last DCI (M-DCI) and a second number of PDSCH scheduled by the second DCI (e.g., 2+1). Similarly, the third DCI shares the DAI counting procedure, and indicates C-DAI=4 and T-DAI=4.

The UE may generate a HARQ-ACK codebook for the example of FIG. 22 comprising: firstly, HARQ-ACK bits of PDSCH(s) scheduled by the multi-PDSCH scheduling DCI in the first PDCCH monitoring occasion, in the order of starting symbol, secondly, HARQ-ACK information associated with DCI 1 received in the second PDCCH monitoring occasion, thirdly, HARQ-ACK information associated with DCI 2 received in the third PDCCH monitoring occasion. In the example of FIG. 22, the second DCI (DCI 1) is not received. The UE may determine the number of PDSCHs and the corresponding ACK/NACK bits associated with the missed DCI in the codebook based on the detected gap between T-DAI of M-DCI (2) and C-DAI of DCI 2 (4), which implies one PDSCH (corresponding to C-DAI=3) is missed. The UE may generate a NACK for the missed PDSCH and place it for C-DAI=3 in the HARQ-ACK codebook.

A wireless device (UE) may determine a power for a PUCCH transmission based on uplink power control. The PUCCH transmission may be associated with a primary PUCCH group and/or a secondary PUCCH group, e.g., if the UE is configured with a PUCCH SCell.

A UE may transmit a PUCCH on an active UL BWP of an UL carrier in a cell (e.g., primary cell and/or secondary cell). The UE may use PUCCH power control adjustments state to determine a PUCCH transmission power in a PUCCH transmission occasion (or PUCCH resource). For example, if a UE transmits a PUCCH on active UL BWP b of carrier f in the primary cell c using PUCCH power control adjustment state with index l, the UE may determine the PUCCH transmission power $P_{PUCCH,b,f,c}(i,q_u,q_d,l)$ in PUCCH transmission occasion i as $$P_{PUCCH,b,f,c}(i,q_u,q_d,l) = \min \begin{cases} P_{CMAX,f,c}(i), \\ P_{O\_PUCCH,b,f,c}(q_u) + 10\log_{10}(2^\mu \cdot M_{RB,b,f,c}^{PUCCH}(i)) + \\ PL_{b,f,c}(q_d) + \Delta_{F\_PUCCH}(F) + \Delta_{TF,b,f,c}(i) + g_{b,f,c}(i,l) \end{cases}$$

where:

$P_{CMAX,f,c}(i)$ may be a maximum output power configured for the UE for carrier f of primary cell c in PUCCH transmission occasion i.

$P_{O\_PUCCH,b,f,c}(q_u)$ may be a parameter composed of the sum of a first component (e.g., $P_{O\_NOMINAL\_PUCCH}$, provided by p0-nominal, or $P_{PO\_NOMINAL\_PUCCH}=0$ dBm if p0-nominal is not provided), for carrier f of primary cell c and, if provided, a second component (e.g., $P_{O\_UE\_PUCCH}(q_u)$ provided by p0-PUCCH-Value in P0-PUCCH) for active UL BWP b of carrier f of primary cell c, where $0 \leq q_u < Q_u$ and $Q_u$ may be a size for a set of values (e.g., $P_{O\_UE\_PUCCH}$ values provided by maxNrofPUCCH-P0-PerSet). A set of $P_{O\_UE\_PUCCH}$ values may be provided by a parameter (e.g., p0-Set). For example, if p0-Set is not provided to the UE, $P_{O\_UE\_PUCCH}(q_u)=0$, $0 \leq q_u < Q_u$.

$M_{RB,b,f,c}^{PUUCH}(i)$ may be a bandwidth of the PUCCH resource assignment expressed in number of resource blocks for PUCCH transmission occasion i on active UL BWP b of carrier f of primary cell c and μ is a SCS configuration.

$PL_{b,f,c}(q_d)$ may be a downlink pathloss estimate in dB calculated by the UE using RS resource index $q_d$ as for the active DL BWP b of carrier f of the primary cell c.

The parameter $\Delta_{F\_PUCCH}(F)$ may be a value, e.g., of deltaF-PUCCH-f0 for PUCCH format 0, deltaF-PUCCH-f1 for PUCCH format 1, deltaF-PUCCH-f2 for PUCCH format 2, deltaF-PUCCH-f3 for PUCCH format 3, and deltaF-PUCCH-f4 for PUCCH format 4, if provided; otherwise $\Delta_{F\_PUCCH}(F)=0$.

For a PUCCH power control adjustment state $g_{b,f,c}(i,l)$ for active UL BWP b of carrier f of primary cell c and PUCCH transmission occasion i: $g_{b,f,c}(i,l)$ may be a current PUCCH power control adjustment state l for active UL BWP b of carrier f of primary cell c and PUCCH transmission occasion i.

$\Delta_{TF,b,f,c}(i)$ may be a PUCCH transmission power adjustment component on active UL BWP b of carrier f of primary cell c.

The wireless device may determine the PUCCH transmission power based on the PUCCH transmission power adjustment component. The delta function $\Delta_{TF,b,f,c}(i)$ may adjust the transmission power for different PUCCH formats based on a respective coding gain. For example, different coding schemes, such as simplex, Reed-Muller (RM), and Polar coding schemes, may be used based on different UCI payload size. The coding gains may be different for different coding schemes. Moreover, the coding gain may also depend on the CRC-length, e.g., since CRC may be considered as data in the encoder. For example, for UCI with Polar coding scheme, length-6 CRC may be used for UCI payload size between 12 and 19 bits, and length-11 CRC may be used for UCI payload size larger than 19 bits. The delta function $\Delta_{TF,b,f,c}(i)$ may be specified based on the coding gain. Nevertheless, same UCI payload size carried by different PUCCH formats may have different performance due to different time and frequency diversity gain. We evaluate the BLER the performance of different PUCCH formats. The delta function $\Delta_{TF,b,f,c}(i)$ of each PUCCH format may be set to meet a required SINR. The delta function $\Delta_{TF,b,f,c}(i)$ may be a function of the random variable of coding gain and diversity gain. To achieve the target SINR, the delta function $\Delta_{TF,b,f,c}(i)$ may be determined by the UCI payload size, the resource allocation, diversity gain, and channel coding scheme. The coding gain may depend on the UCI payload size, the number of resource elements (REs) carrying the UCI and the coding scheme.

The delta function $\Delta_{TF,b,f,c}(i)$ may reflect at least a UCI payload size, and/or UCI type (e.g., SR, HARQ-ACK, and/or CSI report), and/or different coding gains, and/or PUCCH format, and/or coding schemes and/or different effective coding rates. The wireless device may determine, for a PUCCH power control, the delta function $\Delta_{TF,b,f,c}(i)$ based on a (effective) number of UCI bits, comprising (effective) HARQ-ACK information bits, and/or based on a PUCCH format of the PUCCH resource/transmission occasion. For example, for an effective coding rate of HARQ-ACK report/codebook, one or more HARQ-ACK information bits (e.g., NACKs) corresponding to one or more PDSCHs that are not transmitted may be known by the network scheduler and may not be counted in the coding rate. For example, in determining the delta function $\Delta_{TF,b,f,c}(i)$ for PUCCH power control, the number of HARQ-ACK bits may only consider received PDSCHs, e.g., excluding the known bits.

For a PUCCH transmission using PUCCH format 0 or PUCCH format 1, $$\Delta_{TF,b,f,c}(i) = 10\log_{10}\left(\frac{N_{ref}^{PUCCH}}{N_{symb}^{PUCCH}(i)}\right) + \Delta_{UCI}(i),$$

where:

$N_{symb}^{PUUCH}(i)$ may be a number of PUCCH format 0 symbols or PUCCH format 1 symbols for the PUCCH transmission.

$N_{ref}^{PUCCH}=2$ for PUCCH format 0

$N_{ref}^{PUCCH}=N_{symb}^{slot}$ for PUCCH format 1

$\Delta_{UCI}(i)=0$ for PUCCH format 0

$\Delta_{UCI}(i)=10 \log_{10}(O_{UCI}(i))$ for PUCCH format 1, where $O_{UCI}(i)$ may be a number of UCI bits in PUCCH transmission occasion i.

For a PUCCH transmission using PUCCH format 2 or PUCCH format 3 or PUCCH format 4 and for a number of UCI bits smaller than or equal to a first value (e.g., 11), $\Delta_{TF,b,f,c}(i)=10 \log_{10}(K_1 \cdot (n_{HARQ-ACK}(i)+O_{SR}(i)+O_{CSI}(i))/N_{RE}(i)$, where:

$K_1=6$ $n_{HARQ-ACK}(i)$ may be a number of HARQ-ACK information bits that the UE may determine for Type-1 HARQ-ACK codebook and for Type-2 HARQ-ACK codebook. $n_{HARQ-ACK}(i)$ may be the same as $O_{ACK}(i)$ (total number of HARQ-ACK information bits) for Type-3 HARQ-ACK codebook (e.g., one-shot HARQ-ACK codebook comprising HARQ-ACK information of all downlink HARQ processes). In an example, if the UE is not provided any codebook configuration (e.g., pdsch-HARQ-ACK-Codebook, pdsch-HARQ-ACK- Codebook-r16, and/or pdsch-HARQ-ACK-OneShot-Feedback), $n_{HARQ-ACK}(i)=1$ if the UE includes a HARQ-ACK information bit in the PUCCH transmission; otherwise, $n_{HARQ-ACK}(i)=0$.

$O_{SR}(i)$ may be a number of SR information bits that the UE determines.

$O_{CSI}(i)$ may be a number of CSI information bits that the UE determines.

$N_{RE}(i)$ may be a number of resource elements determined as $N_{RE}(i)=M_{RB,b,f,c}^{PUCCH}(i) \cdot N_{sc,ctrl}^{RB}(i) \cdot N_{symb-UCI,b,f,c}^{PUCCH}(i)$, where $N_{sc,ctrl}^{RB}(i)$ may be a number of subcarriers per resource block excluding subcarriers used for DM-RS transmission, and $N_{symb-UCI,b,f,c}(i)$ may be a number of symbols excluding symbols used for DM-RS transmission, for PUCCH transmission occasion i on active UL BWP b of carrier f of primary cell c, and $M_{RB,b,f,c}^{PUCCH}(i)$ may be a bandwidth of the PUCCH resource assignment expressed in number of resource blocks for PUCCH transmission occasion i on active UL BWP b of carrier f of primary cell c.

For a PUCCH transmission using PUCCH format 2 or PUCCH format 3 or PUCCH format 4 and for a number of UCI bits larger than a first value (e.g., 11), $\Delta_{TF,b,f,c}(i)=10 \log_{10}(2^{K_2 \cdot BPRE(i)}-1)$, where:

$K_2=2.4$ $BPRE(i)=(O_{ACK}(i)+O_{SR}(i)+O_{CSI}(i)+O_{CRC}(i))/N_{RE}(i)$ $O_{ACK}(i)$ may be a number of HARQ-ACK information bits that the UE determines for Type-1 HARQ-ACK codebook and for Type-2 HARQ-ACK codebook, or for Type-3 HARQ-ACK codebook. In an example, if the UE is not provided any codebook configuration (e.g., pdsch-HARQ-ACK-Codebook, pdsch-HARQ-ACK-Codebook-r16, or pdsch-HARQ-ACK-OneShot-Feedback), $O_{ACK}=1$ if the UE includes a HARQ-ACK information bit in the PUCCH transmission; otherwise, $O_{ACK}=0$.

$O_{SR}(i)$ may be a number of SR information bits that the UE determines.

$O_{CSI}(i)$ may be a number of CSI information bits that the UE determines.

$O_{CRC}(i)$ may be a number of CRC bits that the UE determines.

$N_{RE}(i)$ may be a number of resource elements that the UE determines as $N_{RE}(i)=M_{RB,b,f,c}^{PUCCH}(i) \cdot N_{sc,ctrl}^{RB}(i) \cdot N_{symb-UCI,b,f,c}^{PUCCH}(i)$, where $N_{sc,ctrl}^{RB}(i)$ may be a number of subcarriers per resource block excluding subcarriers used for DM-RS transmission, and $N_{symb-UCI,b,f,c}^{PUCCH}(i)$ may be a number of symbols excluding symbols used for DM-RS transmission, for PUCCH transmission occasion i on active UL BWP b of carrier f of primary cell c, and $M_{RB,b,f,c}^{PUCCH}(i)$ may be a bandwidth of the PUCCH resource assignment expressed in number of resource blocks for PUCCH transmission occasion i on active UL BWP b of carrier f of primary cell c.

For the definition of $\Delta_{TF,b,f,c}(i)$ (e.g., at least for PUCCH formats 2, 3 and 4), the number of HARQ-ACK bits may be defined for cells configured with CBG. For example, for each received CBG, one bit may be counted for PUCCH power control.

The wireless device may be configured with a Type-1 HARQ-ACK codebook. For example, the UE may receive the RRC parameter pdsch-HARQ-ACK-Codebook=semi-static. A UE may report HARQ-ACK information for a corresponding PDSCH reception or SPS PDSCH release, e.g., in a HARQ-ACK codebook that the UE transmits in a slot. The slot may be indicated by a value of a PDSCH-to-HARQ_feedback timing indicator field in a corresponding DCI format. The UE may report NACK value(s) for HARQ-ACK information bit(s) in a HARQ-ACK codebook that the UE transmits in a slot not indicated by a value of a PDSCH-to-HARQ_feedback timing indicator field in a corresponding DCI format.

The UE may report HARQ-ACK information for a PDSCH reception in a HARQ-aCK codebook that the UE includes/multiplexes in a PUCCH or PUSCH transmission. The PUCCH or the PUSCH transmission may be in a slot n+k, wherein n is an UL slot overlapping with the end of the PDSCH reception in a corresponding DL slot, and k is a time offset. The time offset k may be a number of slots indicated by a PDSCH-to-HARQ_feedback timing indicator field in a corresponding DCI format or provided by dl-DataToUL-ACK if the PDSCH-to-HARQ_feedback timing indicator field is not present in the DCI format. The UE may set a value for each corresponding HARQ-ACK information bit to NACK, e.g., if the UE reports HARQ-ACK information for the PDSCH reception in a slot other than slot n+k.

In an example, the UE may report HARQ-ACK information in a PUCCH only for a SPS PDSCH release indicated by DCI (e.g., DCI format 1_0 with counter DAI field value of 1); or a PDSCH reception scheduled by DCI (e.g., DCI format 1_0 with counter DAI field value of 1 on the PCell); or SPS PDSCH reception(s), within occasion(s) for candidate PDSCH receptions. The UE may determine a HARQ-ACK codebook only for the SPS PDSCH release or only for the PDSCH reception or only for one SPS PDSCH reception according to corresponding occasion(s) on respective serving cell(s). HARQ-ACK information bits in response to more than one SPS PDSCH receptions that the UE may be configured to receive may be ordered according to a pseudo-code.

A UE may determine $\tilde{O}_0^{ACK}, \tilde{O}_1^{ACK}, \ldots, \tilde{O}_{O^{ACK}-1}^{ACK}$ HARQ-ACK information bits, for a total number of $O_{ACK}$ HARQ-ACK information bits, of a HARQ-ACK codebook (e.g., based on Type-1 codebook) for transmission in a PUCCH. In an example, if the UE does not receive a transport block (TB) or a CBG, due to the UE not detecting a corresponding DCI format, the UE may generate a NACK value for the transport block or the CBG. The cardinality of the set $M_{A,c}$ occasions for candidate PDSCH receptions may define a total number $M_c$ of occasions for PDSCH reception or SPS PDSCH release for serving cell c corresponding to the HARQ-ACK information bits.

In an example, the UE may determine a number of HARQ-ACK information bits $n_{HARQ-ACK}$ for obtaining a transmission power for a PUCCH, as $$n_{HARQ-ACK} = \sum_{c=0}^{N_{cells}^{DL}-1} \sum_{m=0}^{M_c-1} N_{m,c}^{received} + \sum_{c=0}^{N_{cells}^{DL}-1} \sum_{m=0}^{M_c-1} N_{m,c}^{received,CBG}.$$

For example, the PUCCH may comprise a HARQ-ACK codebook and/or SR and/or CSI report. For example, the total number of HARQ-ACK information bits in the codebook and the SR bits and the CSI report bits may be less than a first value ($O_{ACK}+O_{SR}+O_{CSI} \leq 11$). For example, the number of HARQ-ACK information bits $n_{HARQ-ACK}$ may comprise effective ACK/NACK bits of the HARQ-ACK codebook, e.g., excluding the known information bits (e.g., NACKs). For example, the effective number of HARQ- ACK information bits $n_{HARQ-ACK}$ may be less than or equal to the total number of HARQ-ACK information bits in the codebook $O_{ACK}$.

In the formula for number of HARQ-ACK bits in a Type-1 codebook, $$n_{HARQ-ACK} = \sum_{c=0}^{N_{cells}^{DL}-1} \sum_{m=0}^{M_c-1} N_{m,c}^{received} + \sum_{c=0}^{N_{cells}^{DL}-1} \sum_{m=0}^{M_c-1} N_{m,c}^{received,CBG};$$

$N_{m,c}^{received}$ may be a number of transport blocks (TBs) the UE receives in PDSCH reception occasion m for serving cell c, e.g., if harq-ACK-SpatialBundlingPUCCH and PDSCH-CodeBlockGroupTransmission are not provided. $N_{m,c}^{received}$ may be the number of transport blocks the UE receives in PDSCH reception occasion m for serving cell c, e.g., if PDSCH-CodeBlockGroup-Transmission is provided and the PDSCH reception is scheduled by a DCI format that does not support CBG-based PDSCH receptions. $N_{m,c}^{received}$ may be the number of PDSCH receptions, e.g., if harq-ACK-SpatialBundlingPUCCH is provided or SPS PDSCH release in PDSCH reception occasion m for serving cell c and the UE reports corresponding HARQ-ACK information in the PUCCH.

$N_{m,c}^{received,CBG}$ may be the number of CBGs the UE receives in a PDSCH reception occasion m for serving cell c, e.g., if PDSCH-CodeBlockGroupTransmission is provided and the PDSCH reception is scheduled by a DCI format that supports CBG-based PDSCH receptions and the UE reports corresponding HARQ-ACK information in the PUCCH. $M_c$ may be the total number of occasions for PDSCH reception or SPS PDSCH release for serving cell c corresponding to the HARQ-ACK information bits.

$N_{cells}^{DL}$ may be the number of serving cells configured by higher layers for the UE.

The wireless device may be configured with a Type-2 HARQ-ACK codebook. For example, the UE may receive the RRC parameter pdsch-HARQ-ACK-Codebook=dynamic or pdsch-HARQ-ACK-Codebook-r16. The UE may not expect to multiplex in a Type-2 HARQ-ACK codebook HARQ-ACK information that is in response to a detection of a DCI format that does not include a counter DAI field. The UE may determine monitoring occasions for PDCCH with DCI format scheduling PDSCH receptions or SPS PDSCH release or indicating SCell dormancy on an active DL BWP of a serving cell c. The UE may transmit HARQ-ACK information of the PDSCH receptions and/or SPS PDSCH release and/or SCell dormancy indication in a same PUCCH in slot n.

The UE may determine the monitoring occasions based on first slot offsets (e.g., PDSCH-to-HARQ_feedback timing indicator field values) for PUCCH transmission with HARQ-ACK information in slot n in response to PDSCH receptions, SPS PDSCH release or SCell dormancy indication. The UE may determine the monitoring occasions based on second slot offsets (e.g., $K_0$) provided by time domain resource assignment field in a DCI format scheduling PDSCH receptions and by pdsch-AggregationFactor, or pdsch-AggregationFactor-r16, or repetitionNumber, when provided.

A set of PDCCH monitoring occasions for a DCI format scheduling PDSCH receptions or SPS PDSCH release or indicating SCell dormancy may be defined as the union of PDCCH monitoring occasions across active DL BWPs of configured serving cells. PDCCH monitoring occasions may be indexed in an ascending order of their start times. The cardinality of the set of PDCCH monitoring occasions may define a total number M of PDCCH monitoring occasions.

A value of a counter downlink assignment indicator (DAI) field in DCI formats may denote an accumulative number of {serving cell, PDCCH monitoring occasion}-pair(s) in which PDSCH reception(s), SPS PDSCH release or SCell dormancy indication associated with the DCI formats is present up to the current serving cell and current PDCCH monitoring occasion. The counter DAI may be increased: first in increasing order of the PDSCH reception starting time for the same {serving cell, PDCCH monitoring occasion} pair, e.g., if the UE indicates (e.g., by type2-HARQ-ACK-Codebook) support for more than one PDSCH reception on a serving cell that are scheduled from a same PDCCH monitoring occasion; second in ascending order of serving cell index; and third in ascending order of PDCCH monitoring occasion index m, where 0≤m<M.

In an example, if, for an active DL BWP of a serving cell, the UE is not provided coresetPoolIndex or is provided coresetPoolIndex with value 0 for one or more first CORESETs and is provided coresetPoolIndex with value 1 for one or more second CORESETs, and is provided ackNackFeedbackMode=joint, the value of the counter DAI may be in the order of the first CORESETs and then the second CORESETs for a same serving cell index and a same PDCCH monitoring occasion index.

A value of a total DAI, when present/configured, in a DCI format may denote the total number of {serving cell, PDCCH monitoring occasion}-pair(s) in which PDSCH reception(s), SPS PDSCH release or SCell dormancy indication associated with DCI formats is present, up to the current PDCCH monitoring occasion m. The total DIA may be updated from PDCCH monitoring occasion to PDCCH monitoring occasion. In an example, if, for an active DL BWP of a serving cell, the UE is not provided coresetPoolIndex or is provided coresetPoolIndex with value 0 for one or more first CORESETs and is provided coresetPoolIndex with value 1 for one or more second CORESETs, and is provided ackNackFeedbackMode=joint, the total DAI value may count the {serving cell, PDCCH monitoring occasion}-pair(s) for both the first CORESETs and the second CORESETs.

$N_{C-DAI}^{DL}$ may denote the number of bits for the counter DAI. The UE may set $T_D=2^{N_{C-DAI}^{DL}}$. $V_{C-DAI,c,m}^{DL}$ may denote the value of the counter DAI in a DCI format scheduling PDSCH reception, SPS PDSCH release or SCell dormancy indication on serving cell c in PDCCH monitoring occasion m. $V_{T-DAI,m}^{DL}$ may denote the value of the total DAI in a DCI format in PDCCH monitoring occasion m.

FIG. 23A and FIG. 23B illustrate examples of determining counter DAI and/or total DAI values based on a corresponding DCI indication (e.g., DAI field in the DCI), according to some embodiments. The UE may assume a same value of total DAI in all DCI formats that include a total DAI field in PDCCH monitoring occasion m. A UE may not expect to multiplex, in a same Type-2 HARQ-ACK codebook, HARQ-ACK information that is in response to detection of DCI formats with different number of bits for the counter DAI field.

The UE may determine the $\tilde{O}_0^{ACK}, \tilde{O}_1^{ACK}, \ldots, \tilde{O}_{O^{ACK}-1}^{ACK}$ HARQ-ACK information bits, for a total number of $O_{ACK}$ HARQ-ACK information bits in a Type-2 codebook. The UE may transmit the HARQ-ACK information in a PUCCH in slot n and for any PUCCH format.

The UE may be configured to receive SPS PDSCH and the UE may multiplex HARQ-ACK information for one activated SPS PDSCH reception in the PUCCH in slot n. The UE may generate one HARQ-ACK information bit associated with the SPS PDSCH reception and may append it to the $O^{ACK}$ HARQ-ACK information bits. The UE may be configured to receive SPS PDSCH and the UE may multiplex HARQ-ACK information for multiple activated SPS PDSCH receptions in the PUCCH in slot n. The UE may generate the HARQ-ACK information and may append it to the $O^{ACK}$ HARQ-ACK information bits.

For a PDCCH monitoring occasion with DCI format scheduling PDSCH reception or SPS PDSCH release or indicating SCell dormancy in the active DL BWP of a serving cell, when a UE receives a PDSCH with one transport block (TB) or a SPS PDSCH release or indicating SCell dormancy, the HARQ-ACK information may be associated with a first transport block and the UE may generate a NACK for a second transport block, e.g., if two codewords per PDSCH is configured (e.g., the value of maxNrofCodeWordsScheduledByDCI is 2) and/or if bundling is not configured (e.g., harq-ACK-SpatialBundlingPUCCH is not provided). The UE may generate HARQ-ACK information with value of ACK for the second transport block if bundling is configured (e.g., harq-ACK-SpatialBundlingPUCCH is provided).

The UE may determine a number of HARQ-ACK information bits $n_{HARQ-ACK}$ in a Type-2 codebook for obtaining a transmission power for a corresponding PUCCH. For example, the PUCCH may comprise a HARQ-ACK codebook and/or SR and/or CSI report. For example, the total number of HARQ-ACK information bits in the codebook and the SR bits and the CSI report bits may be less than a first value ($O_{ACK}+O_{SR}+O_{CSI} \leq 11$). For example, if a UE is not configured with code-block grouping (e.g., PDSCH-CodeBlockGroupTransmission is not provided) for each of the $N_{cells}^{DL}$ serving cells, or for PDSCH receptions scheduled by a DCI format that does not support CBG-based PDSCH receptions, or for SPS PDSCH reception, or for SPS PDSCH release, or for SCell dormancy indication, and if $O_{ACK}+O_{SR}+O_{CSI} \leq 11$, the UE may determine the number of HARQ-ACK information bits $n_{HARQ-ACK}$ as:

$$n_{HARQ-ACK}=n_{HARQ-ACK,TB}=((V_{DAI,m_{last}}^{DL}-\Sigma_{c=0}^{N_{cells}^{DL}-1}U_{DAI,c})\mod(T_D))N_{TB,max}^{DL}+\Sigma_{c=0}^{N_{cells}^{DL}-1}(\Sigma_{m=0}^{M-1}N_{m,c}^{received}+N_{SPS,c})$$

where $V_{DAI,m_{last}}^{DL}$ may be the value of the counter DAI in a last DCI format scheduling PDSCH reception or indicating SPS PDSCH release or indicating SCell dormancy, for any serving cell c that the UE detects within the M PDCCH monitoring occasions, e.g., if UE is configured with one serving cell ($N_{cells}^{DL}=1$).

if the UE is configured with more than one serving cells (e.g., $N_{cells}^{DL}>1$):

$V_{DAI,m_{last}}^{DL}$ may be the value of the counter DAI in a last DCI format the UE detects in the last PDCCH monitoring occasion, e.g., if the UE does not detect any DCI format that includes a total DAI field in a last PDCCH monitoring occasion within the M PDCCH monitoring occasions where the UE detects at least one DCI format scheduling PDSCH reception, indicating SPS PDSCH release or indicating SCell dormancy for any serving cell c.

$V_{DAI,m_{last}}^{DL}$ may be the value of the total DAI in a at least one DCI format that includes a total DAI field, e.g., if the UE detects at least one DCI format that includes a total DAI field in a last PDCCH monitoring occasion within the M PDCCH monitoring occasions where the UE detects at least one DCI format scheduling PDSCH reception, indicating SPS PDSCH release or indicating SCell dormancy for any serving cell c.

$V_{DAI,m_{last}}^{DL}=0$ if the UE does not detect any DCI format scheduling PDSCH reception, indicating SPS PDSCH release or indicating SCell dormancy for any serving cell c in any of the M PDCCH monitoring occasions.

$U_{DAI,c}$ may be the total number of a DCI format scheduling PDSCH reception, indicating SPS PDSCH release and/or indicating SCell dormancy that the UE detects within the M PDCCH monitoring occasions for serving cell c. $U_{DAI,c}=0$ if the UE does not detect any DCI format scheduling PDSCH reception, indicating SPS PDSCH release or indicating SCell dormancy for serving cell c in any of the M PDCCH monitoring occasion.

$N_{TB,max}^{DL}=2$ if two codewords per PDSCH is configured (e.g., the value of maxNrofCodeWordsScheduledByDCI is 2) for any serving cell c and bundling is not configured (e.g., harq-ACK-SpatialBundlingPUCCH is not provided); otherwise, $N_{TB,max}^{DL}=1$.

$N_{m,c}^{received}$ may be the number of transport blocks the UE receives in a PDSCH scheduled by a DCI format that the UE detects in PDCCH monitoring occasion m for serving cell c, e.g., if bundling is not configured (harq-ACK-SpatialBundlingPUCCH is not provided). $N_{m,c}^{received}$ may be the number of PDSCH scheduled by a DCI format that the UE detects in PDCCH monitoring occasion m for serving cell c, e.g., if bundling is configured (harq-ACK-SpatialBundlingPUCCH is provided). $N_{m,c}^{received}$ may be the number of DCI formats that the UE detects and indicate SPS PDSCH release in PDCCH monitoring occasion m for serving cell c. $N_{m,c}^{received}$ may be the number of DCI formats that the UE detects and indicate SCell dormancy in PDCCH monitoring occasion m for serving cell c.

$N_{SPS,c}$ may be the number of SPS PDSCH receptions by the UE on serving cell c for which the UE transmits corresponding HARQ-ACK information in the same PUCCH as for HARQ-ACK information corresponding to PDSCH receptions within the M PDCCH monitoring occasions.

M may be the total number of PDCCH monitoring occasions corresponding to the HARQ-ACK information transmitted in the same PUCCH.

$N_{cells}^{DL}$ may be the number of serving cells configured by higher layers for the UE.

$T_D=2^{N_{C-DAI}^{DL}}$, wherein $N_{C-DAI}^{DL}$ is the number of bits configured for the counter DAI.

The UE may be configured with CBG-based communication for $N_{cells}^{DL,CBG}$ serving cells. For example, the UE may receive PDSCH-CodeBlockGroupTransmission for the $N_{cells}^{DL,CBG}$ serving cells. The UE may not be configured with CBG-based communication (e.g., PDSCH-CodeBlockGroupTransmission not received) for $N_{cells}^{DL,TB}$ serving cells, where $N_{cells}^{DL,TB}+N_{cells}^{DL,CBG}=N_{cells}^{DL}$ (total number of serving cells configured for the UE).

The UE may determine a first HARQ-ACK sub-codebook for $N_{cells}^{DL}$ cells. The first sub-codebook may comprise SPS PDSCH release, and/or SPS PDSCH reception, and/or a DCI format (e.g., DCI format 1_1) indicating SCell dormancy, and/or TB-based PDSCH receptions on any cell comprising the $N_{cells}^{DL,CBG}$ serving cells and the $N_{cells}^{DL,TB}$ serving cells.

The UE may determine a second HARQ-ACK sub-codebook. For example, the second sub-codebook may correspond to the $N_{cells}^{DL,CBG}$ serving cells for CBG-based PDSCH receptions.

The UE may count a serving cell as two times, e.g., where a first time may correspond to first CORESETs and a second time may correspond to the second CORESETs. In an example, the UE may not be configured with multi-TRP and/or may not receive coresetPoolIndex for an active DL BWP of a serving cell. In an example, the UE may receive configuration parameters indicating coresetPoolIndex with value 0 for one or more first CORESETs and coresetPoolIndex with value 1 for one or more second CORESETs, and ackNackFeedbackMode=joint.

The UE may be configured with CBG-based communication, e.g., may be provided PDSCH-CodeBlockGroup-Transmission for a serving cell. The UE may receive a PDSCH (e.g., scheduled by DCI format 1_1), that includes code block groups (CBGs) of a transport block. The UE may be provided by an RRC parameter (e.g., maxCodeBlockGroupsPerTransportBlock) indicating a maximum number $N_{HARQ-ACK}^{CBG/TB,max}$ of CBGs for generating respective HARQ-ACK information bits for a transport block reception for the serving cell. For example, for a number of C code blocks (CBs) in a transport block, the UE may determine a number of CBGs M, based on the RRC parameter (e.g., maxCodeBlockGroupsPerTransportBlock) indicating the maximum number $N_{HARQ-ACK}^{CBG/TB,max}$ of CBGs per TB. The UE may determine a number of HARQ-ACK bits for the transport block as $N_{HARQ-ACK}^{CBG/TB}$=M.

The UE may generate an ACK for the HARQ-ACK information bit of a CBG if the UE correctly received all code blocks of the CBG and may generate a NACK for the HARQ-ACK information bit of a CBG if the UE incorrectly received at least one code block of the CBG. If a UE correctly detects each of the $N_{HARQ-ACK}^{CBG/TB}$ CBGs and does not correctly detect the transport block for the $N_{HARQ-ACK}^{CBG/TB}$ CBGs, the UE may generate a NACK value for each of the $N_{HARQ-ACK}^{CBG/TB}$ CBGs. If the UE receives two transport blocks, the UE may concatenate the HARQ-ACK information bits for CBGs of the second transport block after the HARQ-ACK information bits for CBGs of the first transport block.

A HARQ-ACK codebook may include the $N_{HARQ-ACK}^{CBG/TB,max}$ HARQ-ACK information bits and, if $N_{HARQ-ACK}^{CBG/TB}$<$N_{HARQ-ACK}^{CBG/TB,max}$ for a transport block, the UE may generate a NACK value for the last $N_{HARQ-ACK}^{CBG/TB,max}$-$N_{HARQ-ACK}^{CBG/TB,max}$ HARQ-ACK information bits for the transport block in the HARQ-ACK codebook, to align the HARQ-ACK information size of all TBs based on the maximum value.

The number of HARQ-ACK information bits for a retransmission may be the same ($N_{HARQ-ACK}^{CBG/TB,max}$ bits). For example, if the UE generates a HARQ-ACK codebook in response to a retransmission of a transport block, corresponding to a same HARQ process as a previous transmission of the transport block, the UE may generate an ACK for each CBG that the UE correctly decoded in a previous transmission of the transport block.

The UE may not generate one HARQ-ACK information bit per transport block for a serving cell configured with CBG (e.g., from the $N_{cells}^{DL,CBG}$ serving cells). For example, instead, the UE may generate $N_{HARQ-ACK,max}^{CBG/TB,max}$ HARQ-ACK information bits per transport block for a serving cell from the $N_{cells}^{DL,CBG}$ serving cells, where $N_{HARQ-ACK,max}^{CBG/TB,max}$ may be the maximum value of $N_{TB,c}^{DL} \cdot N_{HARQ-ACK,c}^{CBG/TB,max}$ across all $N_{cells}^{DL,CBG}$ serving cells and $N_{TB,c}^{DL}$ may be the value of maxNrofCodeWordsScheduledByDCI for serving cell c. If for a serving cell c the number of HARQ-ACK information bit is less than the maximum value (e.g., $N_{TB,c}^{DL} \cdot N_{HARQ-ACK,c}^{CBG/TB,max}$<$N_{HARQ-ACK,max}^{CBG/TB,max}$), the UE may generate NACK for the last $N_{HARQ-ACK,max}^{CBG/TB,max}$-$N_{TB,c}^{DL} \cdot N_{HARQ-ACK,c}^{CBG/TB,max}$ HARQ-ACK information bits for serving cell c.

The counter DAI value and the total DAI value may apply separately for each of the first HARQ-ACK sub-codebook and the second HARQ-ACK sub-codebook. The UE may generate the HARQ-ACK codebook by appending the second HARQ-ACK sub-codebook to the first HARQ-ACK sub-codebook.

The UE may determine a number of HARQ-ACK information bits $n_{HARQ-ACK}$ for determining a transmission power for a corresponding PUCCH (PUCCH power control) based on $n_{HARQ-ACK}$=$n_{HARQ-ACK,TB}$+$n_{HARQ-ACK,CBG}$. For example, the PUCCH may comprise a HARQ-ACK codebook and/or SR and/or CSI report. The HARQ-ACK codebook may be a Type-2 (dynamic) codebook, comprising a CBG-based sub-codebook. For example, the UE may be configured with CBG-based communication for at least one serving cell. For example, the total number of HARQ-ACK information bits in the codebook and the SR bits and the CSI report bits may be less than a first value ($O_{ACK}$+$O_{SR}$+$O_{CSI}$≤11).

The UE may determine a number of HARQ-ACK information bits in a CBG sub-codebook, $n_{HARQ-ACK,CBG}$, as follows:

$$n_{HARQ-ACK,CBG} = ((V_{DAI,m_{last}}^{DL} - \sum_{c=0}^{N_{cells}^{DL,CBG}-1} U_{DAI,c}^{CBG}) \bmod(T_D)) N_{HARQ-ACK,max}^{CBG/TB,max} + \sum_{c=0}^{N_{cells}^{DL}-1} \sum_{m=0}^{M-1} N_{m,c}^{received,CBG}$$

where $V_{DAI,m_{last}}^{DL}$ may be a value of the counter DAI in a last DCI format scheduling CBG-based PDSCH reception for any serving cell c that the UE detects within the M PDCCH monitoring occasions, e.g., if the UE is configured with one serving cell ($N_{cells}^{DL}$=1).

$V_{DAI,m_{last}}^{DL}$ may be a value of a total DAI in a last DCI format scheduling CBG-based PDSCH reception for any serving cell c that the UE detects within the M PDCCH monitoring occasions, e.g., if the UE is configured with more than one serving cells ($N_{cells}^{DL}$>1).

$V_{DAI,m_{last}}^{DL}$=1, e.g., if the UE does not detect any DCI format scheduling CBG-based PDSCH reception for any serving cell c in any of the M PDCCH monitoring occasions.

$U_{DAI,c}^{CBG}$ may be a total number of DCI formats scheduling CBG-based PDSCH receptions that the UE detects within the M PDCCH monitoring occasions for serving cell c. $U_{DAI,c}^{CBG}$=0 if the UE does not detect any DCI format scheduling CBG-based PDSCH reception for serving cell c in any of the M PDCCH monitoring occasions.

$N_{m,c}^{received,CBG}$ may be a number of CBGs the UE receives in a PDSCH scheduled by a DCI format that supports CBG-based PDSCH reception that the UE detects in PDCCH monitoring occasion m for serving cell c and the UE reports corresponding HARQ-ACK information in the PUCCH.

The existing technology for determining PUCCH power control comprising HARQ-ACK codebook may fail to accurately capture the number of HARQ-ACK bits associated with a multi-PDSCH scheduling DCI in a Type-2 dynamic codebook. For example, the existing mechanism for PUCCH power control may be based on a 1:1 correspondence between a DCI format and a fixed count/number of ACK/NACK bits per DCI format (e.g., 1 bit for single TB and/or for two codewords transmission with bundling/joint feedback, 2 bits for two codewords transmission without bundling/joint feedback, and $N_{HARQ-ACK}^{CBG/TB,max}$ bits for CBG-based communication). However, with the introduction of multi-PDSCH scheduling DCI comprising DAI incremented per PDSCH, the UE may report different number of ACK/NACK bits per DCI depending on the actual number of scheduled PDSCHs, in order to reduce the HARQ-ACK codebook size. And thus, the legacy mechanism may no longer enable determining the accurate power for PUCCH transmission comprising HARQ-ACK codebook.

For an effective coding rate of HARQ-ACK report for PUCCH power control determination, the UCI size may be determined based on the effective ACK/NACK bits count for Type-2 dynamic codebook, comprising: (1) Number of transport blocks (TBs)/CBGs received in a PDSCH scheduled by a DCI format contributing to effective A/N in the codebook, and (2) Number of missed TBs/CBGs contributing to meaningful NACKs in the codebook. For example, in the following formula for TB-based scheduling:

$$n_{HARQ-ACK,TB}((V_{DAI,m_{last}}^{DL} - \Sigma_{c=0}^{N_{cells}^{DL}-1} U_{DAI,c}) \bmod (T_D)) N_{TB,max}^{DL} + \Sigma_{c=0}^{N_{cells}^{DL}-1} (\Sigma_{m=0}^{M-1} N_{m,c}^{received} + N_{SPS,c})$$

the term $\Sigma_{c=0}^{N_{cells}^{DL}-1} (\Sigma_{m=0}^{M-1} N_{m,c}^{received} + N_{SPS,c})$ corresponds to the number of received transport blocks (e.g., one HARQ-ACK bit per TB), and the term $((V_{DAI,m_{last}}^{DL} - \Sigma_{c=0}^{N_{cells}^{DL}-1} U_{DAI,c}) \bmod (T_D)) N_{TB,max}^{DB}$ corresponds to the number of HARQ-ACK bits generated for missed detected PDCCHs (missed DCIs), which is determined by subtracting the number of received DCIs ($\Sigma_{c=0}^{N_{cells}^{DL}-1} U_{DAI,c}$) from the last received total DAI (or last received counter DAI) ($V_{DAI,m_{last}}^{DL}$), and by multiplying the result by the maximum number of TBs that a PDSCH may comprise (e.g., $N_{TB,max}^{DL}=2$ in case two codewords are configured, e.g., if the value of maxNrofCodeWordsScheduledByDCI is 2 for any serving cell, otherwise, $N_{TB,max}^{DL}=1$). This formula is based on the assumption that one DCI schedules one PDSCH, and corresponds to one DAI value (C-DAI and T-DAI), and corresponds to one HARQ-ACK bit (or 2 HARQ-ACK bits in case of two codewords).

For example, in the following formula for CBG-based scheduling:

$$n_{HARQ-ACK,CBG} = ((V_{DAI,m_{last}}^{DL} - \Sigma_{c=0}^{N_{cells}^{DL,CBG}-1} U_{DAI,c}^{CBG}) \bmod (T_D)) N_{HARQ-ACK,max}^{CBG/TB,max} + \Sigma_{c=0}^{N_{cells}^{DL}-1} \Sigma_{m=0}^{M-1} N_{m,c}^{received,CBG}$$

the term $\Sigma_{c=0}^{N_{cells}^{DL}-1} \Sigma_{m=0}^{M-1} N_{m,c}^{received,CBG}$ corresponds to the number of received CBGs (e.g., one HARQ-ACK bit per CBG), and the term $((V_{DAI,m_{last}}^{DL} - \Sigma_{c=0}^{N_{cells}^{DL,CBG}-1} U_{DAI,c}^{CBG}) \bmod (T_D)) N_{HARQ-ACK,max}^{CBG/TB,max}$ corresponds to the number of HARQ-ACK bits generated for missed detected PDCCHs (missed DCIs), which is determined by subtracting the number of received DCIs associated with the CBG sub-codebook ($\Sigma_{c=0}^{N_{cells}^{DL}-1} U_{DAI,c}$) from the last received total DAI (or last received counter DAI) associated with the CBG sub-codebook ($V_{DAI,m_{last}}^{DL}$), and by multiplying the result by the maximum number of CBGs that a PDSCH may comprise ($N_{HARQ-ACK,max}^{CBG/TB,max}$). This formula is based on the assumption that one DCI schedules one PDSCH, and corresponds to one DAI value (C-DAI and T-DAI), and corresponds to fixed number of HARQ-ACK bits ($N_{HARQ-ACK,max}^{CBG/TB,max}$).

In the existing technology, a fixed number of NACKs are reported per missed DCI. And a number of missed DCIs is estimated based on a 1:1 correspondence between a DCI and a C-DAI value. However, with multi-PDSCH scheduling, a DCI may schedule more than one PDSCHs, and a DCI may correspond to multiple and/or variable number of HARQ-ACK bits, e.g., depending on the number of scheduled PDSCHs. Moreover, the multi-PDSCH scheduling DCI may comprise/indicate/correspond to (explicitly or implicitly) multiple DAI values (e.g., multiple C-DAIs). For example, each C-DAI may correspond to one PDSCH of the scheduled PDSCHs by the DCI. Therefore, the above subtraction may no longer result in the accurate number of missed DCIs. Also, the UE may generate different number of HARQ-ACK bits per DCI, and the number of missed DCIs may no longer be analogous to the number of missed TBs/CBGs. Therefore, the existing mechanism may fail to capture the true number of HARQ-ACK bits in the HARQ-ACK codebook for determination of PUCCH transmission power, e.g., when at least one serving cell is configured with multi-PDSCH scheduling and/or when DAI values are incremented based on number of scheduled PDSCHs.

In an example, when the UE is configured with multi-PDSCH scheduling and the DAI values are counted/incremented per DCI, the UE may generate a second HARQ-ACK sub-codebook associated with the multi-PDSCH scheduling DCIs. The existing technology may fall short in determining the number of HARQ-ACK bits of the new sub-codebook, because a DCI associated with the second sub-codebook is no longer associated with a single PDSCH. Therefore, the existing mechanism may not be able to accurately capture the number of NACKs reported per missed DCI.

In an example, one or more PDSCHs of multiple PDSCHs scheduled by a DCI may not be valid PDSCHs, e.g., may not have valid SLIVs (start and length indicator values). For example, one or more symbols of a PDSCH, indicated by the corresponding SLIV indicated by the TDRA field of the DCI, may overlap with an UL symbol in a TDD system. The UE may report NACKs for the one or more invalid PDSCHs scheduled by the DCI. However, these are meaningless NACKs which do not contribute to the meaningful feedback information, since the base station is aware of the invalidity of the one or more PDSCHs, and the NACKs are merely to avoid HARQ-ACK payload size ambiguity. However, based on the existing technology, the UE may increment the PUCCH power for such meaningless HARQ-ACK bits, which is unnecessary. Embodiments help the UE to determine an accurate and efficient PUCCH power for HARQ feedback transmission in case of multi-PDSCH scheduling, by taking the validity of the PDSCHs into account, and thus, avoiding excess power increment for invalid PDSCH(s). Based on the existing technology, the wireless device may not be able to efficiently and accurately determine the transmission power for PUCCH, in case of multi-PDSCH scheduling. Erroneous PUCCH power control may result in uplink collisions and/or unsuccessful uplink control transmission. This is a serious problem, especially in higher frequencies where multi-PDSCH scheduling is more important and requires efficient HARQ feedback procedure. Embodiments may enable accurate determination of PUCCH power control in case of multi-PDSCH scheduling.

Based on some of the embodiments, the wireless device may determine a transmission power for PUCCH by taking into account the number of PDSCHs that a DCI may eventually schedule. Based on the embodiment, a number of NACKs reported for missed TBs/CBGs may be accurately calculated based on the new DAI definition for multi-PDSCH scheduling and the actual count of the scheduled PDSCHs. Embodiments take into account the maximum number of schedulable PDSCHs by a DCI when using an existing definition of DAI. Embodiments may enhance the PUCCH power control when multi-PDSCH scheduling is configured, and for different alternatives of DAI definition: per PDSCH and per DCI. Based on the embodiments, the UE may determine a transmission power for a PUCCH transmission occasion based on a detected number of missed downlink assignments (e.g., PDSCHs). The UE may determine a number of missed downlink assignments/PDSCHs based on a number of received downlink assignments/PDSCHs. For example, the UE may determine a transmission power for a PUCCH transmission occasion, comprising HARQ-ACK information, based on a number of detected/received downlink assignments (e.g., PDSCH receptions) and/or a received DAI value corresponding to a last downlink assignment (e.g., PDSCH). For example, the DAI value may be a T-DAI and/or a C-DAI. For example, the UE may determine the transmission power for the PUCCH transmission occasion based on a number of PDSCHs scheduled by at least one multi-PDSCH scheduling DCI.

In an embodiment, a wireless device may receive one or more RRC message comprising configuration parameters. The configuration parameters may indicate that at least one serving cell of the UE is configured with multi-PDSCH scheduling. For example, the configuration parameters may comprise one or more time domain resource allocations (list or table) for PDSCH in one or more BWPs of the at least one serving cell (e.g., PDSCH-TimeDomainResourceAllocationList). For example, the one or more time domain resource allocations (e.g., TDRA table) may comprise one or more rows/entries indicating two or more (valid) time resources (e.g., SLIVs: starting symbol and length) for PDSCH scheduling.

The configuration parameters may indicate that one or more serving cells are configured for the UE. The one or more serving cells may be activated. The UE may determine that the one or more serving cells belong to a same PUCCH cell group. For example, the configuration parameters may indicate that a PUCCH cell group comprises the one or more serving cells.

The configuration parameters may indicate PDCCH monitoring occasions for receiving one or more DCI formats. The one or more DCI formats may comprise a TDRA field. The TDRA field may indicate a number of PDSCHs scheduled by the DCI format, e.g., based on a number of valid SLIVs indicated by the TDRA field. The DCI format may schedule multiple PDSCHs if the configuration parameters of the TDRA list/table of the serving cell (e.g., a scheduled cell) indicate at least one entry/row with multiple valid SLIVs. In an example, the configuration parameters may comprise a first parameter indicating that multi-PDSCH scheduling is enabled for the serving cell.

The configuration parameters may indicate a type of HARQ-ACK codebook (e.g., pdsch-HARQ-ACK-Codebook={semiStatic, dynamic} for a cell group (e.g., a PUCCH cell group). The cell group may comprise the at least one serving cell. For example, the configuration parameters may indicate a Type-2 (dynamic) HARQ-ACK codebook.

The configuration parameters may indicate that the DCI format comprise a DAI field. The DCI format may schedule a single PDSCH. The DCI format may schedule multiple PDSCHs. The DCI format may schedule one or more PDSCHs based on CBG scheduling. For example, a PDSCH may comprise one or more CBGs. The DAI field may indicate a counter DAI (C-DAI) and/or a total DAI (T-DAI).

The configuration parameters may indicate whether the C-DAI and/or T-DAI is counted/incremented per PDSCH or DCI format.

In an example, the configuration parameters may indicate that the C-DAI and/or T-DAI is counted/incremented per PDSCH. The UE may receive a DCI/DCI format. The DCI may schedule multiple PDSCH. The DCI may comprise a DAI field indicating a first C-DAI. The first C-DAI may correspond to a first PDSCH of the multiple PDSCHs scheduled by the DCI (e.g., refer to FIG. 22). For example, the first C-DAI may correspond to an earliest/first PDSCH of the multiple PDSCHs. The UE may determine C-DAI(s) of the remaining PDSCH(s) of the multiple PDSCHs by incrementing the first C-DAI by one for each subsequent PDSCH. In an example, the first C-DAI may correspond to a last PDSCH of the multiple PDSCHs. The UE may determine C-DAI(s) of the remaining PDSCH(s) of the multiple PDSCHs by decrementing the first C-DAI by one for each preceding/former PDSCH. In an example, the DAI field may indicate multiple C-DAIs, each corresponding to one PDSCH of the multiple PDSCHs, e.g., in an order of starting symbol.

The wireless device may receive a plurality of DCIs. The plurality of DCIs may be based on one or more DCI formats (e.g., DCI format 1_0, and/or DCI format 1_1 and/or DCI format 12 and/or DCI format 1_3). At least one of the plurality of DCIs may schedule one or more PDSCH receptions. At least one of the plurality of DCIs may schedule/indicate one or more SPS PDSCH release. At least one of the plurality of DCIs may schedule/activate one or more SPS PDSCH reception. At least one of the plurality of DCIs may indicate one or more SCell dormancy on an active DL BWPs of a serving cell.

At least one DCI of the plurality of DCIs may indicate a PUCCH resource for reporting HARQ-ACK feedback associated with the plurality of DCIs. For example, the UE may transmit HARQ-ACK information for/of the plurality of DCIs in the (same) PUCCH resource. For example, the at least one DCI may comprise a slot offset (e.g., PDSCH-to-HARQ_feedback timing indicator field) indicating, based on a first slot, a slot comprising the PUCCH resource. the first slot may be the DL slot corresponding to receiving the at least one DCI. The first slot may be the DL slot in which a first PDSCH, scheduled by the at least one DCI, is received.

The UE may determine one or more monitoring occasions of/for PDCCH. The configuration parameters may indicate that the PDCCH is associated with the one or more DCI formats. For example, the one or more monitoring occasions of the PDCCH may be configured with the one or more DCI formats. The UE may receive/detect the plurality of DCIs from/via the one or more monitoring occasions.

The UE may transmit HARQ-ACK information for/associated with/of the one or more PDCCH monitoring occasions in/via the (same) PUCCH resource.

The UE may determine/obtain a transmission power for the PUCCH resource, e.g., based on a power control/adjustment formula:

$$P_{PUCCH,b,f,c}(i, q_u, q_d, l) = $$

$$\min \begin{Bmatrix} P_{CMAX,f,c}(i), \\ P_{O\_PUCCH,b,f,c}(q_u) + 10\log_{10}(2^\mu \cdot M_{RB,b,f,c}^{PUCCH}(i)) + \\ PL_{b,f,c}(q_d) + \Delta_{F\_PUCCH}(F) + \Delta_{TF,b,f,c}(i) + g_{b,f,c}(i, l) \end{Bmatrix}$$

The UE may determine a PUCCH transmission power adjustment component (e.g., $\Delta_{TF,b,f,c}(i)$ on active UL BWP b of carrier f of primary cell c) for the transmission power of the PUCCH. The PUCCH transmission may comprise a UCI. For example, the UE may determine the PUCCH transmission power adjustment component based on a UCI payload size, UCI type (e.g., SR and/or HARQ-ACK and/or CSI), coding gain, coding scheme, and/or effective coding rate. For example, the UCI of the PUCCH may comprise a HARQ-ACK codebook.

The PUCCH transmission may comprise HARQ-ACK information bits. The PUCCH transmission may comprise the HARQ-ACK codebook/report, and/or other UL control information, e.g., SR and/or CSI report. The UE may determine the PUCCH transmission power adjustment component based on an effective coding rate of the UCI. The UE may determine the PUCCH transmission power adjustment component based on an effective coding rate of the HARQ-ACK codebook/report. The UE may determine the effective coding rate of the HARQ-ACK codebook/report based on a number of (effective/informative) HARQ-ACK information bits (e.g., $n_{HARQ-ACK}$) in the HARQ-ACK codebook.

The UE may determine the HARQ-ACK codebook based on the codebook type configured by RRC. For example, the configuration parameters may indicate a first type (e.g., Type-2 or dynamic) HARQ-ACK codebook. The UE may determine a size of the (dynamic) HARQ-ACK codebook based on a T-DAI indicated by a last DCI for which the UE reports the HARQ-ACK information via the HARQ-ACK codebook. The UE may determine a location/position of each HARQ-ACK information bit in the HARQ-ACK codebook based on a corresponding C-DAI indicated by a corresponding DCI, e.g., in an order of increasing C-DAI values.

The UE may encode the HARQ-ACK codebook. The coding mechanism may depend on a size of a UCI in the PUCCH transmission. The coding mechanism may depend on a format of the PUCCH resource. The coding mechanism may depend on a size of the HARQ-ACK codebook, e.g., comprising total HARQ-ACK bits ($O_{ACK}$). The UE may multiplex the encoded bits of the HARQ-ACK codebook ($O_{ACK}$ bits) in the PUCCH resource. The UE may multiplex encoded bits of SR ($O_{SR}$) and/or CSI report ($O_{CSI}$), if any, in the PUCCH resource.

For example, the UE may use a first PUCCH format (e.g., PUCCH format 2 or PUCCH format 3 or PUCCH format 4) for the PUCCH transmission. The PUCCH transmission may comprise a UCI. The UCI size may be in a first range. For example, a number of the UCI bits may be smaller than or equal to a first number (e.g., 11). For example, the UE may use a first coding scheme (e.g., RM coding) to encode the UCI and/or the HARQ-ACK codebook. For example, no CRC may be added to the UCI/HARQ-ACK codebook. In an example, the UE may determine the PUCCH transmission power adjustment component as follows:

$$\Delta_{TF,b,f,c}(i)=10\log_{10}(K_1 \cdot (n_{HARQ-ACK}(i)+O_{SR}(i)+O_{CSI}(i))/N_{RE}(i)$$

The HARQ-ACK codebook may comprise a total number of encoded bits ($O_{ACK}$ bits). The UE may determine a number of HARQ-ACK information bits (e.g., $n_{HARQ-ACK}$) for determining the transmission power for the PUCCH transmission (e.g., $n_{HARQ-ACK}(i)$ for PUCCH transmission occasion i). The HARQ-ACK codebook may be a Type-2/dynamic codebook. The HARQ-ACK codebook may comprise the HARQ-ACK information bits (e.g., $n_{HARQ-ACK}$ bits). The HARQ-ACK codebook may comprise one or more ACK/NACK bits in addition to the HARQ-ACK information bits. For example, the one or more ACK/NACK bits may comprise one or more NACK bits that the UE may generate and/or append to a first HARQ-ACK information corresponding to a first DCI, e.g., to alignment the size/length of the first HARQ-ACK information with a second (e.g., maximum) size/length of HARQ-ACK information in the codebook. The one or more HARQ-ACK information bits may be informative/effective bits. The one or more ACK/NACK bits, padded to the one or more HARQ-ACK information bits, may be known/uninformative/ineffective bits. The UE may determine the PUCCH transmission power based on a count of the one or more HARQ-ACK information bits ($n_{HARQ-ACK}$), as opposed to a count of the total number of bits of the HARQ-ACK codebook ($O_{ACK}$) that comprises the one or more (known) ACK/NACK bits.

The wireless device may receive a plurality of DCIs. At least one of the plurality of DCIs may schedule one or more PDSCH receptions. At least one of the plurality of DCIs may schedule/indicate one or more SPS PDSCH release. At least one of the plurality of DCIs may schedule/activate one or more SPS PDSCH reception. At least one of the plurality of DCIs may indicate one or more SCell dormancy on an active DL BWPs of a serving cell. At least one DCI of the plurality of DCIs may indicate a PUCCH resource for reporting HARQ-ACK feedback associated with the plurality of DCIs. For example, the UE may transmit HARQ-ACK information for/of the plurality of DCIs in the (same) PUCCH resource. The UE may determine one or more monitoring occasions of/for PDCCH. The configuration parameters may indicate that the PDCCH is associated with the one or more DCIs. The UE may receive/detect the plurality of DCIs from/via the one or more monitoring occasions. The UE may transmit HARQ-ACK information for/associated with/of the one or more PDCCH monitoring occasions in/via the (same) PUCCH resource. The UE may transmit a HARQ-ACK codebook, generated based on Type-2/dynamic codebook, via the PUCCH resource. The HARQ-ACK codebook may comprise the HARQ-ACK information of the one or more PDCCH monitoring occasions.

In an example, the UE may be configured with TB-based scheduling in the serving cells of the PUCCH cell group. In an example, the UE may not be configured with CBG-based scheduling in a serving cell of the PUCCH cell group (e.g., the UE is not provided PDSCH-CodeBlockGroupTransmission for each of the $N_{cells}^{DL}$ serving cells). For example, the HARQ-ACK information may correspond to PDSCH receptions scheduled by a DCI format that does not support CBG-based PDSCH receptions. The HARQ-ACK information may correspond to SPS PDSCH reception and/or SPS PDSCH release and/or SCell dormancy indication. A UCI size may be in a first range (e.g., $O_{ACK}+O_{SR}+O_{CSI} \leq 11$). The UE may determine a number of HARQ-ACK information bits (e.g., $n_{HARQ-ACK}$) in a Type-2/dynamic codebook for determining the transmission power for the PUCCH transmission as follows:

$$n_{HARQ-ACK}=n_{HARQ-ACK,TB}=((V_{DAI,m_{last}}^{DL}-\sum_{c=0}^{N_{cells}^{DL}-1}U_{DAI,c})\mod(T_D))N_{TB,max}^{DL}+\sum_{c=0}^{N_{cells}^{DL}-1}(\sum_{m=0}^{M-1}N_{m,c}^{received}+N_{SPS,c})$$

The HARQ-ACK information bits may comprise first HARQ-ACK information bits associated with received transport block(s) across the one or more (M) monitoring occasions and the one or more ($N_{cells}^{DL}$) serving cells. The first HARQ-ACK information bits may comprise HARQ-ACK information of SPS PDSCH receptions ($N_{SPS,c}$) by the UE across the one or more serving cells. The first HARQ- ACK information bits may comprise HARQ-ACK information of one or more received/detected DCI formats indicating SPS PDSCH release and/or SCell dormancy across the one or more (M) monitoring occasions and the one or more ($N_{cells}^{DL}$) serving cells.

A first term of the above formula for determining the number of HARQ-ACK information bits (e.g., $n_{HARQ-ACK}$) in a Type-2/dynamic codebook (the left side term: $\Sigma_{c=0}^{N_{cells}^{DL}-1}(\Sigma_{m=0}^{M-1}N_{m,c}^{received}+N_{SPS,c})$) may correspond to the first HARQ-ACK information bits associated with the received DCIs/PDSCHs. For example, the UE may determine the number of HARQ-ACK information bits based on a first number of received DCI formats and/or received PDSCHs, e.g., across the one or more (M) monitoring occasions and the one or more ($N_{cells}^{DL}$) serving cells associated with the PUCCH transmission.

The HARQ-ACK codebook may comprise second HARQ-ACK information bits associated with missed DCIs (detected missed PDCCH receptions). For example, one or more DCIs may be missed and/or not successfully detected/received.

A second term in the above formula for determining the number of HARQ-ACK information bits (e.g., $n_{HARQ-ACK}$) in a Type-2/dynamic codebook (right side term: $((V_{DAI,m_{last}}^{DL}-\Sigma_{c=0}^{N_{cells}^{DL}-1}U_{DAI,c})\mod(T_D))N_{TB,max}^{DL})$ may correspond to the second HARQ-ACK information bits associated with the missed DCI(s). For example, the UE may determine the number of HARQ-ACK information bits based on a second number of missed DCI formats $((V_{DAI,m_{last}}^{DL}-\Sigma_{c=0}^{N_{cells}^{DL}-1}U_{DAI,c})\mod(T_D))$ multiplied by a fixed number of HARQ-ACK bits (NACK bits) generated per missed DCI ($N_{TB,max}^{DL}$). This term of the formula is based on a 1:1 correspondence between a DCI (or PDCCH monitoring occasion) and a C-DAI value in a DAI counting process, such that a number of missed C-DAIs is equivalent to the number of missed DCIs. And also, based on the fact that a fixed number of NACK bits are generated per missed DCI ($N_{TB,max}^{DL}$). However, the existing mechanism may not work for multi-PDSCH scheduling DCI, where a DCI may schedule multiple PDSCHs/downlink assignments, and a C-DAI may correspond to a PDSCH/downlink assignment as opposed to a DCI. In fact, there is no more 1:1 correspondence between a DCI and a C-DAI value in the DAI counting process, and the number of missed C-DAIs is no longer equivalent to the number of missed DCIs. So, the existing mechanism may result in erroneous PUCCH power control.

In some embodiments, the UE may receive a DCI format. The DCI may comprise a DAI field. The DCI format may indicate at least one counter DAI value. A value of a C-DAI, indicated by a DCI format, may indicate/denote an accumulative number of pairs of {serving cell, downlink assignment}. The UE may receive one or more DCI formats via one or more monitoring occasions. The one or more DCI formats may indicate the (same) PUCCH resource for HARQ-ACK feedback transmission. The one or more DCI formats may schedule/indicate the downlink assignments. A downlink assignment may be/comprise a PDSCH reception. A downlink assignment may be/comprise a SPS PDSCH reception. A downlink assignment may be/comprise a SPS PDSCH release. A downlink assignment may be/comprise a SCell dormancy indication. The downlink assignments may be associated with the one or more DCI formats received via the one or more monitoring occasions. The C-DAI value may indicate/denote the accumulative number of pairs of {serving cell, downlink assignment} up to (and including) a current serving cell and a current downlink assignment.

In an example, a DCI format may schedule multiple PDSCHs. The DCI format may comprise multiple downlink assignments, each scheduling a PDSCH reception. The DCI format may be associated with multiple C-DAI values. For example, each C-DAI, of the multiple C-DAIs, may correspond to one downlink assignment of the multiple downlink assignments. The DCI format may comprise/indicate the multiple C-DAIs. The DCI format may indicate at least one of the C-DAIs. The DCI format may indicate a first C-DAI of the multiple C-DAIs. For example, the C-DAI may correspond to a first/earliest downlink assignment/PDSCH of the multiple downlink assignments/PDSCHS. For example, the C-DAI may correspond to a last downlink assignment/PDSCH of the multiple downlink assignments/PDSCHS.

In an example, the C-DAI may be counted/incremented in the following order: first, in an increasing order of PDSCH/downlink assignment reception starting time for PDSCHs/downlink assignments scheduled by a same/single DCI. Second, in increasing order of a first PDSCH/downlink assignment reception starting time for a same {serving cell, PDCCH monitoring occasion} pair, e.g., if the UE indicates by type2-HARQ-ACK-Codebook support for more than one PDSCH reception on a serving cell that are scheduled from a same PDCCH monitoring occasion. Third, in ascending order of serving cell index in the same PUCCH cell group and same PDCCH monitoring occasion. Fourth, in ascending order of PDCCH monitoring occasion index.

If, for an active DL BWP of a serving cell, the UE is not provided coresetPoolIndex or is provided coresetPoolIndex with value 0 for one or more first CORESETs and is provided coresetPoolIndex with value 1 for one or more second CORESETs, and is provided ackNackFeedbackMode=joint, the value of the counter DAI is in the order of the first CORESETs and then the second CORESETs for a same serving cell index and a same downlink assignment.

In some embodiments, the UE may receive a DCI format. The DCI may comprise a DAI field. The DCI format may indicate at least one total DAI value. A value of a T-DAI, indicated by a DCI format, may indicate/denote a total number of pairs of {serving cell, downlink assignment}. The T-DAI value may indicate/denote the total number of pairs of {serving cell, downlink assignment} up to (and including) a last downlink assignment in a current PDCCH monitoring occasion. The BS/UE may update T-DAI from PDCCH monitoring occasion to PDCCH monitoring occasion.

If, for an active DL BWP of a serving cell, the UE is not provided coresetPoolIndex or is provided coresetPoolIndex with value 0 for one or more first CORESETs and is provided coresetPoolIndex with value 1 for one or more second CORESETs, and is provided ackNackFeedbackMode=joint, the total DAI value counts the {serving cell, downlink assignment}-pair(s) for both the first CORESETs and the second CORESETs.

In a Type-2/dynamic codebook, the UE may determine that at least one DCI is missed based on a gap detected in the received DAI values (e.g., refer to FIG. 22). For example, if a last DAI (e.g., T-DAI or a largest C-DAI) received in a first monitoring occasion indicates value x, and a first (e.g., earliest)C-DAI received in a second monitoring occasion, after the first monitoring occasion, indicates value y, where y>x+1, then a gap/discontinuity in the DAI counter is detected (e.g., C-DAI=x+1 is missed) and the UE determined that at least one DCI is missed. For example, in FIG. 22, UE receives T-DAI=2 in the first monitoring occasion in slot n, and received C-DAI=4 in the third monitoring occasion in slot n+2. The UE determines that a DCI (DCI 1) is missed. Because the UE expects to receive a C-DAI=3. The UE may determine that a DCI associated with C-DAI=3 is missed/not received.

Figure 24:
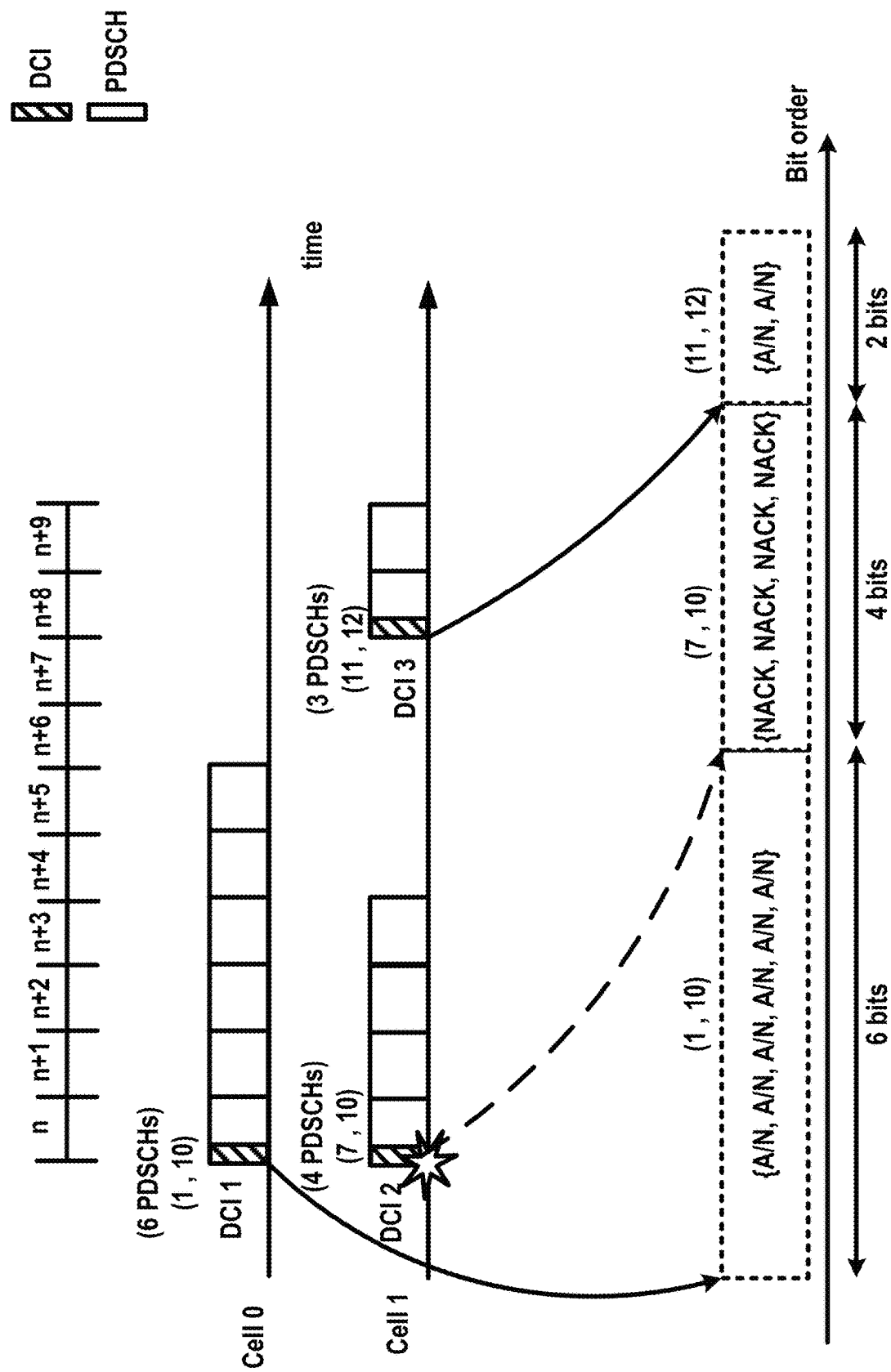
FIG. 24 illustrates an example DAI counting process, according to some embodiments.

FIG. 24 illustrates an example DAI counting process, according to some embodiments. The UE may receive configuration parameters indicating two serving cells for the UE (cell 0 and cell 1). The configuration parameters may indicate that the two serving cells belong to a same PUCCH cell group. The configuration parameters may indicate a Type-2/dynamic codebook for the PUCCH cell group. The configuration parameters may indicate that multi-PDSCH scheduling via at least one DCI format is configured for the two serving cells.

As shown in FIG. 24, the UE may receive a first DCI in a first PDCCH monitoring occasion in slot n via cell 0. The first DCI may schedule 6 PDSCHs. The first DCI may comprise a DAI field. The DAI field may indicate a C-DAI of a first PDSCH of the multiple PDSCHs (e.g., C-DAI=1 corresponding to the first/earliest PDSCH). The C-DAI may indicate an accumulative number of pairs of {serving cells, downlink assignments} up to the first PDSCH (downlink assignment). The UE may determine a C-DAI value for each of the multiple PDSCHs. For example, the UE may determine/assign C-DAIs as follows: for first PDSCH in slot n: C-DAI=1, for second PDSCH in slot n+1: C-DAI=2, for third PDSCH in slot n+2: C-DAI=3, for fourth PDSCH in slot n+3: C-DAI=4, for fifth PDSCH in slot n+4: C-DAI=5, and for sixth PDSCH in slot n+5: C-DAI=6. The DAI field in the first DCI may indicate a T-DAI indicating the total number of pairs of {serving cells, downlink assignments} up to a last downlink assignment scheduled/indicated in the current PDCCH monitoring occasion (T-DAI=10). The T-DAI received in the first DCI indicates 10, which means a total of 10 downlink assignments are scheduled/indicated via one or more DCIs in this (first) PDCCH monitoring occasion. The UE receives the first DCI which schedules 6 PDSCHs (downlink assignments). The UE may or may not receive any other DCI formats via the first PDCCH monitoring occasion.

The BS may transmit DCI 2 via cell 1 in the first PDCCH monitoring occasion. The DCI 2 may comprise 4 downlink assignments. For example, the DCI 2 may schedule 4 PDSCHs. The BS may indicate via the DAI field in DCI 2, indexes for the 4 downlink assignments. For example, DCI 2 may comprise C-DAI=7 corresponding to a first PDSCH scheduled by DCI 2. For example, DCI 2 may comprise T-DAI=10, which is consistent with T-DAI indicated by DCI 1 in the same PDCCH monitoring occasion.

The UE may not receive DCI 2 via cell 1 in example of FIG. 24. The UE may determine, based on the C-DAI and the T-DAI received via DCI 1 in the first PDCCH monitoring occasion, that 4 C-DAIs are missed (10−6=4). The UE may determine that at least one DCI is missed in the first PDCCH monitoring occasion. However, since a multi-PDSCH scheduling is configured (e.g., the RRC configures a TDRA table for PDSCH that comprises at least one row with multiple valid SLIVs), a DCI may potentially schedule one or two or more PDSCHs (downlink assignments). Therefore, the UE may not be able to determine how many DCIs are missed based on the existing mechanism.

The UE may receive a third DCI (DCI 3) via cell 1 in a second PDCCH monitoring occasion in slot n+8. The first DCI and the first DCI may indicate the same PUCCH resource for HARQ-feedback transmission. The UE may generate a HARQ-ACK codebook comprising HARQ-ACK information associated with the first DCI and the third DCI, and may transmit the HARQ-ACK codebook via the PUCCH resource. The third DCI may schedule 2 PDSCHs. The third DCI may comprise a DAI field. The DAI field may indicate a C-DAI of a first PDSCH of the multiple PDSCHs (e.g., C-DAI=11 corresponding to the first/earliest PDSCH). The UE may determine a C-DAI value for each of the multiple PDSCHs. For example, the UE may determine/assign C-DAIs as follows: for first PDSCH in slot n+8: C-DAI=11, for second PDSCH in slot n+9: C-DAI=12. The DAI field in the third DCI may indicate a T-DAI indicating the total number of pairs of {serving cells, downlink assignments} up to a last downlink assignment scheduled/indicated in the current PDCCH monitoring occasion (T-DAI=12). The T-DAI received in the third DCI indicates 12, which means a total of 12 downlink assignments are scheduled/indicated via one or more DCIs up this (second) PDCCH monitoring occasion. And since the UE has already determined the downlink assignment corresponding to C-DAI=12, UE determines no more missed DCIs/downlink assignments.

Figure 25:
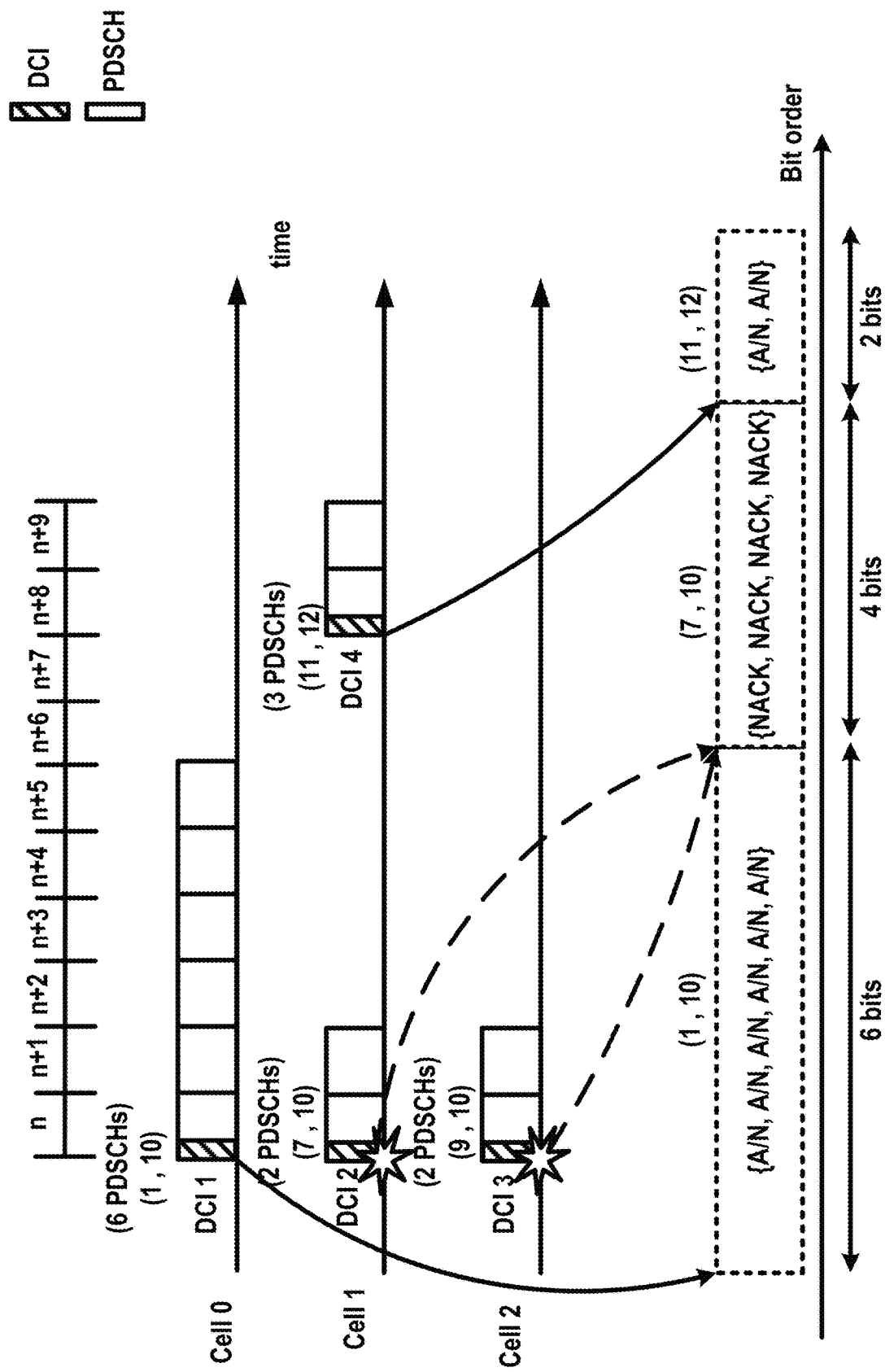
FIG. 25 illustrates an example DAI counting process, according to some embodiments.

In examples of FIG. 24 and FIG. 25, a size of a C-DAI and/or T-DAI field may be 4 bits. For example, the configuration parameters may indicate the size/bitlength of the C-DAI and/or T-DAI in a DCI format. The UE may determine the C-DAI and T-DAI values based on $T_D = 2^{CDAIbitlength} = 2^4 = 16$. As shown in FIG. 23A and FIG. 23B, the UE may wrap the numbers based on (mod $T_D$) function.

FIG. 25 illustrates an example DAI counting process, according to some embodiments. In this example, UE receives DCI 1 via cell 0 in the first PDCCH monitoring occasion in slot n, and receives DCI 4 via cell 1 in the second PDCCH monitoring occasion in slot n+8. The received DAI values (C-DAIs and T-DAIs) and the number of scheduled PDSCHs via each of the received DCIs is the same as the example in FIG. 24. The UE determines that at least one DCI is missing. However, similar to FIG. 24, the UE cannot determine how many DCIs are missing.

Based on the existing PUCCH power control mechanism, examples of FIG. 24 and FIG. 25 result in same HARQ-ACK codebook (as shown below the figures), but different transmission power for PUCCH. For example, in FIG. 24 PUCCH power is determined based on 1 missed DCI, and in FIG. 25 PUCCH power is determined based on 2 missed DCIs.

The examples of FIG. 24 and FIG. 25 illustrate that based on the existing mechanism, the UE may not be able to determine a number of missed DCIs when multi-PDSCH scheduling is configured at least in one serving cell and/or when DAI is counted/incremented PDSCH/downlink assignment. In both example, UE has received the same information, however, in FIG. 24 1 DCI is missing while in FIG. 25 two DCIs are missing. Thus, the existing PUCCH power control mechanism, which works based on number of missed DCIs, may not work accurately/effectively anymore.

Embodiments may enable accurate PUCCH power control determination in case multi-PDSCH scheduling is configured for at least one serving cell of the PUCCH cell group.

In an embodiment, the UE may determine a transmission power for a PUCCH transmission occasion based on a detected number of missed downlink assignments (e.g., PDSCHs). The UE may determine a number of missed downlink assignments/PDSCHs based on a number of received downlink assignments/PDSCHs. For example, the UE may determine a transmission power for a PUCCH transmission occasion, comprising HARQ-ACK information, based on a number of detected/received downlink assignments (e.g., PDSCH receptions) and/or a received DAI value corresponding to a last downlink assignment (e.g., PDSCH). For example, the DAI value may be a T-DAI and/or a C-DAI. For example, the UE may determine the transmission power for the PUCCH transmission occasion based on a number of PDSCHs scheduled by at least one multi-PDSCH scheduling DCI.

For example, the DAI value may be received in a last PDCCH monitoring occasion associated with the HARQ-ACK codebook. The UE may determine the PDCCH monitoring occasions associated with the HARQ-ACK codebook, as the union of PDCCH monitoring occasions across active DL BWPs of configured serving cell(s) (e.g., in the PUCCH cell group). The UE may determine monitoring occasions for PDCCH with DCI format comprising downlink assignments: e.g., scheduling PDSCH receptions and/or SPS PDSCH release and/or indicating SCell dormancy on an active DL BWP of a serving cell. The UE may index the PDCCH monitoring occasions in an ascending order of their start times. The cardinality of the set of PDCCH monitoring occasions may define a total number M of PDCCH monitoring occasions across the serving cell(s).

For example, the DAI value may be received via at least one DCI format that the UE detects in the last PDCCH monitoring occasion. For example, the DAI value may be received via a least DCI format that the UE detects in the last PDCCH monitoring occasion. For example, the DAI value may be received via a least DCI format that the UE detects in the PDCCH monitoring occasions.

In an example, the UE may receive configuration parameters indicating one or more serving cells for the UE. The one or more serving cells may belong to a same PUCCH cell group. The UE may be configured with TB-based scheduling in the serving cells of the PUCCH cell group. In an example, the UE may not be configured with CBG-based scheduling in a serving cell of the PUCCH cell group (e.g., the UE is not provided PDSCH-CodeBlockGroupTransmission for each of the $N_{cells}^{DL}$ serving cells).

The UE may receive one or more DCIs via one or more PDCCH monitoring occasions of at least one DCI format. The at least one DCI format may be configured with multi-PDSCH scheduling. For example, at least one DCI of the one or more DCI formats may schedule multiple PDSCHs. The at least one DCI may comprise multiple downlink assignments, each scheduling one PDSCH. The one or more DCIs may indicate a PUCCH resource for HARQ-ACK transmission.

The UE may determine the PUCCH resource for transmission of a HARQ-ACK codebook comprising HARQ-ACK information corresponding to the one or more DCIs. The HARQ-ACK information may correspond to all downlink assignments indicated by the one or more DCIs. A downlink assignment may be/comprise a PDSCH reception. A downlink assignment may be/comprise a SPS PDSCH reception. A downlink assignment may be/comprise a SPS PDSCH release. A downlink assignment may be/comprise a SCell dormancy indication. The downlink assignments may be associated with the one or more DCI formats received via the one or more monitoring occasions.

For example, the HARQ-ACK information may correspond to PDSCH receptions scheduled by a DCI format that does not support CBG-based PDSCH receptions. The HARQ-ACK information may correspond to SPS PDSCH reception and/or SPS PDSCH release and/or SCell dormancy indication. A UCI size may be in a first range (e.g., $O_{ACK}+O_{SR}+O_{CSI} \leq 11$).

For example, the UE may determine a number of HARQ-ACK information bits (e.g., $n_{HARQ-ACK}$) in a Type-2/dynamic codebook for determining the transmission power for the PUCCH transmission as follows:

$$n_{HARQ-ACK} = n_{HARQ-ACK,TB} = ((V_{DAI,m_{last}}^{DL} - \Sigma_{c=0}^{N_{cells}^{DL}-1} U_{DAI,c}) \mod(T_D)) N_{TB,max}^{DL} + \Sigma_{c=0}^{N_{cells}^{DL}-1} (\Sigma_{m=0}^{M-1} N_{m,c}^{received} + N_{SPS,c})$$

M may be a total number of PDCCH monitoring occasions associated with the HARQ-ACK codebook (reported via the PUCCH transmission). $N_{cells}^{DL}$ may be the number of serving cells of the UE, associated with the PUCCH cell group.

The UE may be configured with a single serving cell. For example, the PUCCH cell group may comprise one serving cell ($N_{cells}^{DL}=1$). The UE may be configured with C-DAI and may not be configured with T-DAI. For example, the configuration parameters may indicate a bit-width of C-DAI field in a DCI format. For example, the configuration parameters may indicate that a bit-width of T-DAI field in the DCI format is zero. The DCI format may indicate at least one C-DAI for a downlink assignment/PDSCH. The DCI may not indicate a T-DAI.

The UE may determine the number of HARQ-ACK information bits ($n_{HARQ-ACK}$) based on a value of $V_{DAI,m_{last}}^{DL}$. The UE may determine $V_{DAI,m_{last}}^{DL}$ based on a value of a counter DAI in a last DCI format that the UE may detect within the M PDCCH monitoring occasions. For example, the UE may receive multiple DCIs via one or more (M) PDCCH monitoring occasions. The last DCI format may or may not be received via a last PDCCH monitoring occasion. Each DCI of the multiple DCIs may comprise one or more downlink assignments, e.g., may schedule one or more PDSCH receptions and/or indicate SPS PDSCH release and/or indicate SCell dormancy, for any serving cell c. The last DCI may schedule multiple PDSCHs/downlink assignments. In an example, the UE may determine $V_{DAI,m_{last}}^{DL}$ based on a value of a counter DAI corresponding to a last downlink assignment/PDSCH scheduled by a last DCI format that the UE may detect within the M PDCCH monitoring occasions. In an example, the last DCI may comprise/indicate the counter DAI corresponding to the last downlink assignment/PDSCH. In an example, the counter DAI in the last DCI may correspond to a first PDSCH/downlink assignment scheduled/indicated by the last DCI. The UE may determine $V_{DAI,m_{last}}^{DL}$ based on the counter DAI of the first (e.g., earliest) PDSCH indicated by the last DCI and a number of PDSCHs scheduled by the last DCI.

Figure 26:
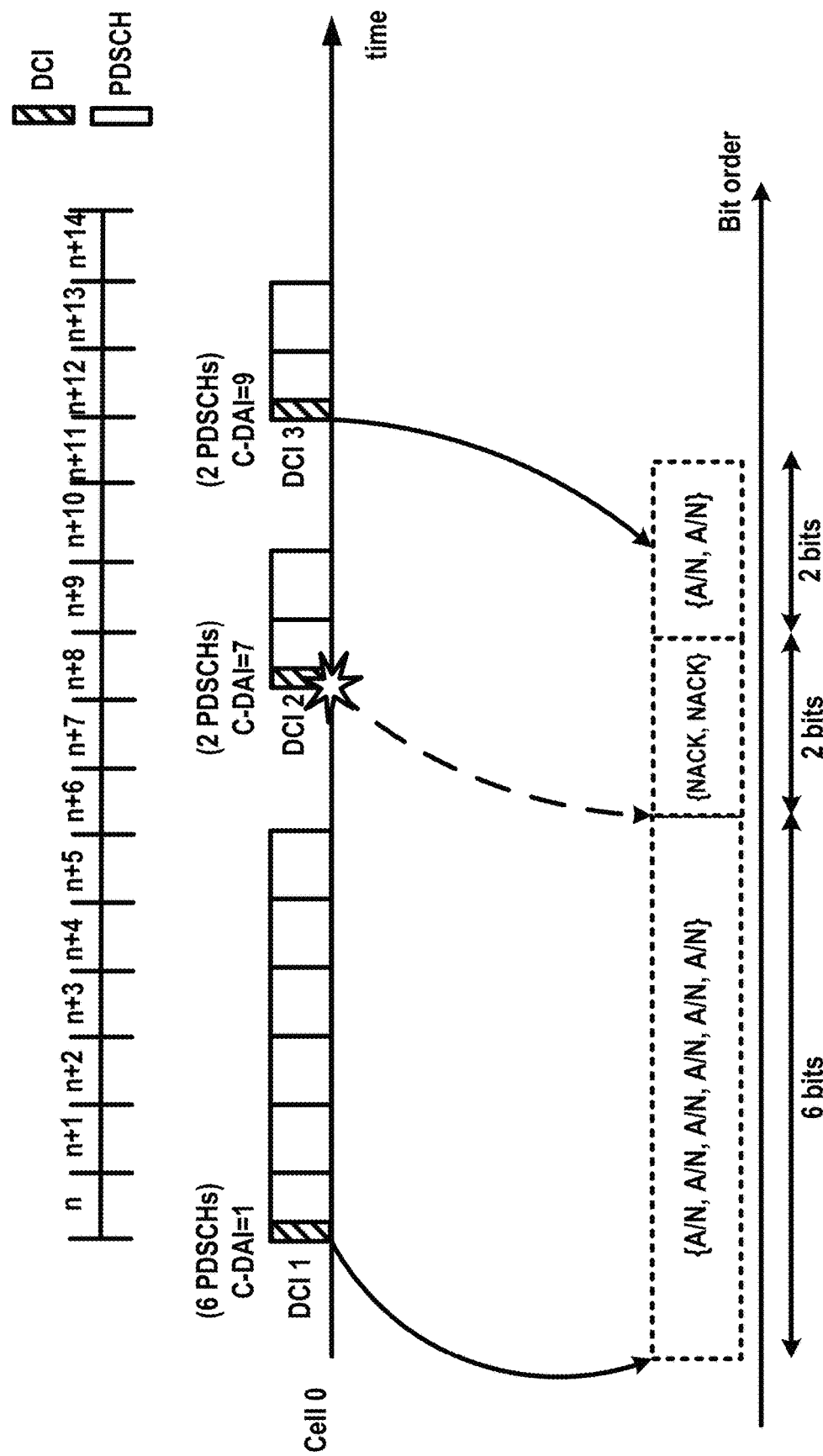
FIG. 26 illustrates an example of DAI counting in a single serving cell, according to some embodiments.

FIG. 26 illustrates an example of DAI counting in a single serving cell, according to some embodiments. The UE receive DCI 1 in a first PDCCH monitoring occasion in slot n. The DCI 1 may schedule 6 PDSCHs. The DCI 1 may comprise a C-DAI field indicating C-DAI of one of the 6 PDSCHs. For example, the C-DAI in the DCI 1 may correspond to the first PDSCH (C-DAI=1). In another example not shown in this figure, the C-DAI in the DCI 1 may correspond to the last PDSCH (C-DAI=6). The UE may determine C-DAI values corresponding to remaining PDSCHs (e.g., PDSCH 2 to PDSCH 6) by incrementing the indicated C-DAI of PDSCH 1. The UE may miss DCI 2 in a second PDCCH monitoring occasion. The UE may receive DCI 3 in a third PDCCH monitoring occasion in slot n+12. The DCI 3 may schedule 2 PDSCHs. The DCI 3 may comprise a C-DAI field indicating C-DAI of one of the 2 PDSCHs. For example, the C-DAI in the DCI 3 may correspond to the first PDSCH (C-DAI=9). In another example not shown in this figure, the C-DAI in the DCI 3 may correspond to the last PDSCH (C-DAI=10). The UE may determine C-DAI values corresponding to remaining PDSCH by incrementing the indicated C-DAI.

The UE may determine, based on the received C-DAI values and the number of scheduled PDSCHs by each of the received DCIs, that at least one DCI comprising one or downlink assignments and/or scheduling one or more PDSCHs is missed. For example, in FIG. 26 The UE may determine that downlink assignments/PDSCHs associated with C-DAI=7 C-DAI=8 are not received.

The UE may determine $V_{DAI,m_{last}}^{DL}$ based on a value of a counter DAI corresponding to a last downlink assignment/PDSCH scheduled by a DCI 3. In example of FIG. 26, DCI 3 (last DCI) indicates C-DAI=9 for a first scheduled PDSCH. The UE determines C-DAI=10 for a last PDSCH scheduled by DCI 3. Therefore, UE determines $V_{DAI,m_{last}}^{DL}=10$.

The UE may determine the number of HARQ-ACK information bits ($n_{HARQ-ACK}$) based on a value of $\sum_{c=0}^{N_{cells}^{DL}-1} U_{DAI,c}$. The UE may determine $U_{DAI,c}$ based on a total number of downlink assignments/PDSCHs scheduled by one or more DCIs. The UE may detect the one or more DCIs within the M PDCCH monitoring occasions for serving cell c. Each DCI may comprise one or more downlink assignments. A downlink assignment may indicate a PDSCH reception and/or SPS PDCSH reception and/or SPS PDSCH release and/or SCell dormancy. The UE may determine $\sum_{c=0}^{N_{cells}^{DL}-1} U_{DAI,c}$ based on a summation of total downlink assignments scheduled/indicated/received within the total M PDCCH monitoring occasions across the one or more ($N_{cells}^{DL}$) serving cells. In an example, $U_{DAI,c}=0$ if the UE does not detect any DCI format scheduling PDSCH reception, indicating SPS PDSCH release or indicating SCell dormancy for serving cell c in any of the M PDCCH monitoring occasions.

The UE may determine the C-DAI and T-DAI values based on $T_D=2^{CDAIbitlength}=2^4=16$.

The UE may determine $N_{TB,max}^{DL}$ based on a configured number of codewords in a PDSCH and/or whether spatial bundling is configured in at least one serving cell. For example, $N_{TB,max}^{DL}=2$ if configuration parameters indicate that a value of maxNrofCodeWordsScheduledByDCI is 2 for any serving cell c and/or spatial bundling is not configured (e.g., harq-ACK-SpatialBundlingPUCCH is not provided). For example, $N_{TB,max}^{DL}=1$ if configuration parameters indicate that a value of maxNrofCodeWordsScheduledByDCI is 2 for any serving cell c and/or spatial bundling is configured (e.g., harq-ACK-SpatialBundlingPUCCH is not provided). For example, $N_{TB,max}^{DL}=1$ if configuration parameters indicate that a value of maxNrofCodeWordsScheduledByDCI is 1 for any serving cell c.

The UE may determine $N_{m,c}^{received}$ based on a number of transport blocks the UE receives in a PDSCH scheduled by a DCI format that the UE detects in PDCCH monitoring occasion m for serving cell c. For example, harq-ACK-SpatialBundlingPUCCH may not be provided/configured. The UE may determine $N_{m,c}^{received}$ based on a number of PDSCH scheduled by a DCI format that the UE detects in PDCCH monitoring occasion m for serving cell c. For example, harq-ACK-SpatialBundlingPUCCH may be configured/provided. The UE may determine $N_{m,c}^{received}$ based on a number of DCI format that the UE detects and indicate SPS PDSCH release in PDCCH monitoring occasion m for serving cell c. The UE may determine $N_{m,c}^{received}$ based on a number of DCI format that the UE detects and indicate SCell dormancy in PDCCH monitoring occasion m for serving cell c.

The UE may determine $N_{SPS,c}$ based on a SPS PDSCH receptions by the UE on serving cell c for which the UE transmits corresponding HARQ-ACK information in the same PUCCH as for HARQ-ACK information corresponding to PDSCH receptions within the M PDCCH monitoring occasions.

For the example of FIG. 26, the UE may determine $n_{HARQ-ACK} =$ $n_{HARQ-ACK,TB} = \left(\left(V_{DAI,m_{last}}^{DL} - \sum_{c=0}^{N_{cells}^{DL}-1} U_{DAI,c}\right) \mod(T_D)\right) N_{TB,max}^{DL} +$ $\sum_{c=0}^{N_{cells}^{DL}-1}\left(\sum_{m=0}^{M-1} N_{m,c}^{received} + N_{SPS,c}\right) =$ $((10 - (6 + 2)) \mod 16) \times 1 + (8) = 2 + 8 = 10$ bits which is equal to the number of bits generated for/in the HARQ-ACK codebook as shown in the bottom of FIG. 26 (6 bits+2 bits+2 bits=10 bits). Reader may confirm that the proposed embodiment result in an accurate calculation towards PUCCH power determination, whereas the old (legacy) mechanism would result in erroneous calculations.

The UE may be configured with multiple serving cells. For example, the PUCCH cell group may comprise the multiple serving cells ($N_{cells}^{DL}>1$). The UE may be configured with C-DAI and T-DAI. For example, the configuration parameters may indicate a bit-width of C-DAI field in a DCI format. For example, the configuration parameters may indicate a bit-width of T-DAI field in the DCI format. The DCI format may indicate at least one C-DAI for a downlink assignment/PDSCH. The DCI may indicate a T-DAI.

The UE may determine the number of HARQ-ACK information bits ($n_{HARQ-ACK}$) based on a value of $V_{DAI,m_{last}}^{DL}$. The UE may determine $V_{DAI,m_{last}}^{DL}$ based on a value of a total DAI in at least one DCI format that the UE may detect within a last PDCCH monitoring occasion of the M PDCCH monitoring occasions. For example, the UE may receive multiple DCIs via one or more (M) PDCCH monitoring occasions. Each DCI of the multiple DCIs may comprise one or more downlink assignments, e.g., may schedule one or more PDSCH receptions and/or indicate SPS PDSCH release and/or indicate SCell dormancy, for any serving cell c. For example, the UE may detect/receive the at least one DCI format/DCI in the last PDCCH monitoring occasion. The at least one DCI/DCI format may comprise a T-DAI field. The at least one DCI format may indicate a T-DAI associated with a last downlink assignment/PDSCH scheduled via the last PDCCH monitoring occasion. The UE may determine $V_{DAI,m_{last}}^{DL}$ based on a last received T-DAI within the M PDCCH monitoring occasions. The UE may determine $V_{DAI,m_{last}}^{DL}$ based on a number of PDSCHs/downlink assignments scheduled by the at least one DCI format. For example, the UE may determine $V_{DAI,m_{last}}^{DL}$ based on a value of a total DAI in the at least one DCI format and the number of PDSCHs/downlink assignments scheduled by the at least one DCI format. For example, the UE may receive/detect the at least one DCI format that comprises/indicates a T-DAI field in the last PDCCH monitoring occasion within the M PDCCH monitoring occasions associated with the HARQ-ACK codebook.

In an example, the UE may determine $V_{DAI,m_{last}}^{DL}$ based on a value of a total DAI corresponding to a last downlink assignment/PDSCH scheduled by the at least one DCI format that the UE may detect in a last PDCCH monitoring occasion within the M PDCCH monitoring occasions. In an example, the at least one DCI may comprise/indicate the total DAI corresponding to the last downlink assignment/PDSCH scheduled by the at least one DCI. In an example, the total DAI in the at least one DCI may correspond to a first PDSCH/downlink assignment scheduled/indicated by the at least one DCI. The UE may determine $V_{DAI,m_{last}}^{DL}$ based on the total DAI of the first (e.g., earliest) PDSCH indicated by the at least one DCI and a number of PDSCHs scheduled by the at least one DCI.

The UE may determine $V_{DAI,m_{last}}^{DL}$ on a value of a total DAI in a last DCI format that the UE may detect within the M PDCCH monitoring occasions. For example, the UE may receive multiple DCIs via one or more (M) PDCCH monitoring occasions. The last DCI format may or may not be received via a last PDCCH monitoring occasion. Each DCI of the multiple DCIs may comprise one or more downlink assignments, e.g., may schedule one or more PDSCH receptions and/or indicate SPS PDSCH release and/or indicate SCell dormancy, for any serving cell c. The last DCI may schedule multiple PDSCHs/downlink assignments. In an example, the UE may determine $V_{DAI,m_{last}}^{DL}$ based on a value of a total DAI corresponding to a last downlink assignment/PDSCH scheduled by a last DCI format that the UE may detect within the M PDCCH monitoring occasions. In an example, the last DCI may comprise/indicate the total DAI corresponding to the last downlink assignment/PDSCH. In an example, the total DAI in the last DCI may correspond to a first PDSCH/downlink assignment scheduled/indicated by the last DCI. The UE may determine $V_{DAI,m_{last}}^{DL}$ based on the total DAI of the first (e.g., earliest) PDSCH indicated by the last DCI and a number of PDSCHs scheduled by the last DCI.

In an example, the UE may not receive/detect any DCI format in a last PDCCH monitoring occasion of the M PDCCH monitoring occasions. For example, the UE may not receive/detect any DCI format comprising/indicating a T-DAI field. The UE may receive at least one DCI via the M PDCCH monitoring occasions. Each DCI of the at least one DCI may comprise one or more downlink assignments, e.g., may schedule one or more PDSCH receptions and/or indicate SPS PDSCH release and/or indicate SCell dormancy, for any serving cell c. The at least one DCI may not comprise/indicate a T-DAI field. In an example, one or more DCIs, of the at least one DCI, received via the last PDCCH monitoring occasion may not comprise/indicate a T-DAI field. The UE may determine $V_{DAI,m_{last}}^{DL}$ based on a value of a C-DAI. For example, a last received DCI may indicate the C-DAI. For example, the UE may determine $V_{DAI,m_{last}}^{DL}$ based on a value of the C-DAI indicated by the last DCI. The UE may receive the last DCI in a last PDCCH monitoring occasion of the M PDCCH monitoring occasions. For example, DCIs may be indexed/ordered in an ascending order of serving cell indexes for a same PDCCH monitoring occasion, followed by ascending order of PDCCH monitoring occasion indexes. The last DCI may be received via a highest serving cell index in a last (latest) PDCCH monitoring occasion. The UE may determine $V_{DAI,m_{last}}^{DL}$ based on the C-DAI of the first (e.g., earliest) PDSCH/downlink assignment indicated by the last DCI and a number of PDSCHs/downlink assignments scheduled by the last DCI.

In the example of FIG. 24, the UE may determine $V_{DAI,m_{last}}^{DL}$ based on a T-DAI received in the second (last) PDCCH monitoring occasion via DCI 3 (T-DAI=12). For the example of FIG. 24, the UE may determine $n_{HARQ-ACK} =$ $$n_{HARQ-ACK,TB} = \left(\left(V_{DAI,m_{last}}^{DL} - \sum_{c=0}^{N_{cells}^{DL}-1} U_{DAI,c}\right) \bmod(T_D)\right) N_{TB,max}^{DL} +$$

$$\sum_{c=0}^{N_{cells}^{DL}-1}\left(\sum_{m=0}^{M-1} N_{m,c}^{received} + N_{SPS,c}\right) =$$

$((12 - (6+2)) \bmod 16) \times 1 + (8) = 4 + 8 = 12$ bits which is equal to the number of bits generated for/in the HARQ-ACK codebook as shown in the bottom of FIG. 24 (6 bits+4 bits+2 bits=12 bits).

In the example of FIG. 25, the UE may determine $V_{DAI,m_{last}}^{DL}$ based on a T-DAI received in the second (last) PDCCH monitoring occasion via DCI 4 (T-DAI=12). For the example of FIG. 25, the UE may determine $n_{HARQ-ACK} =$ $$n_{HARQ-ACK,TB} = \left(\left(V_{DAI,m_{last}}^{DL} - \sum_{c=0}^{N_{cells}^{DL}-1} U_{DAI,c}\right) \bmod(T_D)\right) N_{TB,max}^{DL} +$$

$$\sum_{c=0}^{N_{cells}^{DL}-1}\left(\sum_{m=0}^{M-1} N_{m,c}^{received} + N_{SPS,c}\right) =$$

$((12 - (6+2)) \bmod 16) \times 1 + (8) = 4 + 8 = 12$ bits which is equal to the number of bits generated for/in the HARQ-ACK codebook as shown in the bottom of FIG. 24 (6 bits+4 bits+2 bits=12 bits).

In the above examples $N_{TB,max}^{DL}=1$. For example, configuration parameters may indicate that a value of maxNrofCodeWordsScheduledByDCI is 2 for any serving cell c and/or spatial bundling is configured (e.g., harq-ACK-SpatialBundlingPUCCH is not provided). For example, configuration parameters may indicate that a value of maxNrofCodeWordsScheduledByDCI is 1 for any serving cell c.

In an example, the UE may determine a number of HARQ-ACK information bits (e.g., $n_{HARQ-ACK}$) in a Type-2/dynamic codebook for determining the transmission power for the PUCCH transmission as follows:

$n_{HARQ-ACK}=n_{HARQ-ACK,TB}=((V_{DAI,m_{last}}^{DL}-$
$\sum_{c=0}^{N_{cells}^{DL}-1}\sum_{l=0}^{U_{DAI,c}-1}U_{DAI,c,l})\bmod(T_D))$
$N_{TB,max}^{DL}+\sum_{c=0}^{N_{cells}^{DL}-1}(\sum_{m=0}^{M-1}N_{m,c}^{received}+$
$N_{SPS,c})$ The UE may determine the number of HARQ-ACK information bits ($n_{HARQ-ACK}$) based on a value of $\sum_{c=0}^{N_{cells}^{DL}-1}\sum_{l=0}^{U_{DAI,c}-1}U_{DAI,c,l}$. The UE may determine $U_{DAI,c,l}$ based on a total number of downlink assignments/PDSCHs/TBs scheduled by a DCI format l. The UE may detect one or more ($U_{DAI,c}$) DCIs within the M PDCCH monitoring occasions, indicating/comprising one or more downlink assignments for serving cell c. Each DCI may comprise one or more downlink assignments. A downlink assignment may indicate a PDSCH reception and/or SPS PDCSH reception and/or SPS PDSCH release and/or SCell dormancy. The UE may determine $\Sigma_{l=0}^{U_{DAI,c}-1} U_{DAI,c,l}$ based on a total number of downlink assignments/PDSCHs scheduled/indicated by DCI format 1 for serving cell c. The UE may receive DCI format 1 via one of the M PDCCH monitoring occasions. The UE may determine $\Sigma_{c=0}^{N_{cells}^{DL}-1} \Sigma_{l=0}^{U_{DAI,c}-1} U_{DAI,c,l}$ based on a summation of total downlink assignments scheduled/indicated/received within the total M PDCCH monitoring occasions for the one or more ($N_{cells}^{DL}$) serving cells. In an example, $U_{DAI,c}=0$ if the UE does not detect any DCI format scheduling PDSCH reception, indicating SPS PDSCH release or indicating SCell dormancy for serving cell c in any of the M PDCCH monitoring occasions.

In an example, the UE may determine the number of HARQ-ACK information bits $n_{HARQ-ACK}$ for obtaining a transmission power for a PUCCH based on number of received DCIs and a first parameter (e.g., $N_{conf}$) across M monitoring occasions in a serving cell c. The first parameter may be pre-defined. The UE may determine the first parameter based on one or more second parameters indicated by RRC, e.g., subcarrier spacing. The RRC may indicate the first parameter. For example, the first parameter may be configured by RRC. In an example, the UE may determine the first parameter based on information received via one or more DCIs. For example, the UE may determine the first parameter as an average number of downlink assignments/PDSCHs scheduled by DCIs, e.g., for a same serving cell or across all serving cells. In an example, the first parameter may be a maximum number of schedulable PDSCHs by a DCI format, indicated by a row of the TDRA table indicated by RRC configuration parameters. In an example, the UE may determine the first parameters as the average number of schedulable PDSCHs by a DCI format, based on the rows/entries of the TDRA table indicated by RRC configuration parameters. The first parameter may be the maximum number of PDSCHs that a DCI format may schedule. In an example, the first parameter may a time domain bundle size configured/defined for HARQ-ACK reporting of multiple PDSCHs. In an example, the first parameter may be indicated by a last DCI, e.g., a number of scheduled PDSCHs/downlink assignment by a last DCI, e.g., received by/for the same serving cell.

In an example, the UE may determine the number of HARQ-ACK information bits $n_{HARQ-ACK}$ based on:

$$n_{HARQ-ACK}=n_{HARQ-ACK,TB}=((V_{DAI,m_{last}}^{DL}-N_{conf}\Sigma_{c=0}^{N_{cells}^{DL}-1}U_{DAI,c})\mod(T_D))N_{TB,max}^{DL}+\Sigma_{c=0}^{N_{cells}^{DL}-1}(\Sigma_{m=0}^{M-1}N_{m,c}^{received}+N_{SPS,c})$$

For example, $U_{DAI,c}$ may be the total number of DCI formats (e.g., scheduling single and/or multiple PDSCH receptions) that the UE detects within the M PDCCH monitoring occasions for serving cell c.

In an example, the UE may determine the number of HARQ-ACK information bits $n_{HARQ-ACK}$ based on:

$$n_{HARQ-ACK}=n_{HARQ-ACK,TB}=((V_{DAI,m_{last}}^{DL}-\Sigma_{c=0}^{N_{cells}^{DL}-1}N_{conf,c}\times U_{DAI,c})\mod(T_D))N_{TB,max}^{DL}+\Sigma_{c=0}^{N_{cells}^{DL}-1}(\Sigma_{m=0}^{M-1}N_{m,c}^{received}+N_{SPS,c})$$

For example, $U_{DAI,c}$ may be the total number of DCI formats (e.g., scheduling single and/or multiple PDSCH receptions) that the UE detects within the M PDCCH monitoring occasions for serving cell c. For example, $N_{conf,c}$ may be a first parameter for serving cell c (e.g., configured/defined per cell).

In an example, the UE may determine the number of HARQ-ACK information bits $n_{HARQ-ACK}$ based on:

$$n_{HARQ-ACK}=n_{HARQ-ACK,TB}=((V_{DAI,m_{last}}^{DL}-\Sigma_{c=0}^{N_{cells}^{DL}-1}U_{DAI,c})\mod(T_D))N_{conf}\times N_{TB,max}^{DL}+\Sigma_{c=0}^{N_{cells}^{DL}-1}(\Sigma_{m=0}^{M-1}N_{m,c}^{received}+N_{SPS,c})$$

For example, $U_{DAI,c}$ may be the total number of DCI formats (e.g., scheduling single and/or multiple PDSCH receptions) that the UE detects within the M PDCCH monitoring occasions for serving cell c. For example, $V_{DAI,m_{last},norm}^{DL}$ may be a normalized value of $V_{DAI,m_{last}}^{DL}$ by the first parameter (e.g., $N_{conf}$). For example, the UE may determine $$V_{DAI,m_{last},norm}^{DL} = \text{ceil}\left(\frac{V_{DAI,m_{last}}^{DL}}{N\_conf}\right).$$

In an example, the UE may receive configuration parameters indicating that CBG-based scheduling is configured for one or more serving cells. For example, PDSCH-CodeBlockGroupTransmission may be provided for $N_{cells}^{DL,CBG}$ serving cells. For example, other serving cells of the PUCCH cell group (total of $N_{cells}^{DL}$ cells) may not be configured with CBG-based scheduling. For example, PDSCH-CodeBlockGroupTransmission may not be provided for $N_{cells}^{DL,TB}$ serving cells, where $N_{cells}^{DL,TB}+N_{cells}^{DL,CBG}=N_{cells}^{DL}$. In an example, at least one serving cell of the one or more serving cells configured with CBG-based scheduling may be configured with multi-PDSCH scheduling. For example, configuration parameters (e.g., TRDA table) may indicate that a DCI format may schedule multiple PDSCHs for $N_{cells}^{DL,CBG}$ serving cells.

The UE may determine a first HARQ-ACK sub-codebook for/comprising HARQ-ACK information of: SPS PDSCH reception/release and/or SCell dormancy indication and/or TB-based scheduling/PDSCH receptions on the $N_{cells}^{DL,TB}$ serving cells and on the $N_{cells}^{DL,CBG}$ serving cells (e.g., on any serving cell). The UE may determine a first number of HARQ-ACK information bits (e.g., $n_{HARQ-ACK,TB}$) for the first HARQ-ACK sub-codebook.

The UE may determine a second HARQ-ACK codebook for/comprising HARQ-ACK information of CBG-based PDSCH receptions on the $N_{cells}^{DL,CBG}$ serving cells. The $N_{cells}^{DL,CBG}$ serving cells may be configured with multi-PDSCH scheduling. For example, the UE may receive a DCI scheduling multiple PDSCHs (downlink assignments) for one of the $N_{cells}^{DL,CBG}$ serving cells, wherein each PDSCH of the multiple PDSCHs may comprise one or more CBGs. The UE may generate $N_{HARQ-ACK,max}^{CBG/TB,max}$ HARQ-ACK information bits per downlink assignment (e.g., PDSCH), where $N_{HARQ-ACK,max}^{CBG/TB,max}$ is the maximum value of $N_{TB,c}^{DL}\cdot N_{HARQ-ACK,c}^{CBG/TB,max}$ across all $N_{cells}^{DL,CBG}$ serving cells and $N_{TB,c}^{DL}$ is the value of maxNrofCodeWordsScheduledByDCI for serving cell c. For example, if for a serving cell c it is $N_{TB,c}^{DL}\cdot N_{HARQ-ACK,c}^{CBG/TB,max} < N_{HARQ-ACK,max}^{CBG/TB,max}$, the UE may generate NACK for the last $N_{HARQ-ACK,max}^{CBG/TB,max}-N_{TB,c}^{DL}\cdot N_{HARQ-ACK,c}^{CBG/TB,max}$ HARQ-ACK information bits for serving cell c.

The counter DAI value and the total DAI value apply separately for each of the first and the second HARQ-ACK sub-codebook. The UE may generate the HARQ-ACK codebook by appending the second HARQ-ACK sub-codebook to the first HARQ-ACK sub-codebook.

The UE may determine a total number of HARQ-ACK information bits $n_{HARQ-ACK}=n_{HARQ-ACK,TB}+n_{HARQ-ACK,CBG}$ for obtaining a PUCCH transmission power comprising the HARQ-ACK codebook.

For example, the UE may determine a number of HARQ-ACK information bits (e.g., $n_{HARQ-ACK,CBG}$) in a Type-2/ dynamic codebook for determining the transmission power for the PUCCH transmission as follows:

$$n_{HARQ\text{-}ACK,CBG} = ((V_{DAI,m_{last}}^{DL} - \Sigma_{c=0}^{N_{cells}^{DL,CBG}-1} U_{DAI,c}^{CBG}) \mod(T_D)) N_{HARQ\text{-}ACK,max}^{CBG/TB,max} + \Sigma_{c=0}^{N_{cells}^{DL}-1} \Sigma_{m=0}^{M-1} N_{m,c}^{received,CBG}$$

M may be a total number of PDCCH monitoring occasions associated with the HARQ-ACK codebook (reported via the PUCCH transmission). $N_{cells}^{DL}$ is may be the total number of serving cells of the UE, associated with the PUCCH cell group. $N_{cells}^{DL,CBG}$ may be the number of serving cell(s) configured with CBG-based scheduling.

The UE may be configured with a single serving cell. For example, the PUCCH cell group may comprise one serving cell ($N_{cells}^{DL}=1$). The UE may be configured with C-DAI and may not be configured with T-DAI. For example, the configuration parameters may indicate a bit-width of C-DAI field in a DCI format. For example, the configuration parameters may indicate that a bit-width of T-DAI field in the DCI format is zero. The DCI format may indicate at least one C-DAI for a downlink assignment/PDSCH. The DCI may not indicate a T-DAI.

The UE may determine the number of HARQ-ACK information bits ($n_{HARQ\text{-}ACK,CBG}$) based on a value of $V_{DAI,m_{last}}^{DL}$. The UE may determine $V_{DAI,m_{last}}^{DL}$ based on a value of a counter DAI in a last DCI format that the UE may detect within the M PDCCH monitoring occasions. The last DCI format may be a last DCI format scheduling CBG-based PDSCH reception(s) for a serving cell. For example, the UE may receive multiple DCIs scheduling CBG-based PDSCH reception(s) via one or more (M) PDCCH monitoring occasions. The last DCI format may or may not be received via a last PDCCH monitoring occasion. Each DCI of the multiple DCIs may comprise/indicate one or more downlink assignments/PDSCHs. The last DCI may schedule multiple PDSCHs/downlink assignments. In an example, the UE may determine $V_{DAI,m_{last}}^{DL}$ based on a value of a counter DAI corresponding to a last downlink assignment/PDSCH scheduled by a last DCI format, scheduling CBG-based PDSCH reception(s), that the UE may detect within the M PDCCH monitoring occasions. In an example, the last DCI may comprise/indicate the counter DAI corresponding to the last downlink assignment/PDSCH. In an example, the counter DAI in the last DCI may correspond to a first PDSCH/downlink assignment scheduled/indicated by the last DCI. The UE may determine $V_{DAI,m_{last}}^{DL}$ based on the counter DAI of the first (e.g., earliest) PDSCH indicated by the last DCI and a number of PDSCHs scheduled by the last DCI.

The UE may determine $V_{DAI,m_{last}}^{DL}$ on a value of a counter DAI corresponding to a last downlink assignment/PDSCH scheduled by a last CBG-based scheduling DCI within the M PDCCH monitoring occasions.

The UE may be configured with multiple serving cells. For example, the PUCCH cell group may comprise the multiple serving cells ($N_{cells}^{DL}>1$). The UE may be configured with C-DAI and T-DAI. For example, the configuration parameters may indicate a bit-width of C-DAI field in a DCI format. For example, the configuration parameters may indicate a bit-width of T-DAI field in the DCI format. The DCI format may indicate at least one C-DAI for a downlink assignment/PDSCH. The DCI may indicate a T-DAI.

The UE may determine the number of HARQ-ACK information bits ($n_{HARQ\text{-}ACK,CBG}$) based on a value of $V_{DAI,m_{last}}^{DL}$. The UE may determine $V_{DAI,m_{last}}^{DL}$ based on a value of a total DAI in a first CBG-based scheduling DCI format that the UE may detect within the M PDCCH monitoring occasions. The first DCI format may be a last received DCI format scheduling one or more CBG-based PDSCH receptions for a (any) serving cell, that the UE receives via the M PDCCH monitoring occasions. For example, the UE may receive multiple DCIs via one or more (M) PDCCH monitoring occasions. Each DCI of the multiple DCIs may comprise/schedule/indicate one or more downlink assignments/PDSCHs. For example, the UE may detect/receive the first DCI format/DCI in the last PDCCH monitoring occasion. The first DCI/DCI format may comprise a T-DAI field. The first DCI format may indicate a T-DAI associated with a last downlink assignment/PDSCH scheduled via the last PDCCH monitoring occasion. The UE may determine $V_{DAI,m_{last}}^{DL}$ based on a last T-DAI received via a CBG-based scheduling DCI within the M PDCCH monitoring occasions. The UE may determine $V_{DAI,m_{last}}^{DL}$ based on a number of PDSCHs/downlink assignments scheduled by the first/last DCI CBG-based format. For example, the UE may determine $V_{DAI,m_{last}}^{DL}$ based on a value of a total DAI in the first/last CBG-based DCI format and the number of PDSCHs/downlink assignments scheduled by the first/last CBG-based DCI format. For example, the UE may receive/detect the first/last CBG-based DCI format that comprises/indicates a T-DAI field in the last PDCCH monitoring occasion within the M PDCCH monitoring occasions associated with the HARQ-ACK codebook.

In an example, the UE may not receive/detect any DCI format scheduling CBG-based PDSCH reception for a (any) serving cell in any of the M PDCCH monitoring occasions. The UE may receive at least one DCI via the M PDCCH monitoring occasions. In an example, the at least one DCI, received via the M PDCCH monitoring occasions may not schedule CBG-based PDCSH(s). The UE may determine $V_{DAI,m_{last}}^{DL}=1$.

The UE may determine the number of HARQ-ACK information bits ($n_{HARQ\text{-}ACK,CBG}$) based on a value of $\Sigma_{c=0}^{N_{cells}^{DL,CBG}-1} U_{DAI,c}^{CBG}$. The UE may determine U based on a total number of downlink assignments/PDSCHs scheduled by one or more DCIs based on CBG. The UE may detect the one or more CBG-based scheduling DCIs within the M PDCCH monitoring occasions for serving cell c. The one or more DCIs may schedule one or more downlink assignments/PDSCHs each comprising one or more CBGs. Each DCI may comprise/schedule one or more downlink assignments/PDSCHs. Each PDSCH may comprise one or more CBGs. The UE may receive the one or more CBG-based scheduling DCIs within the M PDCCH monitoring occasions for the serving cell c. The UE may determine $\Sigma_{c=0}^{N_{cells}^{DL,CBG}-1} U_{DAI,c}^{CBG}$ based on a summation of total downlink assignments/PDSCHs scheduled/indicated/received within the total M PDCCH monitoring occasions across the one or more ($N_{cells}^{DL,CBG}$) serving cells configured with CBG-based PDSCH reception. In an example, $U_{DAI,c}^{CBG}=0$ if the UE does not detect any DCI format scheduling CBG-based PDSCH reception for serving cell c in any of the M PDCCH monitoring occasions.

The configuration parameters may indicate a bit-width for the C-DAI field in the DCI format (e.g., $C_{DAI}$ bitlength). The UE may determine the C-DAI and T-DAI values based on $T_D=2^{C_{DAI}bitlength}$.

The UE may determine $N_{HARQ\text{-}ACK,max}^{CBG/TB,max}$ based on a maximum value of $N_{TB,c}^{DL} \times N_{HARQ\text{-}ACK,max}^{CBG/TB,max}$ across all $N_{cells}^{DL,CBG}$ serving cells. $N_{TB,c}^{DL}$ may be the value of a configured number of codewords in a PDSCH (e.g., maxNrofCodeWordsScheduledByDCI) for serving cell c. For example, the UE may determine $N_{TB,max}^{DL}$ based on a configured number of codewords in a PDSCH and/or whether spatial bundling is configured in at least one serving cell. For example, $N_{TB,max}^{DL}=2$ if configuration parameters indicate that a value of maxNrofCodeWordsScheduled-ByDCI is 2 for any serving cell c and/or spatial bundling is not configured (e.g., harq-ACK-SpatialBundlingPUCCH is not provided). For example, $N_{TB,max}^{DL}=1$ if configuration parameters indicate that a value of maxNrofCodeWordsScheduledByDCI is 2 for any serving cell c and/or spatial bundling is configured (e.g., harq-ACK-SpatialBundling-PUCCH is not provided). For example, $N_{TB,max}^{DL}=1$ if configuration parameters indicate that a value of maxNrofCodeWordsScheduledByDCI is 1 for any serving cell c.

The UE may determine $N_{m,c}^{received,CBG}$ based on a maximum number of CBGs for generating respective HARQ-ACK information bits for a transport block reception for the serving cell, e.g., based on the RRC parameter maxCodeBlockGroupsPerTransportBlock.

The UE may determine $N_{m,c}^{received,CBG}$ based on a number of CBGs the UE receives in one or more PDSCHs scheduled by a DCI format. The DCI format may support CBG-based PDSCH reception/scheduling. The UE may detect the DCI format in PDCCH monitoring occasion m for serving cell c. The UE may report HARQ-ACK information corresponding to the CBGs and/or the DCI format in/via the PUCCH.

In an embodiment, a wireless device may receive a plurality of downlink control information (DCIs). At least one DCI, of the plurality of DCIs, may schedule a plurality of physical downlink shared channels (PDSCHs). The wireless device may determine a number of bits of hybrid automatic repeat request-acknowledgement (HARQ-ACK) information, corresponding to the plurality of DCIs. The wireless device may determine the number of bits based on a count of the plurality of PDSCHs and/or a value, indicated by a first DCI of the plurality of DCIs. The value may indicate a total number of downlink assignments via the plurality of DCIs.

The plurality of DCIs may be received on one or more serving cells of the wireless device. The plurality of DCIs may comprise one or more downlink assignments for one or more serving cells of the wireless device. A downlink assignment may comprises/indicate a PDSCH reception and/or a semi-persistent scheduling (SPS) PDSCH release and/or a semi-persistent scheduling (SPS) PDSCH reception and/or a secondary cell dormancy indication. At least one of the plurality of DCIs may indicate the PUCCH resource for the transmission of the HARQ-ACK information. The wireless device may determine one or more monitoring occasions of a physical downlink control channel (PDCCH) comprising the plurality of DCIs across the one or more serving cells of the wireless device.

The value may be a total downlink assignment index (DAI), indicating a first total number of pairs of serving cells and downlink assignments, indicated by the plurality of DCIs, across the serving cells and across the one or more monitoring occasions of the PDCCH. The first DCI, comprising the total DAI, may be received in a last monitoring occasion of the one or more monitoring occasions of the PDCCH. The wireless device may determine the value based on a counter downlink assignment index (DAI) indicated by the first DCI. The counter DAI may indicate an accumulative number of pairs of serving cells and downlink assignments, indicated by the plurality of DCIs across the serving cells and across the one or more monitoring occasions of the PDCCH up to a current monitoring occasion associated with the first DCI. The wireless device may determine the value based on a second number of PDSCHs scheduled by the first DCI, wherein the first DCI may be a last DCI of the plurality of DCIs.

The wireless device may determine, based on the number of the bits, a power for transmission of the HARQ-ACK information via a physical uplink control channel (PUCCH) resource. The wireless device may transmit the HARQ-ACK information, via the PUCCH resource, using the power.

In an example, the configuration parameters may indicate that the C-DAI and/or T-DAI is counted/incremented per DCI format. The UE may receive a DCI/DCI format. The DCI may schedule multiple PDSCH. The DCI may comprise a DAI field indicating a C-DAI value and/or a T-DAI value.

The wireless device may receive a plurality of DCIs. The plurality of DCIs may be based on one or more DCI formats (e.g., DCI format 1_0, and/or DCI format 1_1 and/or DCI format 1_2 and/or DCI format 1_3). At least one DCI of the plurality of DCIs may indicate a PUCCH resource for reporting HARQ-ACK feedback associated with the plurality of DCIs. For example, the UE may transmit HARQ-ACK information for/of the plurality of DCIs in the (same) PUCCH resource. For example, the at least one DCI may comprise a slot offset (e.g., PDSCH-to-HARQ_feedback timing indicator field) indicating, based on a first slot, a slot comprising the PUCCH resource. the first slot may be the DL slot corresponding to receiving the at least one DCI. The first slot may be the DL slot in which a first PDSCH, scheduled by the at least one DCI, is received.

The UE may determine one or more monitoring occasions of/for PDCCH. The configuration parameters may indicate that the PDCCH is associated with the one or more DCI formats. For example, the one or more monitoring occasions of the PDCCH may be configured with the one or more DCI formats. The UE may receive/detect the plurality of DCIs from/via the one or more monitoring occasions.

The UE may transmit HARQ-ACK information for/associated with/of the one or more PDCCH monitoring occasions in/via the (same) PUCCH resource.

One or more first DCIs of the plurality of DCIs may not be configured with multi-PDSCH scheduling, e.g., the corresponding TDRA table may comprise of rows indicating a single valid SLIV. In an example, the one or more DCIs may be configured with multi-PDSCH scheduling, e.g., the corresponding TDRA table may comprise of at least one row indicating multiple valid SLIVs. The one or more DCIs may not schedule multiple PDCSHs. For example, each of the one or more DCIs may schedule a single PDSCH. For example, each of the one or more DCIs may schedule two PDSCHs.

The UE may determine/generate a first sub-codebook associated with the one or more first DCIs, based on Type-2/dynamic HARQ-ACK codebook. The HARQ-ACK codebook transmitted via the PUCCH may comprise the first sub-codebook and a second cub-codebook. The second sub-codebook may correspond to one or more second DCIs of the plurality of DCIs, based on Type-2/dynamic HARQ-ACK codebook. The one or more second DCIs may be configured with multi-PDSCH scheduling and/or may schedule multiple (e.g., >1 or >2) PDSCHs. In an example, the one or more DCIs may schedule one or more CBG-based PDSCH receptions. A UCI size of the PUCCH may be in a first range (e.g., $O_{ACK}+O_{SR}+O_{CSI} \leq 11$).

In an example, the UE may determine a first sub-codebook comprising HARQ-ACK information of TB-based scheduling and/or single PDSCH scheduling DCIs. In an example, the UE may determine a second sub-codebook comprising HARQ-ACK information of TB-based scheduling and/or CBG-based scheduling and/or multi-PDSCH scheduling DCIs. The first sub-codebook may comprise a first number of HARQ-ACK information bits (e.g., $n_{HARQ-ACK,1}$). The UE may determine the first number of HARQ-ACK information bits (e.g., $n_{HARQ-ACK,1}$) in a Type-2/dynamic codebook for determining the transmission power for the PUCCH transmission as follows:

$$n_{HARQ-ACK,1} = ((V_{DAI,m_{last}}^{DL} - \Sigma_{c=0}^{N_{cells}^{DL}-1} U_{DAI,c}) \mod (T_D)) N_{TB,max}^{DL} + \Sigma_{c=0}^{N_{cells}^{DL}-1} (\Sigma_{m=0}^{M-1} N_{m,c}^{received} + N_{SPS,c})$$

For example, M may be the total number of PDSCH monitoring occasions reported via the PUCCH. For example, $N_{cells}^{DL}$, may be the total number of serving cells configured for the UE in the PUCCH cell group.

For example, the UE may determine $V_{DAI,m_{last}}^{DL}$ based on a last T-DAI or C-DAI received via a DCI. The DCI may be received in a last PDCCH monitoring occasion. The DCI may be a last received DCI. The DCI may schedule single (and/or two) PDSCH receptions. The DCI may indicate SPS PDSCH reception and/or release. The DCI may indicate a SCell dormancy for a serving cell. The UE may detect the DCI within the M PDCCH monitoring occasion, e.g., via a last PDCCH monitoring occasion. The UE may determine $V_{DAI,m_{last}}^{DL}$ based on a value of C-DAI received in a last DCI that the UE detects in the last PDCCH monitoring occasion, e.g., if UE detects no DCI format comprising T-DAI in the last PDCCH monitoring occasion. The UE may determine $V_{DAI,m_{last}}^{DL}$ based on a value of C-DAI received in a last DCI that the UE detects in the M PDCCH monitoring occasions, e.g., if $N_{cells}^{DL}=1$.

For example, the UE may determine $U_{DAI,c}$ based on a total number of DCIs/DCI formats scheduling a single (and/or two) PDSCH receptions, and/or indicating SPS PDSCH reception, and/or indicating SPS PDSCH release, and/or indicating SCell dormancy, for serving cell c. The UE may receive the DCIs within the M PDCCH monitoring occasions. The UE may determine $\Sigma_{c=0}^{N_{cells}^{DL}-1} U_{DAI,c}$ based on a summation of total number of DCIs across all ($N_{cells}^{DL}$) serving cells.

The UE may determine $N_{m,c}^{received}$ based on a number of transport blocks the UE receives in a PDSCH scheduled by a single-PDSCH scheduling DCI format that the UE detects in PDCCH monitoring occasion m for serving cell c. For example, harq-ACK-SpatialBundlingPUCCH may not be provided/configured. The UE may determine $N_{m,c}^{received}$ based on a number of PDSCH scheduled by a single-PDCSH scheduling DCI format that the UE detects in PDCCH monitoring occasion m for serving cell c. For example, harq-ACK-SpatialBundlingPUCCH may be configured/provided. The UE may determine $N_{m,c}^{received}$ based on a number of DCI format that the UE detects and indicate SPS PDSCH release in PDCCH monitoring occasion m for serving cell c. The UE may determine $N_{m,c}^{received}$ based on a number of DCI format that the UE detects and indicate SCell dormancy in PDCCH monitoring occasion m for serving cell c.

A single-PDCSH scheduling DCI format may not be configured with multi-PDSCH scheduling. A single-PDCSH scheduling DCI format may be configured with multi-PDSCH scheduling and may schedule/indicate a single PDSCH.

In an example, the UE may determine a second sub-codebook comprising HARQ-ACK information of multiple PDSCH TB-based and/or CBG-based scheduling DCIs. In an example, the UE may determine a second sub-codebook comprising HARQ-ACK information of multiple PDSCH scheduling DCIs. The DCIs may be TB-based scheduling and/or CBG-based scheduling. The second sub-codebook may comprise a second number of HARQ-ACK information bits (e.g., $n_{HARQ-ACK,2}$).

The UE may determine the total number of HARQ-ACK information bits ($n_{HARQ-ACK}$), based on the first number and the second number, as $$n_{HARQ-ACK} = n_{HARQ-ACK,1} + n_{HARQ-ACK,2}$$

The UE may determine the second number of HARQ-ACK information bits (e.g., $n_{HARQ-ACK,2}$) in a Type-2/dynamic codebook for determining the transmission power for the PUCCH transmission as follows:

$$n_{HARQ-ACK,2} = ((V_{DAI,m_{last}}^{DL} - \Sigma_{c=0}^{N_{cells}^{DL,multi}-1} U_{DAI,c}^{multi}) \mod (T_D)) N_{HARQ-ACK,max}^{DL,multimax} + \Sigma_{c=0}^{N_{cells}^{DL,multi}-1} \Sigma_{m=0}^{M-1} N_{m,c}^{received,multi}$$

The UE may determine one or more ($N_{cells}^{DL,multi}$) serving cells configured with multi-PDSCH scheduling and/or CBG-based scheduling. For example, the total number of serving cells ($N_{cells}^{DL}$) configured for the UE in the PUCCH cell group may comprise the one or more ($N_{cells}^{DL,multi}$) serving cells configured with multi-PDSCH scheduling and/or CBG-based scheduling.

For example, the UE may determine $V_{DAI,m_{last}}^{DL}$ based on a last T-DAI or C-DAI received via a DCI (e.g., multi-PDSCH scheduling DCI and/or CBG-based scheduling DCI). The DCI may be received in a last PDCCH monitoring occasion. The DCI may be a last received DCI scheduling multiple PDCSH receptions and/or one or more CBG-based PDSCH receptions. The UE may detect the DCI within the M PDCCH monitoring occasions, e.g., via a last PDCCH monitoring occasion. The UE may determine $V_{DAI,m_{last}}^{DL}$ based on a value of T-DAI received in a last DCI format scheduling multiple PDSCHs and/or CBGs (e.g., one or more PDSCHs comprising one or more CBGs) that the UE detects in the M PDCCH monitoring occasions. The UE may determine $V_{DAI,m_{last}}^{DL}$ based on a value of C-DAI received in a last DCI format scheduling multiple PDSCHs and/or CBGs that the UE detects in the M PDCCH monitoring occasions, e.g., if $N_{cells}^{DL}=1$. The UE may determine $V_{DAI,m_{last}}^{DL}=1$ if UE detects no DCI format scheduling multiple PDSCHs and/or CBG-based PDSCH reception(s).

For example, the UE may determine $U_{DAI,c}^{multi}$ based on a total number of DCIs/DCI formats scheduling multiple PDSCH receptions, and/or scheduling one or more CBG-based PDSCH receptions, for serving cell c. The UE may receive the DCIs within the M PDCCH monitoring occasions. The UE may determine $\Sigma_{c=0}^{N_{cells}^{DL,multi}-1} U_{DAI,c}^{multi}$ based on a summation of total number of DCIs across the ($N_{cells}^{DL,multi}$) serving cells configured with multi-PDSCH scheduling and/or CBG-based scheduling.

The UE may determine/generate a number of $N_{HARQ-ACK,max}^{DL,multi\,max}$ HARQ-ACK information bits per DCI. The UE may determine/generate a number of $N_{HARQ-ACK,max}^{DL,multi\,max}$ HARQ-ACK information bits per transport block. For example, the UE may determine $N_{HARQ-ACK,max}^{DL,multi\,max}$ based on a maximum value of $N_{cells}^{DL} \cdot N_{HARQ-ACK,c}^{CBG/TB,max}$ and/or $N_{TB,c}^{DL}$. $N_{HARQ-ACK,max}^{DL,multi}$ max and/or $N_{TB,c}^{DL}$. $N_{HARQ-ACK,c}^{CBG/TB,max} \cdot N_{HARQ-ACK,c}^{DL,multi\,max}$ across all $N_{cells}^{DL,multi}$ serving cells. $N_{TB,c}^{DL}$ may be the value of a configured number of codewords in a PDSCH (e.g., maxNrofCodeWordsScheduledByDCI) for serving cell c. For example, the UE may determine $N_{TB,max}^{DL}$ based on a configured number of codewords in a PDSCH and/or whether spatial bundling is configured in at least one serving cell. For example, $N_{TB,max}^{DL}=2$ if configuration parameters indicate that a value of maxNrofCodeWordsScheduledByDCI is 2 for any serving cell c and/or spatial bundling is not configured (e.g., harq-ACK-SpatialBundlingPUCCH is not provided). For example, $N_{TB,max}^{DL}=1$ if configuration parameters indicate that a value of maxNrofCodeWordsScheduledByDCI is 2 for any serving cell c and/or spatial bundling is configured (e.g., harq-ACK-SpatialBundlingPUCCH is not provided). For example, $N_{TB,max}^{DL}=1$ if configuration parameters indicate that a value of maxNrofCodeWordsScheduledByDCI is 1 for any serving cell c.

The UE may determine $N_{HARQ-ACK,c}^{DL,multi\ max}$ based on a maximum number of PDSCHs schedulable by a DCI of the plurality of DCIs, e.g., based on a configured TDRA table.

The UE may determine $N_{HARQ-ACK,c}^{CBG/TB,max}$ based on a maximum number of CBGs for generating respective HARQ-ACK information bits for a transport block reception for the serving cell, e.g., based on the RRC parameter maxCodeBlockGroupsPerTransportBlock.

The UE may determine a maximum number of PDSCHs (TB-based and/or CBG-based) that a DCI may schedule for a serving cell. For example, $N_{HARQ-ACK,c}^{DL,multi\ max}$ may be the maximum number of PDCSHs scheduled by a DCI format for serving cell c. For example, the UE may determine the maximum number of PDCSHs scheduled by a DCI format based on configuration parameters of a TDRA table associated with the DCI format.

The UE may determine a maximum number of HARQ-ACK bits generated per DCI/C-DAI value, as maximum of $\{N_{TB,c}^{DL} \cdot N_{HARQ-ACK,c}^{CBG/TB,max}, N_{HARQ-ACK,c}^{DL,multi\ max}\}$ across the $N_{cells}^{DL,multi}$ serving cells. For example, at least in/for one serving cell, a DCI may schedule multiple PDSCHs and CBG-based reception at the same time. For example, configuration parameters may indicate that CBG-based PDSCH reception and multi-PDSCH scheduling is configured for a DCI format.

In an example, for a serving cell c, the UE may determine that $N_{TB,c}^{DL} \cdot N_{HARQ-ACK,c}^{CBG/TB,max}$, $N_{HARQ-ACK,c}^{DL,multi\ max} < N_{HARQ-ACK,max}^{DL,multi\ max}$. The UE may generate NACKs for the last (remaining) $N_{HARQ-ACK,max}^{DL,multi\ max} - N_{TB,c}^{DL} \cdot N_{HARQ-ACK,c}^{CBG/TB,max} \cdot N_{HARQ-ACK,c}^{DL,multi\ max}$ HARQ-ACK information bits for the serving cell c in the second sub-codebook.

The UE may determine a maximum number of HARQ-ACK bits generated per DCI/C-DAI value in, as maximum of $\{N_{TB,c}^{DL} \cdot N_{HARQ-ACK,c}^{DL,multi\ max}\}$ and $\{N_{TB,c}^{DL} \cdot N_{HARQ-ACK,c}^{CBG/TB,max}\}$ across the $N_{cells}^{DL,multi}$ serving cells. For example, a DCI may schedule either multiple PDSCHs or CBG-based reception at least in/for one serving cell. For example, configuration parameters may indicate that CBG-based PDSCH reception and multi-PDSCH scheduling is configured for a DCI format. For example, the UE may report HARQ-ACK information of multi-PDSCH scheduling DCI(s) and CBG-based scheduling DCI(s) in a same HARQ-ACK sub-codebook.

In an example, for a serving cell c, the UE may determine that $N_{TB,c}^{DL} \cdot N_{HARQ-ACK,c}^{CBG/TB,max} < N_{HARQ-ACK,max}^{DL,multi\ max}$ or $N_{TB,c}^{DL} \cdot N_{HARQ-ACK,c}^{DL,multi\ max} < N_{HARQ-ACK,c}^{DL,multi\ max}$. The UE may generate NACKs for the last (remaining) $N_{HARQ-ACK,max}^{DL,multi\ max} - N_{TB,c}^{DL} \cdot N_{HARQ-ACK,c}^{CBG/TB,max}$ or $N_{HARQ-ACK,max}^{DL,multi} - N_{TB,c}^{DL}$. $N_{HARQ-ACK,c}^{DL,multi\ max}$ HARQ-ACK information bits for the serving cell c in the second sub-codebook.

Figure 27:
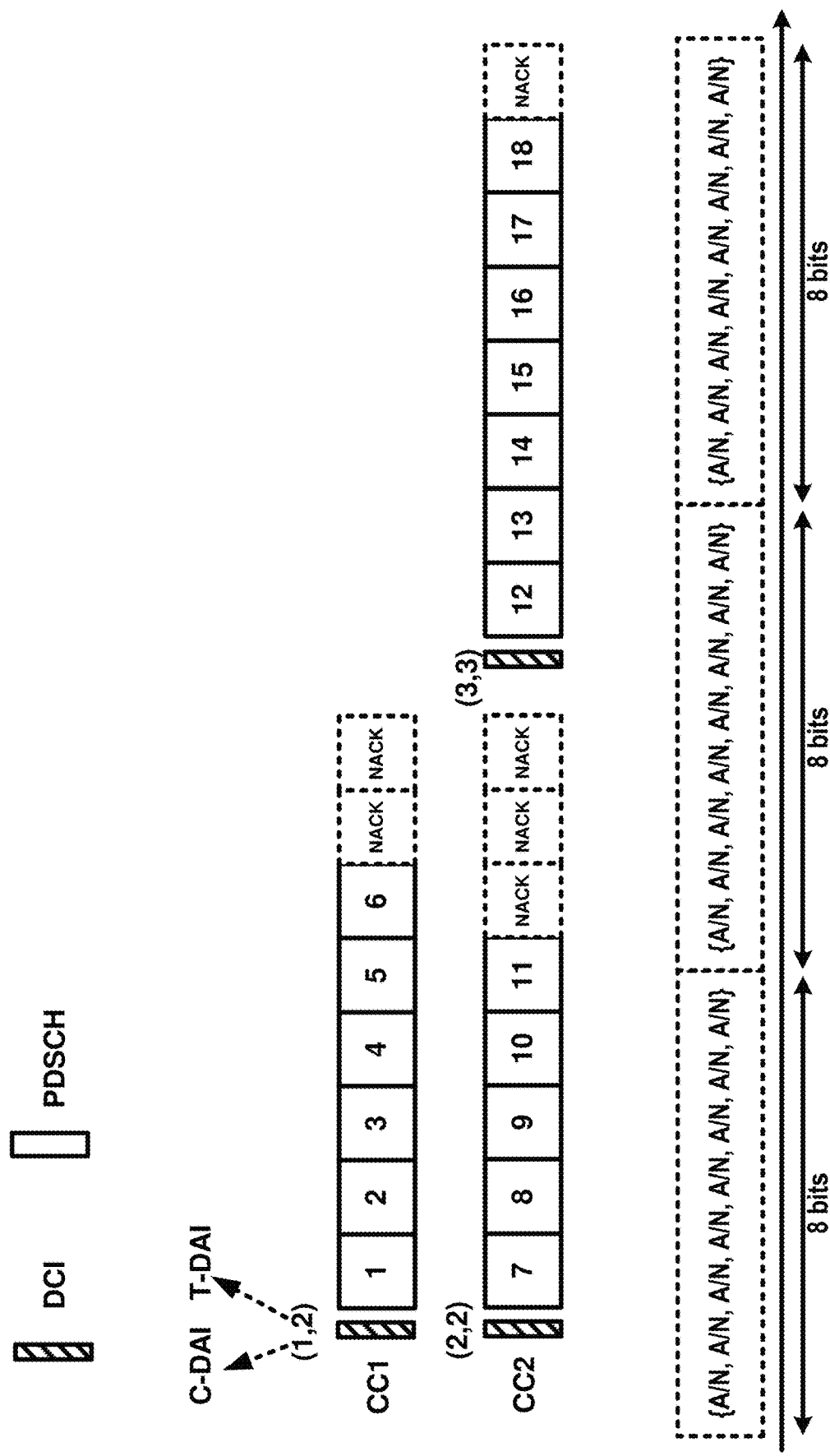
FIG. 27 illustrates an example of generating HARQ-ACK information corresponding to multi-PDSCH scheduling DCIs, according to some embodiments.

FIG. 27 illustrates an example of generating HARQ-ACK information corresponding to multi-PDSCH scheduling DCIs, according to some embodiments. The UE may determine that $N_{HARQ-ACK,max}^{DL,multi\ max}=8$ bits (fixed number of A/N reported per DCI). The UE may receive a first DCI via cell 1 scheduling 6 PDSCHs. The UE may generate 2 NACKs and pads at the end of the HARQ-ACK bits corresponding to the first DCI (for alignment with the maximum length of 8 bits). The UE may receive a second DCI via cell 2 scheduling 5 PDSCHs. The UE may generate 3 NACKs and pads at the end of the HARQ-ACK bits corresponding to the second DCI (for alignment with the maximum length of 8 bits). The UE may receive a third DCI via cell 1 scheduling 7 PDSCHs. The UE may generate 1 NACK and pads at the end of the HARQ-ACK bits corresponding to the third DCI (for alignment with the maximum length of 8 bits). The UE may generate 24 HARQ-ACK bits comprising 8 bits per DCI.

The UE may determine $N_{m,c}^{received,multi}$ based on a number of transport blocks the UE receives in PDSCHs scheduled by a multi-PDSCH scheduling DCI format that the UE detects in PDCCH monitoring occasion m for serving cell c. For example the multi-PDSCH scheduling DCI may not schedule CBG-based PDSCH receptions. The UE may determine $N_{m,c}^{received,multi}$ based on a number of CBGs the UE receives in one or more PDSCHs scheduled by a CBG-based scheduling DCI format that the UE detects in PDCCH monitoring occasion m for serving cell c. For example a multi-PDSCH scheduling DCI may schedule CBG-based PDSCH receptions.

In an embodiment, a wireless device may receive a plurality of downlink control information (DCIs). At least one DCI of the plurality of DCIs may schedule a plurality of PDSCHs. The wireless device may determine a number of bits of hybrid automatic repeat request-acknowledgement (HARQ-ACK) information corresponding to the plurality of DCIs, based on a count of the plurality of DCIs and/or a maximum number of PDSCHs schedulable by a DCI of the plurality of DCIs.

The UE may determine, based on the number of the bits, a power for transmission of the HARQ-ACK information via a physical uplink control channel (PUCCH) resource. The UE may transmit the HARQ-ACK information, via the PUCCH resource, using the power.

The invention claimed is:

1. A method comprising:
  receiving configuration parameters of each cell of one or more cells, indicating a maximum number of time domain resource allocations (TDRAs) for physical downlink shared channels (PDSCHs) for a respective cell of the one or more cells;
  for each cell of the one or more cells, multiplying the maximum number of TDRAs of the cell by a corresponding number of codewords of the cell to yield a respective multiplied number of TDRAs;
  determining a maximum value of the multiplied numbers of TDRAs across the one or more cells; and
  transmitting, via a physical uplink control channel (PUCCH), feedback information with a transmission power determined based on the maximum value.

2. The method of claim 1, further comprising determining, for a PUCCH transmission power determination, a number of bits of feedback information.

3. The method of claim 2, wherein the number of bits of the feedback information comprise a first number of bits of first feedback information, wherein:
  the feedback information comprises the first feedback information; and
  the first feedback information is associated with one or more undetected DCIs.

4. The method of claim 2, further comprising determining the number of bits based on the maximum value.

5. The method of claim 3, further comprising determining the number of bits based on a number of the one or more undetected DCIs across the one or more cells.

6. The method of claim 3, further comprising determining a number of the one or more undetected DCIs based on a difference between a received downlink assignment index (DAI) value and a quantity of one or more received DCIs across the one or more cells.

7. The method of claim 3, further comprising determining the number of bits based on multiplication of the number of the one or more undetected DCIs and the maximum value.

8. The method of claim 2, further comprising receiving one or more DCIs, wherein each DCI of the one or more DCIs schedules multiple PDSCHs for a cell of the one or more cells.

9. The method of claim 8, wherein a number of the multiple PDSCHs scheduled by a DCI for a cell is equal to or less than a respective maximum number of time domain resource allocations for PDSCHs for the cell.

10. The method of claim 8, wherein the feedback information further comprises second feedback information associated with the one or more received DCIs.

11. The method of claim 8, wherein the number of bits of the feedback information comprises a second number of bits of the second feedback information.

12. The method of claim 11, further comprising determining the second number of bits based on a total number of PDSCHs or transport blocks scheduled by the one or more DCIs across the one or more cells.

13. The method of claim 8, wherein at least one DCI of the one or more DCIs indicates a downlink assignment index (DAI) value.

14. The method of claim 8, wherein the configuration parameters further indicate a maximum number of codewords for a respective cell of the one or more cells.

15. The method of claim 8, further comprising generating a hybrid automatic repeat request-acknowledgement (HARQ-ACK) sub-codebook comprising the feedback information, wherein the feedback information comprises HARQ-ACK information corresponding to multiple PDSCH receptions scheduled by a single downlink control information (DCI) for a cell of the one or more cells.

16. The method of claim 15, wherein the HARQ-ACK sub-codebook comprises at least one negative acknowledgement (NACK) for at least one last HARQ-ACK information bit for a cell with a first value smaller than the maximum of the first values across the one or more cells.

17. The method of claim 15, wherein a total number of HARQ-ACK information bits of the HARQ-ACK sub-codebook is equal to or greater than the number of bits of the feedback information determined for a PUCCH transmission power.

18. The method of claim 15, further comprising transmitting the HARQ-ACK sub-codebook in the PUCCH.

19. A wireless device comprising:
one or more processors; and
memory storing instructions that, when executed by the one or more processors, cause the wireless device to perform a process, comprising:
receiving configuration parameters of each cell of one or more cells, indicating a maximum number of time domain resource allocations (TDRAs) for physical downlink shared channels (PDSCHs) for a respective cell of the one or more cells;
for each cell of the one or more cells, multiplying the maximum number of TDRAs of the cell by a corresponding number of codewords of the cell to yield a respective multiplied number of TDRAs;
determining a maximum value of the multiplied numbers of TDRAs across the one or more cells; and
transmitting, via a physical uplink control channel (PUCCH), feedback information with a transmission power determined based on the maximum value.

20. A non-transitory computer-readable medium comprising instructions that, when executed by one or more processors, cause the one or more processors to perform a process, comprising:
receiving configuration parameters of each cell of one or more cells, indicating a maximum number of time domain resource allocations (TDRAs) for physical downlink shared channels (PDSCHs) for a respective cell of the one or more cells; and
for each cell of the one or more cells, multiplying the maximum number of TDRAs of the cell by a corresponding number of codewords of the cell to yield a respective multiplied number of TDRAs;
determining a maximum value of the multiplied numbers of TDRAs across the one or more cells; and
transmitting, via a physical uplink control channel (PUCCH), feedback information with a transmission power determined based on the maximum value.

* * * * *